US012682502B2

(12) United States Patent
Takahashi et al.

(10) Patent No.: US 12,682,502 B2
(45) Date of Patent: Jul. 14, 2026

(54) INFORMATION PROCESSING DEVICE AND METHOD

(71) Applicant: Sony Group Corporation, Tokyo (JP)

(72) Inventors: Ryohei Takahashi, Tokyo (JP);
Mitsuhiro Hirabayashi, Tokyo (JP)

(73) Assignee: SONY GROUP CORPORATION,
Tokyo (JP)

( * ) Notice: Subject to any disclaimer, the term of this
patent is extended or adjusted under 35
U.S.C. 154(b) by 526 days.

(21) Appl. No.: 18/036,403

(22) PCT Filed: Dec. 10, 2021

(86) PCT No.: PCT/JP2021/045447
§ 371 (c)(1),
(2) Date: May 11, 2023

(87) PCT Pub. No.: WO2022/138221
PCT Pub. Date: Jun. 30, 2022

(65) Prior Publication Data
US 2023/0401753 A1      Dec. 14, 2023

Related U.S. Application Data

(60) Provisional application No. 63/128,498, filed on Dec.
21, 2020.

(51) Int. Cl.
*G06T 9/00* (2006.01)
*G06T 17/00* (2006.01)
*H04N 19/597* (2014.01)
(52) U.S. Cl.
CPC .............. *G06T 9/001* (2013.01); *G06T 17/00*
(2013.01); *H04N 19/597* (2014.11)
(58) Field of Classification Search
CPC ......... G06T 9/001; G06T 17/00; H04N 19/70;
H04N 19/597
See application file for complete search history.

(56) References Cited

U.S. PATENT DOCUMENTS

2023/0276053 A1* 8/2023 Gudumasu ......... H04N 21/8543
375/240.02

FOREIGN PATENT DOCUMENTS

WO      2019/122504 A1    6/2019
WO      2019/216434 A1    11/2019
(Continued)

OTHER PUBLICATIONS

Kim, Giseop, and Ayoung Kim. "Remove, Then Revert: Static Point
Cloud Map Construction Using Multiresolution Range Images."
Proceedings of the . . . IEEE/RSJ International Conference on
Intelligent Robots and Systems. IEEE, 2020. 10758-10765. Web.
(Year: 2020).*

(Continued)

*Primary Examiner* — John R Wallace
(74) *Attorney, Agent, or Firm* — XSENSUS LLP

(57) ABSTRACT

An information processing device and method are capable of
inhibiting an increase in the load of a reproduction process.
First information about a change in a relationship of a point
cloud expressing an object having a three-dimensional shape
for three-dimensional spatial regions that are independently
decodable is generated, second information about the three-
dimensional spatial regions is generated in accordance with
the first information, and a file storing a bit stream of
encoded data acquired by encoding the point cloud, the first
information, and the second information is generated. In
addition, the first information stored in the file is referred to,
and, in a case in which the relationship described above is
static, data of tiles composing the three-dimensional spatial
regions constructing a point cloud is extracted on the basis
of the second information, and the data is decoded.

6 Claims, 42 Drawing Sheets

(56) References Cited

FOREIGN PATENT DOCUMENTS

| WO | WO-2020101021 | A1 | 5/2020 |
| WO | WO-2020251019 | A1 | 12/2020 |

OTHER PUBLICATIONS

"Text of 1S0/IEC DIS 23090-18 Carriage of Geometry-based Point Cloud Compression Data", Nov. 2, 2020 (Nov. 2, 2020), XP030291610.

Ryohei Takahashi et al: "Improvements on partial access of G-PCC data", Jan. 6, 2021 (Jan. 6, 2021), XP030290763.

Sejin Oh (Lge) et al: "[40.1] On Partial Access of G-PCC Data", Oct. 7, 2020 (Oct. 7, 2020), XP030292482.

International Search Report and Written Opinion mailed on Mar. 1, 2022, received for PCT Application PCT/JP2021/045447, filed on Dec. 10, 2021, 8 pages including English Translation.

"Information technology—Coding of audio-visual objects—Part 12:ISO base media file format", ISO/IEC 14496-12, Dec. 15, 2015, 388 pages.

"Information technology—MPEG-I (Coded Representation of Immersive Media)—Part 9: Geometry-based Point Cloud Compression", ISO/IEC 23090-9:2020(E), ISO/IEC JTC 1/SC 29/WG 11, 2020, pp. 1-119.

"Information technology—Coded representation of immersive media (MPEG-I)—Part 18: Carriage of Geometry-based Point Cloud Compression Data", ISO/IEC JTC 1/SC 29, ISO/IEC DIS 23090-18, 2021, pp. 1-37.

* cited by examiner

Fig. 4

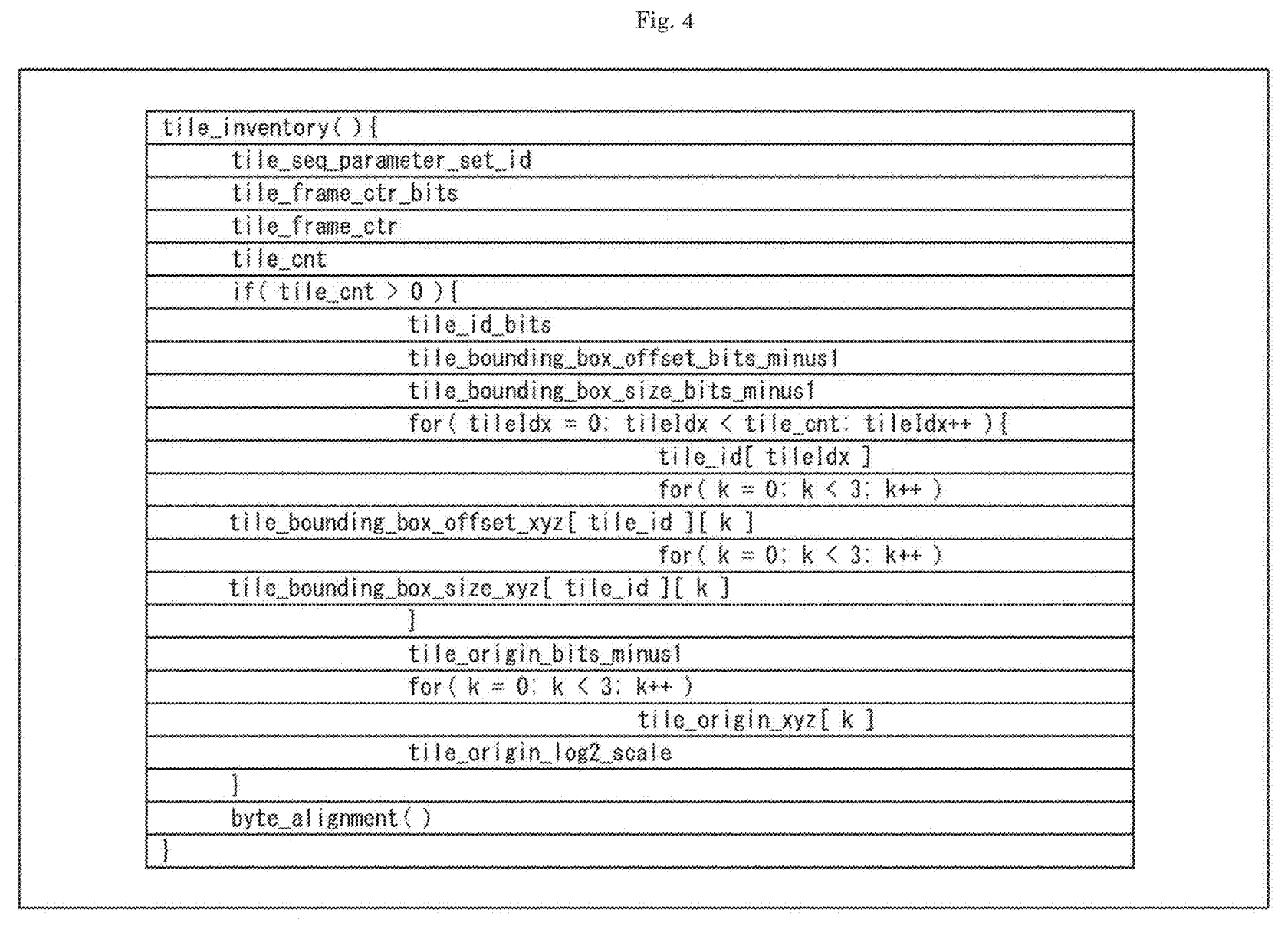

```
tile_inventory( ) {
    tile_seq_parameter_set_id
    tile_frame_ctr_bits
    tile_frame_ctr
    tile_cnt
    if( tile_cnt > 0 ) {
        tile_id_bits
        tile_bounding_box_offset_bits_minus1
        tile_bounding_box_size_bits_minus1
        for( tileIdx = 0; tileIdx < tile_cnt; tileIdx++ ) {
            tile_id[ tileIdx ]
            for( k = 0; k < 3; k++ )
                tile_bounding_box_offset_xyz[ tile_id ][ k ]
            for( k = 0; k < 3; k++ )
                tile_bounding_box_size_xyz[ tile_id ][ k ]
        }
        tile_origin_bits_minus1
        for( k = 0; k < 3; k++ )
            tile_origin_xyz[ k ]
        tile_origin_log2_scale
    }
    byte_alignment( )
}
```

Fig. 9

```
aligned(8) class GPCCSpatialRegionInfoBox extends FullBox('gpsr', 0, 0) {
    unsigned int(15)   num_regions;
    unsigned int(1)    tile_id_present;
    for (int i=0; i<num_regions; i++) {
        3DSpatialRegionStruct(1);
        if(tile_id_present) {
            unsigned int(16) num_tiles;
            for (int j=0; j<num_tiles; j++)
                unsigned int(16) tile_id;
        }
    }
}
```

Fig. 10

```
aligned(8) class 3DSpatialRegionStruct(dimension_included) {
    unsigned int(16) 3d_region_id;

unsigned int(16)          anchor_x;
    unsigned int(16)          anchor_y;
    unsigned int(16)          anchor_z;

if (dimension_included)
    {
        unsinged int(16)          region_dx;
        unsinged int(16)          region_dy;
        unsinged int(16)          region_dz;
    }
}
```

Fig. 11

```
aligned(8) class GPCCTileSampleEntry
         extends VolumetricVisualSampleEntry('gpt1'){
unsigned int(1) dynamic_tile_flag;
bit(7) reserved = 0;
if(!dynamic_tile_flag){
  unsigned int(16) num_tiles_in_track;
  for(i=0; i < num_tiles_in_track; i++){
    unsigned int(16) tile_id;
  }
}
GPCCTileConfigurationBox config;  // optional
GPCCComponentInfoBox type;          // optional
}
```

Fig. 13

| 1 | TRANSMIT FIRST INFORMATION ABOUT CHANGE OF RELATIONSHIP IN TIME DIRECTION IN 3D SPATIAL REGION AND SECOND INFORMATION ABOUT 3D SPATIAL REGION GENERATED IN ACCORDANCE WITH FIRST INFORMATION | |
|---|---|---|
| | 1-1 | FIRST INFORMATION: INFORMATION INDICATING WHETHER RELATIONSHIP INCLUDING SPATIAL POSITIONAL RELATION BETWEEN 3D SPATIAL REGIONS IS STATIC IN TIME DIRECTION<br>SECOND INFORMATION: 3DBoundingSpaceStruct GENERATED IN CASE IN WHICH FIRST INFORMATION IS TRUE |
| | 1-1-1 | FIRST INFORMATION: static_region_relation FLAG |
| | 1-1-2 | FIRST INFORMATION: static_mapping FLAG |
| | 1-1-3 | SECOND INFORMATION: SECOND INFORMATION: DynamicGPCC3DSpatialRegionSample IN WHICH CORRESPONDENCE RELATION BETWEEN STATIC 3D SPATIAL REGION AND INFORMATION USED FOR ACQUIRING TILE IS DESCRIBED IN CASE IN WHICH FIRST INFORMATION IS TRUE |
| | 1-2 | FIRST INFORMATION: INFORMATION INDICATING WHETHER RELATIONSHIP INCLUDING SPATIAL POSITIONAL RELATION BETWEEN 3D SPATIAL REGIONS IS STATIC IN TIME DIRECTION<br>SECOND INFORMATION: 3DSpatialRegionStruct IN WHICH REFERENCE POINT POSITION OF 3D SPATIAL REGION IS FIXED IN CASE IN WHICH FIRST INFORMATION IS TRUE |
| | 1-3 | FIRST INFORMATION: INFORMATION INDICATING WHETHER RELATIONSHIP INCLUDING SPATIAL POSITIONAL RELATION BETWEEN 3D SPATIAL REGIONS IS STATIC IN TIME DIRECTION<br>SECOND INFORMATION: 3DSpatialRegionStruct IN WHICH CENTER POSITION OF 3D SPATIAL REGION IS FIXED IN CASE IN WHICH FIRST INFORMATION IS TRUE |
| | 1-4 | FIRST INFORMATION: INFORMATION INDICATING WHETHER RELATIONSHIP INCLUDING CORRESPONDENCE RELATION BETWEEN 3D SPATIAL REGION AND INFORMATION USED FOR ACQUIRING TILE IS STATIC IN TIME DIRECTION<br>SECOND INFORMATION: DynamicGPCC3DSpatialRegionSample IN WHICH CORRESPONDENCE RELATION BETWEEN 3D SPATIAL REGION AND INFORMATION USED FOR ACQUIRING TILE IS OMITTED IN CASE IN WHICH FIRST INFORMATION IS TRUE |
| | 1-4-1 | FIRST INFORMATION: static_tile_mapping FLAG |
| | 1-4-2 | FIRST INFORMATION: static_mapping FLAG |
| | 1-4-3 | SECOND INFORMATION: DynamicGPCC3DSpatialRegionSample IN WHICH NUMBER OF STATIC 3d SPATIAL REGION IS DESCRIBED IN CASE IN WHICH FIRST INFORMATION IS TRUE |
| | 1-5 | COMBINATION |
| 2 | TRANSMISSION USING MPD | |
| 3 | TRANSMISSION USING MATROSKA MEDIA CONTAINER | |

Fig. 16

```
aligned(8) class DynamicGPCC3DSpatialRegionSampleEntry
extends MetaDataSampleEntry('gpdr')
{
    GPCCSpatialRegionInfoBox(); //INITIAL VALUE
    unsigned int(1) static_region_relation;
    bit(7) reserved = 0;
    if(static_region_relation)
        3DBoundingSpaceStruct();
}
```

Fig. 17

```
aligned(8) DynamicGPCC3DSpatialRegionSample () {
    unsigned int(16) num_regions;
    for (int i=0; i < num_regions; i++) {
        3DSpatialRegionStruct(1);
        unsigned int(16) num_tiles;
        for(int j=0; j < num_tiles; j++)
            unsigned int(32) tile_id;
    }
}
```

Fig. 18

```
aligned(8) class 3DBoundingSpaceStruct() {
    unsigned int NumRegions = num_regions;
    //from GPCCSpatialRegionInfoBox in the sample entry
    for (int i=0; i < NumRegions; i++)
        3DSpatialRegionStruct(i);
}
```

Fig. 19

```
aligned(8) DynamicGPCC3DSpatialRegionSample() {
    unsigned int(16) num_regions;
    for(int i=0; i < num_regions; i++) {
        3DSpatialRegionStruct(i);
        unsigned int(16) num_tile_tracks;
        for(int j=0; j < num_tile_tracks; j++)
            unsigned int(32) tile_track_id;
    }
}
```

Fig. 20

```
aligned(8) class DynamicGPCC3DSpatialRegionSampleEntry
extends MetaDataSampleEntry('gpdr')
{
    GPCCSpatialRegionInfoBox(); //INITIAL VALUE
    unsigned int(1) static_mapping;
    bit(7) reserved = 0;
    if(static_mapping)
        3DBoundingSpaceStruct();
}
```

Fig. 22

```
aligned(8) class 3DSpatialRegionStruct(anchor_included, dimension_included) {
    unsigned int(16) 3d_region_id;
    if(anchor_included)
    {
        unsinged int(16)    anchor_x;
        unsinged int(16)    anchor_y;
        unsinged int(16)    anchor_z;
    }
    if (dimension_included)
    {
        unsinged int(16)    region_dx;
        unsinged int(16)    region_dy;
        unsinged int(16)    region_dz;
    }
}
```

Fig. 24

```
aligned(8) class DynamicGPCC3DSpatialRegionSampleEntry
extends MetaDataSampleEntry('gpdr')
{
  GPCCSpatialRegionInfoBox(): //INITIAL VALUE
  unsigned int(1) static_tile_mapping;
  bit(6) reserved = 0;
}
```

Fig. 25

```
aligned(8) DynamicGPCC3DSpatialRegionSample() {
    unsigned int(16) num_regions;
    for (int i=0; i < num_regions; i++) {
        3DSpatialRegionStruct(1);
        if(!static_tile_mapping) {
            unsigned int(16) num_tiles;
            for(int j=0; j < num_tiles; j++)
                unsigned int(32) tile_id;
        }
    }
}
```

Fig. 26

```
aligned(8) DynamicGPCC3DSpatialRegionSample(){
    unsigned int(16) num_regions;
    for (int i=0; i < num_regions; i++){
        3DSpatialRegionStruct(1);
        if(!static_tile_mapping){
            unsigned int(16) num_tile_tracks;
            for(int j=0; j < num_tile_tracks; j++)
                unsigned int(32) tile_track_id;
        }
    }
}
```

Fig. 27

```
aligned(8) class DynamicGPCC3DSpatialRegionSampleEntry
extends MetaDataSampleEntry('gpdr')
{

GPCCSpatialRegionInfoBox(); //INITIAL VALUE
unsigned int(1) static_mapping;
bit(7) reserved = 0;
}
```

Fig. 28

```
aligned(8) DynamicGPCC3DSpatialRegionSample(){
  unsigned int(16) num_regions;
  for (int i=0; i < num_regions; i++) {
    3DSpatialRegionStruct(1);
    if(!static_mapping){
      unsigned int(16) num_tiles;
      for (int j=0; j < num_tiles; j++)
        unsigned int(32) tile_id;
    }
  }
}
```

Fig. 29

```
aligned(8) DynamicGPCC3DSpatialRegionSample(){
  unsigned int(16) num_regions;
  for (int i=0; i < num_regions;i++) {
    3DSpatialRegionStruct(1);
    if(!static_mapping){
      unsigned int(16) num_tile_tracks;
      for(int j=0; j < num_tile_tracks;j++)
        unsigned int(32) tile_track_id;
    }
  }
}
```

Fig. 30

```
aligned(8) DynamicGPCC3DSpatialRegionSample() {
    if(! static_region_relation) {
        unsigned int(16) num_regions_dynamic;
        unsigned int NumRegions = num_regions_dynamic;
    } else
        unsigned int NumRegions = num_regions; // from GPCCSpatialRegionInfoBox in the sample entry for (int i=0; i < NumRegions; i++) {
        3DSpatialRegionStruct(1);
        if(! static_region_relation) {
            unsigned int(16) num_tiles;
            for(int j=0; j < num_tiles; j++)
                unsigned int(32) tile_id;
        }
    }
}
```

Fig. 31

```
aligned(8) DynamicGPCC3DSpatialRegionSample(){
  if(! static_region_relation) {
    unsigned int(16) num_regions_dynamic;
    unsigned int NumRegions = num_regions_dynamic;
  } else
    unsigned int NumRegions = num_regions; // from GPCCSpatialRegionInfoBox in the sample entry for (int i=0; i < NumRegions; i++) {
    3DSpatialRegionStruct(1);
    if(! static_region_relation) {
      unsigned int(16) num_tile_tracks;
      for(int j=0; j < num_tile_tracks; j++)
        unsigned int(32) tile_track_id;
    }
  }
}
```

Fig. 32

```
aligned(8) DynamicGPCC3DSpatialRegionSample() {
  if(!static_mapping) {
    unsigned int(16) num_regions_dynamic;
    unsigned int NumRegions = num_regions_dynamic;
  } else
    unsigned int NumRegions = num_regions; // from GPCCSpatialRegionInfoBox in the sample entry for (int i=0; i < NumRegions; i++) {
    3DSpatialRegionStruct(1);
    if(!static_mapping) {
      unsigned int(16) num_tiles;
      for(int j=0; j < num_tiles; j++)
        unsigned int(32) tile_id;
    }
  }
}
```

Fig. 33

```
aligned(8) DynamicGPCC3DSpatialRegionSample() {
  if(!static_mapping) {
    unsigned int(16) num_regions_dynamic;
    unsigned int NumRegions = num_regions_dynamic;
  } else
    unsigned int NumRegions = num_regions; // from GPCCSpatialRegionInfoBox in the sample entry for (int i=0; i < NumRegions; i++) {
    3DSpatialRegionStruct(1);
    if(!static_mapping) {
      unsigned int(16) num_tile_tracks;
      for(int j=0; j < num_tile_tracks; j++)
        unsigned int(32) tile_track_id;
    }
  }
}
```

Fig. 34

```
aligned(8) class DynamicGPCC3DSpatialRegionSampleEntry
extends MetaDataSampleEntry('gpdr')
{
    GPCCSpatialRegionInfoBox(); //INITIAL VALUE
    unsigned int(1) static_region_relation;
    unsigned int(1) static_tile_mapping;
    bit(6) reserved = 0;
    if(static_region_relation)
        3DBoundingSpaceStruct();
}
```

Fig. 35

| Elements and attributes for GPCCSpatialRegions descriptor | Use | Data type | Description |
|---|---|---|---|
| @staticMapping | M | xs:boolean | 0: SPATIAL POSITIONAL RELATION OF EACH 3D SPATIAL REGION IS NOT MAINTAINED, AND MAPPING BETWEEN 3D SPATIAL REGION AND ADAPTATION SET DYNAMICALLY CHANGE |
| | | | 1: SPATIAL POSITIONAL RELATION OF EACH 3D SPATIAL REGION IS MAINTAINED, AND MAPPING BETWEEN 3D SPATIAL REGION AND ADAPTATION SET DOES NOT CHANGE |

Legend:
For attributes: M=Mandatory, O=Optional, OD=Optional with Default Value, CM=Conditionally Mandatory.
For elements: <minOccurs>..<maxOccurs> (N=unbounded)
Elements are bold: attributes are non-bold and preceded with an @.

INFORMATION PROCESSING DEVICE AND METHOD

CROSS-REFERENCE TO RELATED APPLICATIONS

The present application is based on PCT filing PCT/JP2021/045447, filed Dec. 10, 2021, which claims priority to U.S. Provisional Application No. 63/128,498, filed Dec. 21, 2020, the entire contents of each are incorporated herein by reference.

TECHNICAL FIELD

The present disclosure relates to an information processing device and a method, and more particularly, to an information processing device and a method capable of inhibiting an increase in a load of a reproduction process.

BACKGROUND ART

Conventionally, G-PCC (Geometry-based Point Cloud Compression) that is an encoding technology for encoding a point cloud that is a set of points having position information of a three-dimensional space and attribute information (for example, a color, reflectivity, and the like) with a geometry representing a three-dimensional shape and attributes representing attribute information being divided is under standardization in MPEG-I Part 9 (ISO/IEC (International Organization for Standardization/International Electrotechnical Commission) 23090-9) (for example, see NPL 1).

In addition, there is ISOBMFF (International Organization for Standardization Base Media File Format) that is a file container specification of an international standard technology MPEG-4 (Moving Picture Experts Group-4) of moving picture compression (for example, see NPL 2).

In addition, for the purpose of efficiency of a reproduction process and network distribution from a local storage of a G-PCC bit stream that is a bit stream of encoded data encoded using this G-PCC, a method for storing a G-PCC bit stream in an ISOBMFF file is under standardization in MPEG-I Part 18 (ISO/IEC 23090-18) (for example, see NPL 3).

A G-PCC file storing a G-PCC bit stream defined in this NPL 3 has a structure for a partial access and decoding based on three-dimensional space information. The partial access is an access (extracting data from a file) to a partial point cloud that is a part of an object expressed by a point cloud (in other words, a part of point cloud data). Particularly, in a use case of distribution, by using such a partial access, data can be distributed for each track storing a partial point cloud (in other words, adaptive distribution can be realized), and it is useful for inhibiting increases in a processing load and a band load.

In such a G-PCC file, a three-dimensional spatial region (3D spatial region) can be defined as such a partial point cloud. This 3D spatial region is composed of a single or a plurality of tiles. A tile is a data unit of a point cloud that is independently decodable. In the G-PCC file, tiles composing a 3D spatial region are managed. In addition, in the G-PCC file, it is managed which track data of a certain tile is stored in. In other words, a 3D spatial region and a track storing the data are associated with each other through a tile. Thus, at the time of a partial access, on the basis of this management, a tile composing a desired 3D spatial region is specified, a track storing data of the tile is specified, and data of a desired 3D spatial region is extracted from the track.

A position, a size, a shape, a direction, a number, and the like of an object expressed by a point cloud can change in a time direction (can be formed to be dynamic). For this reason, a 3D spatial region and also a tile composing the 3D spatial region can change in a time direction (can be formed as being dynamically). In addition, a tile stored in a track can change in a time direction (can be formed as being dynamically). Thus, in a G-PCC file, information of a 3D spatial region, a tile composing the 3D spatial region, a tile stored in a track, and the like is managed as dynamical information.

CITATION LIST

Non Patent Literature

NPL 1

"Information technology—MPEG-I (Coded Representation of Immersive Media)—Part 9: Geometry-based Point Cloud Compression", SO/IEC 23090-9:2020(E), 2020 Nov. 28

NPL 2

"Information technology—Coding of audio-visual objects—Part 12: ISO base media file format", ISO/IEC 14496-12, 2015-02-20

NPL 3

Sejin Oh, Ryohei Takahashi, Youngkwon Lim, "Text of ISO/IEC DIS 23090-18 Carriage of Geometry-based Point Cloud Compression Data", ISO/IEC JTC 1/SC 29/WG 03 N0075, 2020 Nov. 2

SUMMARY

Technical Problem

However, in the method described in NPL 3, a 3D spatial region, a tile composing the 3D spatial region, a tile stored in a track, and the like can change for each frame. For this reason, at the time of a partial access, a track in which data of a desired 3D spatial region (data of a tile composing the 3D spatial region) is stored needs to be checked for each frame. For this reason, there is concern that a load of a reproduction process of a content using such a point cloud may increase.

The present disclosure is made in view of such a situation and enables inhibition of an increase in a load of a reproduction process.

Solution to Problem

An information processing device according to one aspect of the present technology is an information processing device including: a first information generating unit configured to generate first information about a change in a relationship of a point cloud expressing an object having a three-dimensional shape for three-dimensional spatial regions that are independently decodable; a second information generating unit configured to generate second information about the three-dimensional spatial regions in accordance with the first information; and a file generating unit configured to generate a file storing a bit stream of encoded data acquired by encoding the point cloud, the first information, and the second information.

An information processing method according to one aspect of the present technology is an information processing method including: generating first information about a change in a relationship of a point cloud expressing an object having a three-dimensional shape for three-dimensional spatial regions that are independently decodable; generating second information about the three-dimensional spatial regions in accordance with the first information; and generating a file storing a bit stream of encoded data acquired by encoding the point cloud, the first information, and the second information.

An information processing device according to another aspect of the present technology is an information processing device including: an extraction unit configured to refer to first information about a change in a relationship of a point cloud for three-dimensional spatial regions that are independently decodable, which is stored in a file in which a bit stream of encoded data acquired by encoding the point cloud expressing an object having a three-dimensional shape is stored, and, in a case in which the relationship is static, extract data of tiles composing the three-dimensional spatial regions constructing the point cloud on the basis of second information about the three-dimensional spatial regions generated in accordance with the first information; and a decoding unit configured to decode the extracted data.

An information processing method according to another aspect of the present technology is an information processing method including: referring to first information about a change in a relationship of a point cloud for three-dimensional spatial regions that are independently decodable, which is stored in a file in which a bit stream of encoded data acquired by encoding the point cloud expressing an object having a three-dimensional shape is stored, and, in a case in which the relationship is static, extracting data of tiles composing the three-dimensional spatial regions constructing the point cloud on the basis of second information about the three-dimensional spatial regions generated in accordance with the first information; and decoding the extracted data.

In the information processing device and the method according to one aspect of the present technology, first information about a change in a relationship of a point cloud expressing an object having a three-dimensional shape for three-dimensional spatial regions that are independently decodable is generated, second information about the three-dimensional spatial regions in accordance with the first information is generated, and a file storing a bit stream of encoded data acquired by encoding the point cloud, the first information, and the second information is generated.

In the information processing device and the method according to another aspect of the present technology, first information about a change in a relationship of a point cloud for three-dimensional spatial regions that are independently decodable, which is stored in a file in which a bit stream of encoded data acquired by encoding the point cloud expressing an object having a three-dimensional shape is stored, is referred to and, in a case in which the relationship is static, data of tiles composing the three-dimensional spatial regions constructing the point cloud on the basis of second information about the three-dimensional spatial regions generated in accordance with the first information is extracted, and the extracted data is decoded.

BRIEF DESCRIPTION OF DRAWINGS

FIG. 4 is a diagram illustrating an example of a syntax of a tile inventory.
FIG. 9 is a diagram illustrating an example of GPCCTileSampleEntry.
FIG. 10 is a diagram illustrating an example of a 3D spatial region.
FIG. 11 is a diagram illustrating an example of GPCCSpatialRegionInfoBox.
FIG. 13 is a diagram illustrating an example of information transmission based on a change in a relationship with a 3D spatial region in a time direction.
FIG. 16 is a diagram illustrating an example of DynamicGPCC3DSpatialRegionSampleEntry.
FIG. 17 is a diagram illustrating an example of DynamicGPCC3DSpatialRegionSample.
FIG. 18 is a diagram illustrating an example of 3DBoundingSpaceStruct.
FIG. 19 is a diagram illustrating an example of DynamicGPCC3DSpatialRegionSample.
FIG. 20 is a diagram illustrating an example of DynamicGPCC3DSpatialRegionSampleEntry.
FIG. 22 is a diagram illustrating an example of 3DSpatialRegionStruct.
FIG. 24 is a diagram illustrating an example of DynamicGPCC3DSpatialRegionSampleEntry.
FIG. 25 is a diagram illustrating an example of DynamicGPCC3DSpatialRegionSample.
FIG. 26 is a diagram illustrating an example of DynamicGPCC3DSpatialRegionSample.
FIG. 27 is a diagram illustrating an example of DynamicGPCC3DSpatialRegionSampleEntry.
FIG. 28 is a diagram illustrating an example of DynamicGPCC3DSpatialRegionSample.
FIG. 29 is a diagram illustrating an example of DynamicGPCC3DSpatialRegionSample.
FIG. 30 is a diagram illustrating an example of DynamicGPCC3DSpatialRegionSample.
FIG. 31 is a diagram illustrating an example of DynamicGPCC3DSpatialRegionSample.
FIG. 32 is a diagram illustrating an example of DynamicGPCC3DSpatialRegionSample.
FIG. 33 is a diagram illustrating an example of DynamicGPCC3DSpatialRegionSample.
FIG. 34 is a diagram illustrating an example of DynamicGPCC3DSpatialRegionSampleEntry.
FIG. 35 is a diagram illustrating an example of elements of a GPCCSpatialRegions descriptor.

DESCRIPTION OF EMBODIMENTS

Hereinafter, forms for carrying out the present disclosure (hereinafter referred to as embodiments) will be described. The descriptions will be given in the following order.
1. Dynamic 3D spatial region
2. Information transmission based on change of relationship with 3D spatial region in time direction
3. Information transmission using MPD
4. Information transmission using Matroska media container
5. First embodiment (file generating device)
6. Second embodiment (reproduction device)
7. Supplement

1. Dynamic 3D Spatial Region

1-1. Documents that Support Technical Content and Technical Terms

The scope disclosed in the present technology is not limited to the content described in embodiments and also includes the content described in NPL below and the like that were known at the time of filing and the content of other literature referred to in NPL below.

NPL 1

(aforementioned)

NPL 2

(aforementioned)

NPL 3

(aforementioned)

NPL 4 https://www.matroska.org/index.html
In other words, the content in the NPL, content of other literature referred to in the above NPL, and the like are also grounds for determining support requirements.

1-2. Point Cloud

In the related art, 3D data such as a point cloud representing a three-dimensional structure by point position information, attribute information, or the like is present.

For example, in the case of a point cloud, a stereoscopic structure (an object having a three-dimensional shape) is expressed as a set of multiple points. The point cloud is composed of position information (also referred to as a geometry) and attribute information (also referred to as attributes) of each point. The attributes can include arbitrary information. For example, color information, reflectance information, normal line information, and the like of each point may be included in the attributes. In this manner, according to the point cloud, a data structure is relatively simple, and it is possible to express an arbitrary stereoscopic structure with sufficient accuracy by using a sufficiently large number of points.

1-3. Overview of G-PCC

In NPL 1, an encoding technology called Geometry-based Point Cloud Compression (G-PCC) that encodes this point cloud by dividing it into a geometry and an attribute is disclosed. The G-PCC is under standardization in MPEG-I Part 9 (ISO/IEC 23090-9).

For example, octree encoding is applied to compression of a geometry. The octree encoding is an encoding system that performs encoding by converting a data structure of a geometry into an octree as illustrated on a right side in FIG. 1.

Figure 1:
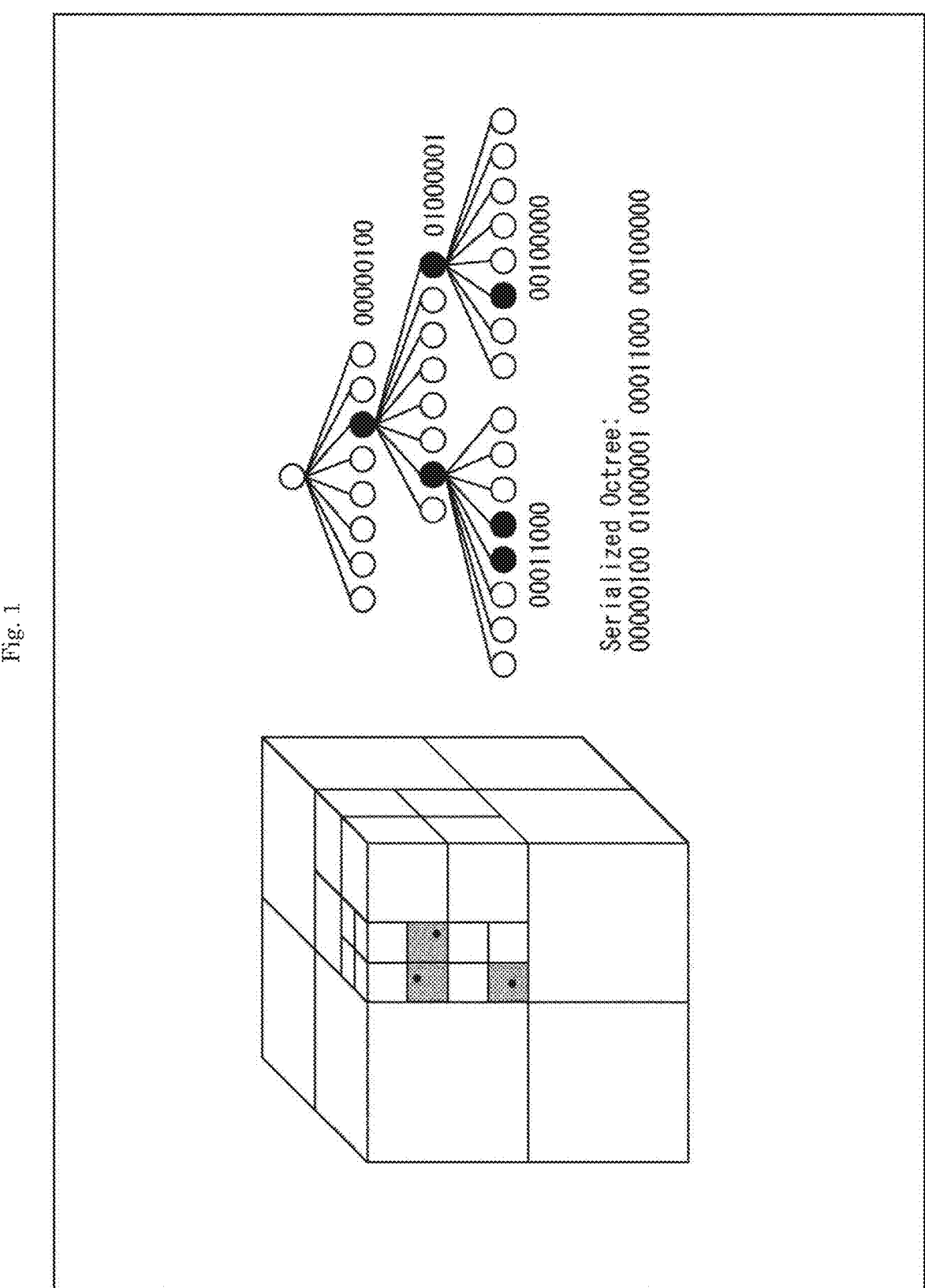
FIG. 1 is a diagram illustrating an overview of G-PCC.

In this case, the geometry is expressed using a voxel that is a three-dimensional region having a rectangular parallelepiped shape (including a cubic shape) of a hierarchical structure as illustrated on a left side in FIG. 1. In other words, it is expressed whether a point is present for each voxel. A voxel in which a point is present is divided, and presence/absence of a point in a small region after the division (a voxel of a low ranking) is expressed. For a voxel in which a point is present, such division is recursively repeated up to a lowest layer, whereby a hierarchical structure of voxels is formed.

The octree expresses such a voxel expression (presence/absence of a point for each voxel) as an octree as illustrated on the right side in FIG. 1. Each node of an octree corresponds to each voxel of a voxel expression. For example, a node corresponding to a voxel in which a point is present is expressed as a value "1", and a node corresponding to a voxel in which no point is present is expressed as a value "0". In a node (a node of the value "1") corresponding to a voxel in which a point is present, a child node (a one-ranking lower node) is formed.

A bit stream of encoded data generated by encoding a geometry as described above will be also referred to as a geometry bit stream.

A technique such as Predicting Weight Lifting, Region Adaptive Hierarchical Transform (RAHT), Fix Weight Lifting, or the like is applied to compression of an attribute. A bit stream of encoded data generated by encoding an attribute is also referred to as an attribute bit stream. In addition, a bit stream acquired by combining a geometry bit stream and an attribute bit stream as one will be also referred to as a G-PCC bit stream.

1-4. Tile

The G-PCC bit stream can have a partial access structure in which bit streams of some points are decoded independently from the others and reproduced. As data units that are independently decodable and reproduced (that can be independently accessed) in a point cloud of this partial access structure, there are a tile and a slice.

Figure 2:
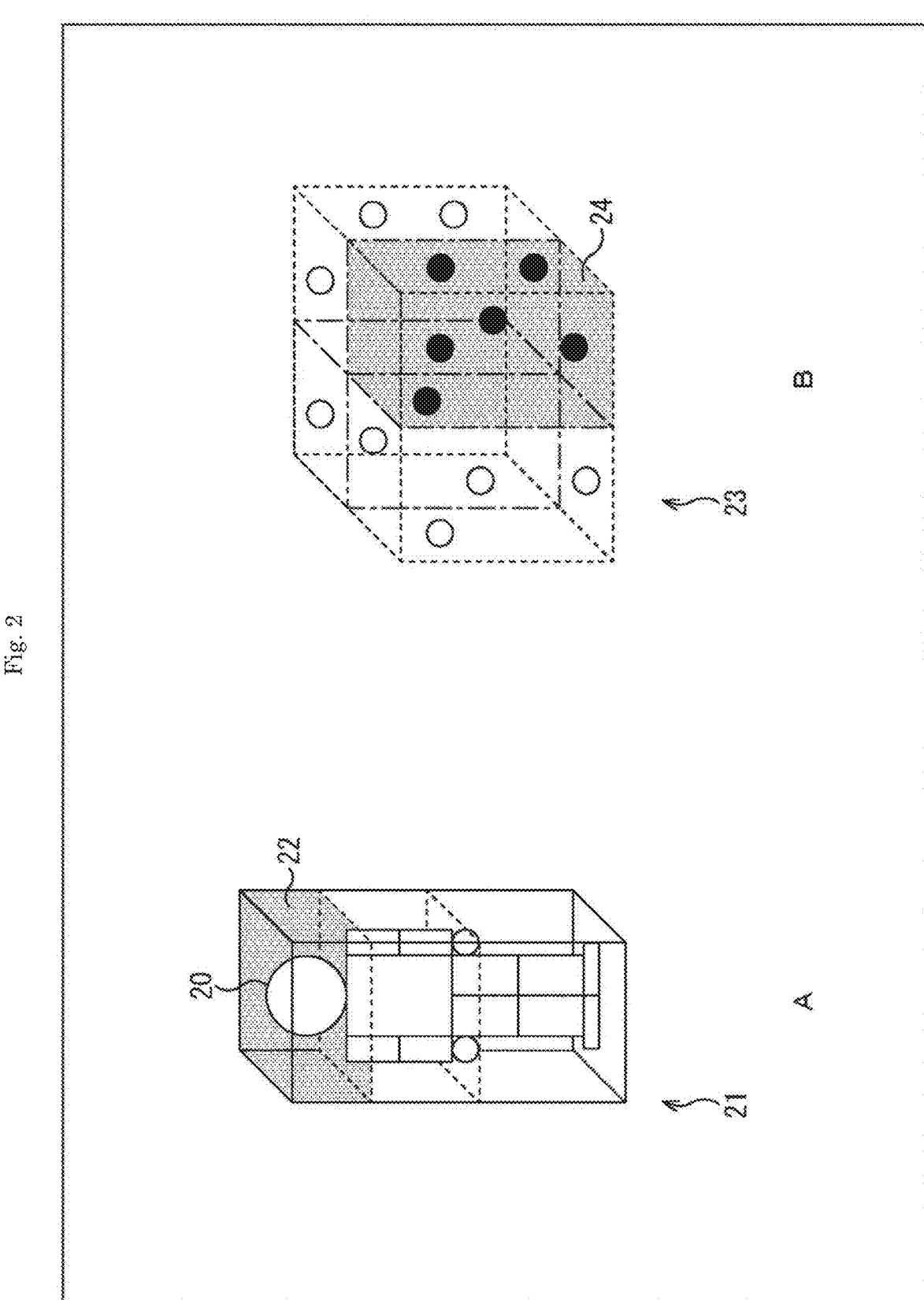
FIG. 2 is a diagram illustrating a partial access.

As illustrated in A of FIG. 2, a bounding box 21 is set such that an object 20 having a three-dimensional shape is included therein. A tile 22 is a region having a rectangular parallelepiped shape (including a cubic shape) inside the bounding box 21. As illustrated in B of FIG. 2, a slice 24 is a set of points inside the tile 23. Points may overlap between slices (in other words, one point may belong to a plurality of slices). A tile is composed of a single slice or a plurality of slices (1 tile=Y slice(s)).

A point cloud of a certain time will be referred to as a point cloud frame. This frame is in a data unit corresponding to a frame in a two-dimensional moving image. A point cloud frame is composed of a single tile or a plurality of tiles (1 point cloud frame=X tile(s)).

1-5. G-PCC Bit Stream of Partial Access Structure

Figure 3:
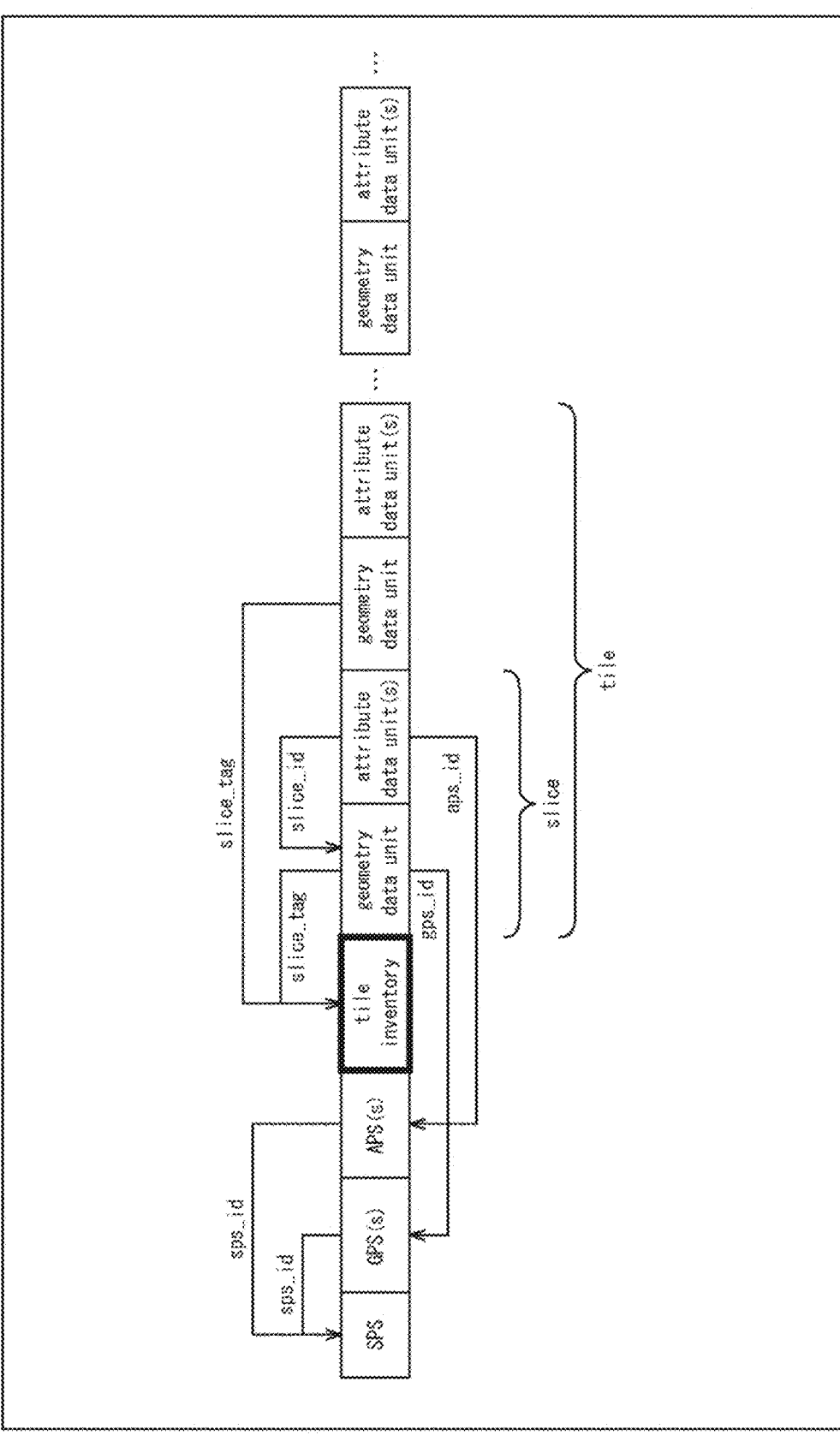
FIG. 3 is a diagram illustrating an example of a structure of a G-PCC bit stream.

In NPL 1, an example of a main structure (also referred to as a partial access structure) of a G-PCC bit stream acquired by encoding a point cloud to which such a partial access can be made is illustrated. The structure example is illustrated in FIG. 3. In other words, a G-PCC bit stream illustrated in FIG. 3 has a partial access structure, and a part thereof can be extracted and decoded independently from the other part.

In FIG. 3, each quadrangle includes one Type-length-value encapsulation structure (tlv_encapsulation( )). As illustrated in FIG. 3, a G-PCC bit stream includes an SPS (Sequence Parameter Set)), a GPS (Geometry Parameter Set), an APS(s) (Attribute Parameter Set), a tile inventory, a geometry data unit, and an attribute data unit.

The sequence parameter set is a parameter set having parameters relating to the whole sequence. The geometry parameter set is a parameter set having parameters relating to a geometry. The attribute parameter set is a parameter set having parameters relating to attributes. A plurality of geometry parameter sets and a plurality of attribute parameter sets may be provided. The geometry parameter set and the attribute parameter set may have differences in units of slices (may be set in units of slices).

The tile inventory manages information relating to tiles. FIG. 4 illustrates an example of a syntax of the tile inventory. As illustrated in FIG. 4, for each tile, tile identification information (tile_id) used for identifying a tile, information about a position and a size of the tile (tile_bounding_box_offset_xyz, tile_bounding_box_size_xyz), and the like are stored in the tile inventory. The tile inventory is changeable in units of frames (can be set in units of frames).

The data unit is a data unit that can be extracted independently from the others. The geometry data unit is a data unit of a geometry. The attribute data unit is a data unit of an attribute. The attribute data unit is generated for each property included in the attribute.

A slice is composed of one geometry data unit and none or one or more of attribute data units. The slice is composed of a single data unit or a plurality of consecutive data units in a G-PCC bit stream. In each data unit, slice identification information (slice_id) representing a slice to which the data unit belongs is stored. In other words, in data units belonging to the same slice, the same slice identification information is stored. In this way, by using the slice identification information, a geometry data unit and an attribute data unit belonging to the same slice are associated with each other.

The tile is composed of a single slice or a plurality of consecutive slices in a G-PCC bit stream. Association between a slice and a tile is performed using slice_tag stored in the geometry data unit. The slice_tag is identification information representing a tile to which the slice belongs.

In the tile inventory, pieces of information such as a position, a size, and the like of a tile corresponding to each piece of tile identification information on a three-dimensional space are associated with each other. In other words, in a case in which a desired point on a three-dimensional space is desired to be reproduced, on the basis of this tile identification information (also the slice identification information), a necessary data unit can be specified and extracted. Accordingly, a partial access can be realized, and unnecessary information does not need to be decoded, and therefore, an increase of the load of a reproduction process can be inhibited.

1-6. ISOBMFF

In NPL 2, an ISOBMFF (International Organization for Standardization Base Media File Format) that is a specification of a file container of an international standard technology of moving image compression of MPEG-4 (Moving Picture Experts Group-4) is disclosed.

1-7. Storage of G-PCC Bit Stream in ISOBMFF

In NPL 3, for the purpose of efficiency of a reproduction process and network distribution from a local storage of a bit stream encoded in this G-PCC, a method for storing a G-PCC bit stream in the ISOBMFF is disclosed. This method is under standardization of MPEG-I Part 18 (ISO/IEC 23090-18).

Figure 5:
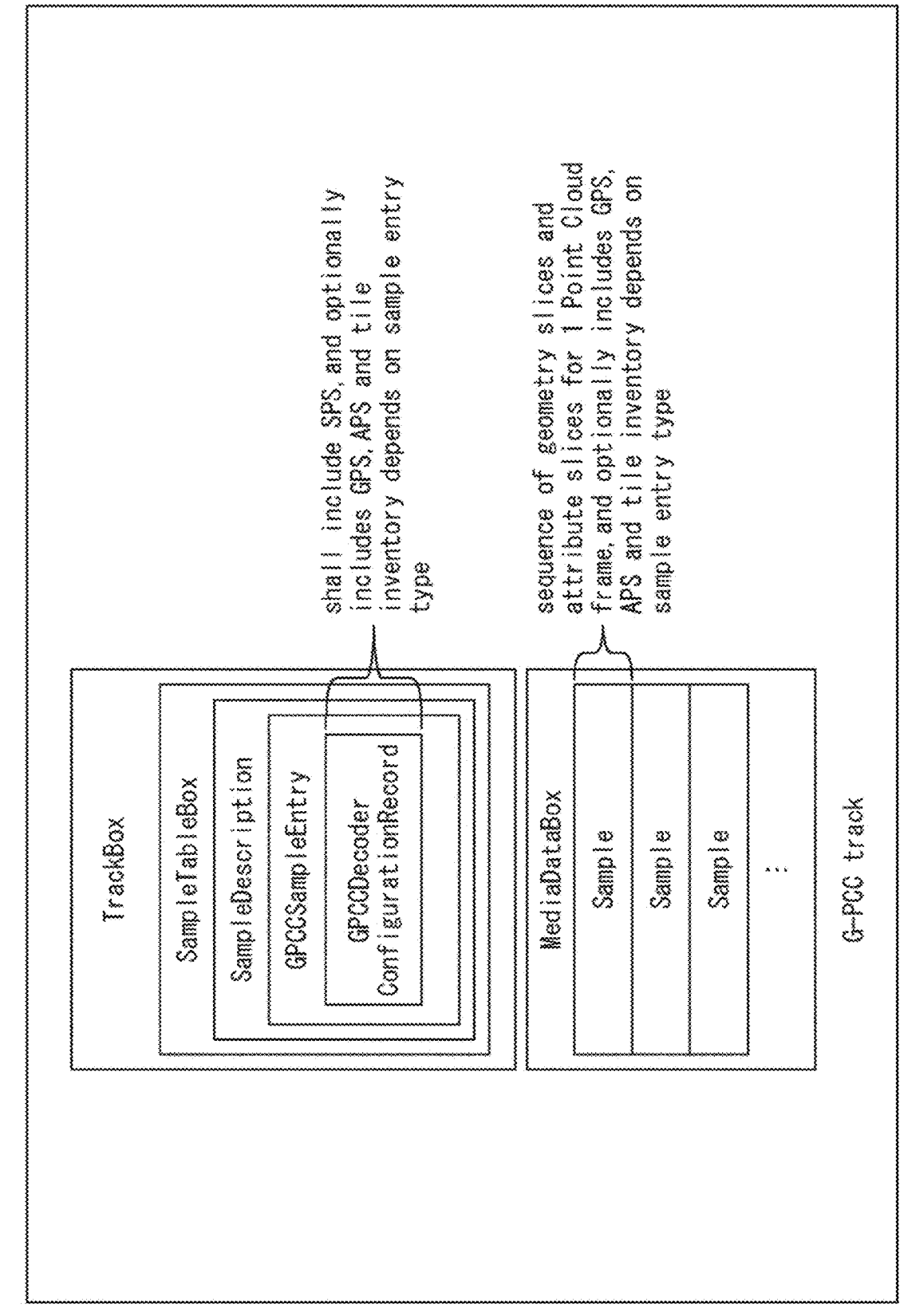
FIG. 5 is a diagram illustrating an example of a structure of a G-PCC file.

FIG. 5 is a diagram illustrating an example of a file structure of the case. A G-PCC bit stream stored in the ISOBMFF will be referred to as a G-PCC file.

A sequence parameter set is stored in GPCCDecoderConfigurationRecord of the G-PCC file. GPCCDecoderConfigurationRecord can further store a geometry parameter set, an attribute parameter set, and a tile inventory in accordance with a sample entry type.

A sample of a media data box (Media) can store geometries and attributes corresponding one point cloud frame. In addition, this sample can store a geometry parameter set, an attribute parameter set, and a tile inventory in accordance with a sample entry type.

1-8. Partial Access Structure of G-PCC File

This G-PCC file has a structure for decoding by performing a partial access on the basis of three-dimensional space information. A partial access is an access (extraction of data from a file) to a partial point cloud that is a part of an object expressed by a point cloud (in other words, a part of point cloud data). Particularly, in the case of a distribution use, by using such a partial access, data can be transmitted for each track storing a partial point cloud (in other words, adaptive distribution can be realized), and it is useful for inhibiting an increase of a processing load and a band load.

Figure 6:
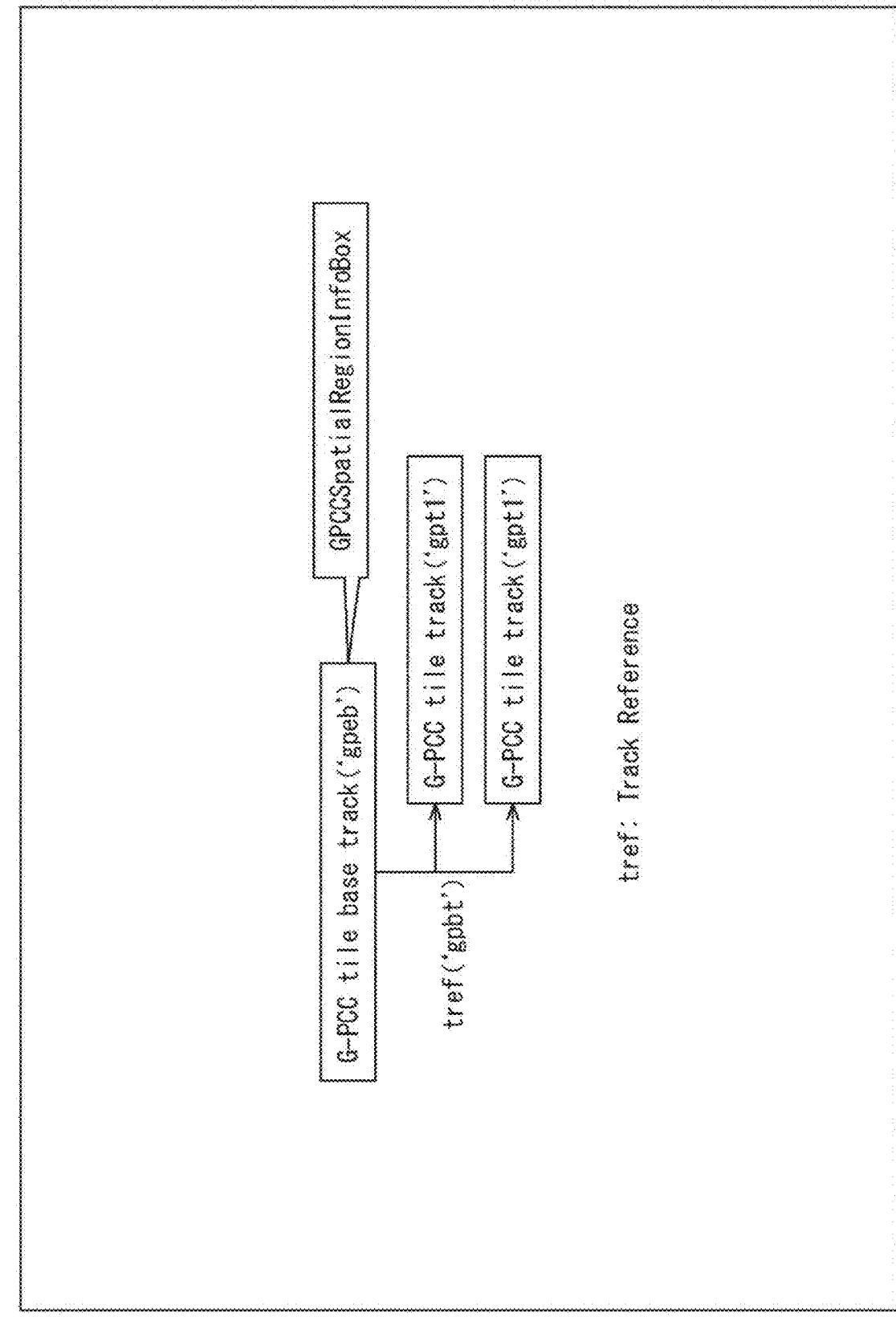
FIG. 6 is a diagram illustrating an example of a track structure of a G-PCC file.

For example, the G-PCC file, as illustrated in FIG. 6, can have a plurality of tracks that are independently accessible. The G-PCC tile track illustrated in FIG. 6 is a track storing a partial point cloud and stores data of a single tile or a plurality of tiles. The G-PCC tile base track stores information such as a parameter set, a tile inventory, and the like that are common to a G-PCC tile track associated with the track. The G-PCC tile base track and the G-PCC tile track are associated with each other using a track reference (tref).

Figure 7:
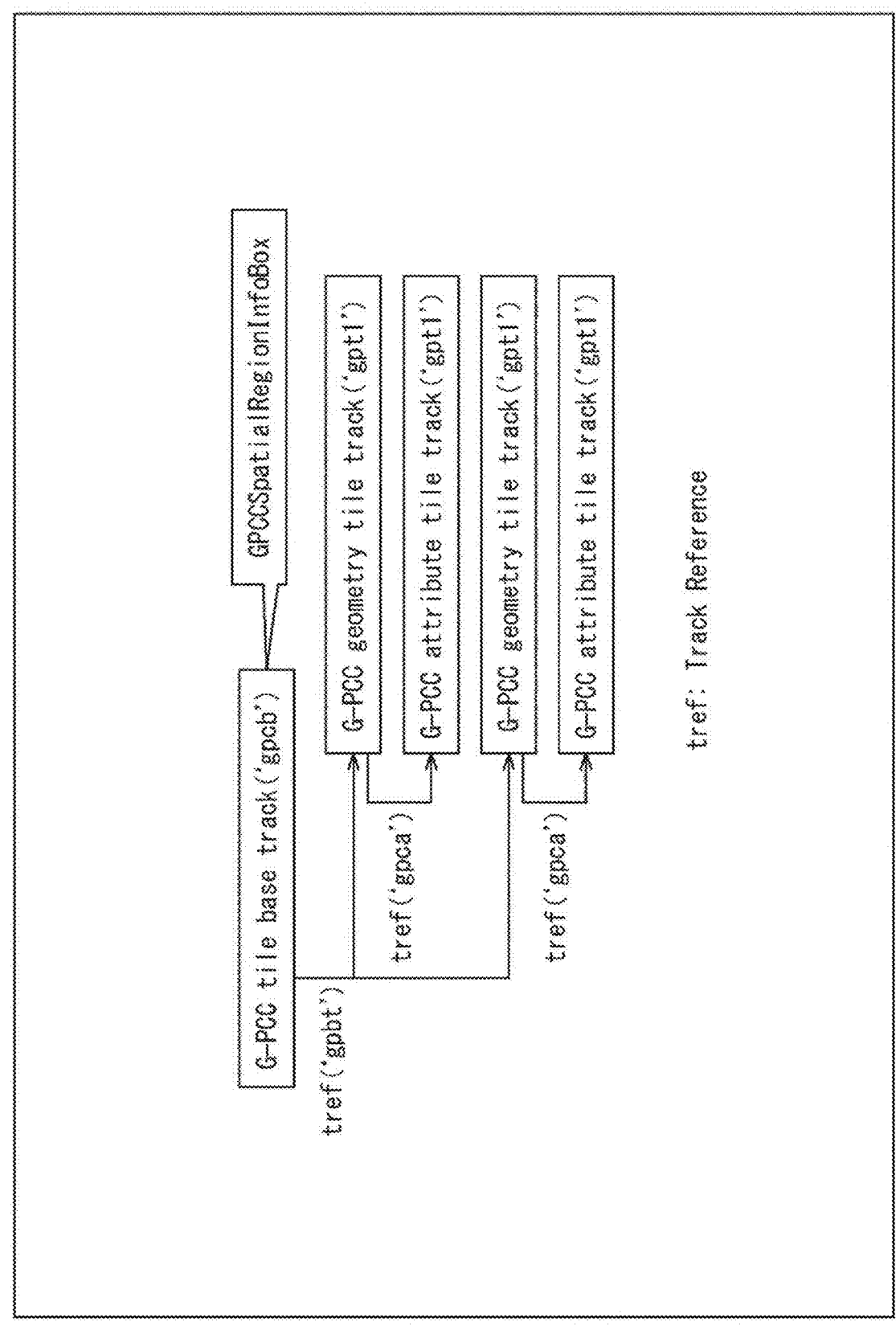
FIG. 7 is a diagram illustrating an example of a track structure of a G-PCC file.

FIG. 6 illustrates a configuration example of a case in which a geometry and an attribute are stored in one G-PCC tile track. As illustrated in FIG. 7, a geometry and an attribute may be stored in mutually-different G-PCC tile tracks. In such a case, a G-PCC geometry tile track storing a geometry and a G-PCC attribute tile track storing an attribute are associated with each other using a track reference (tref).

Figure 8:
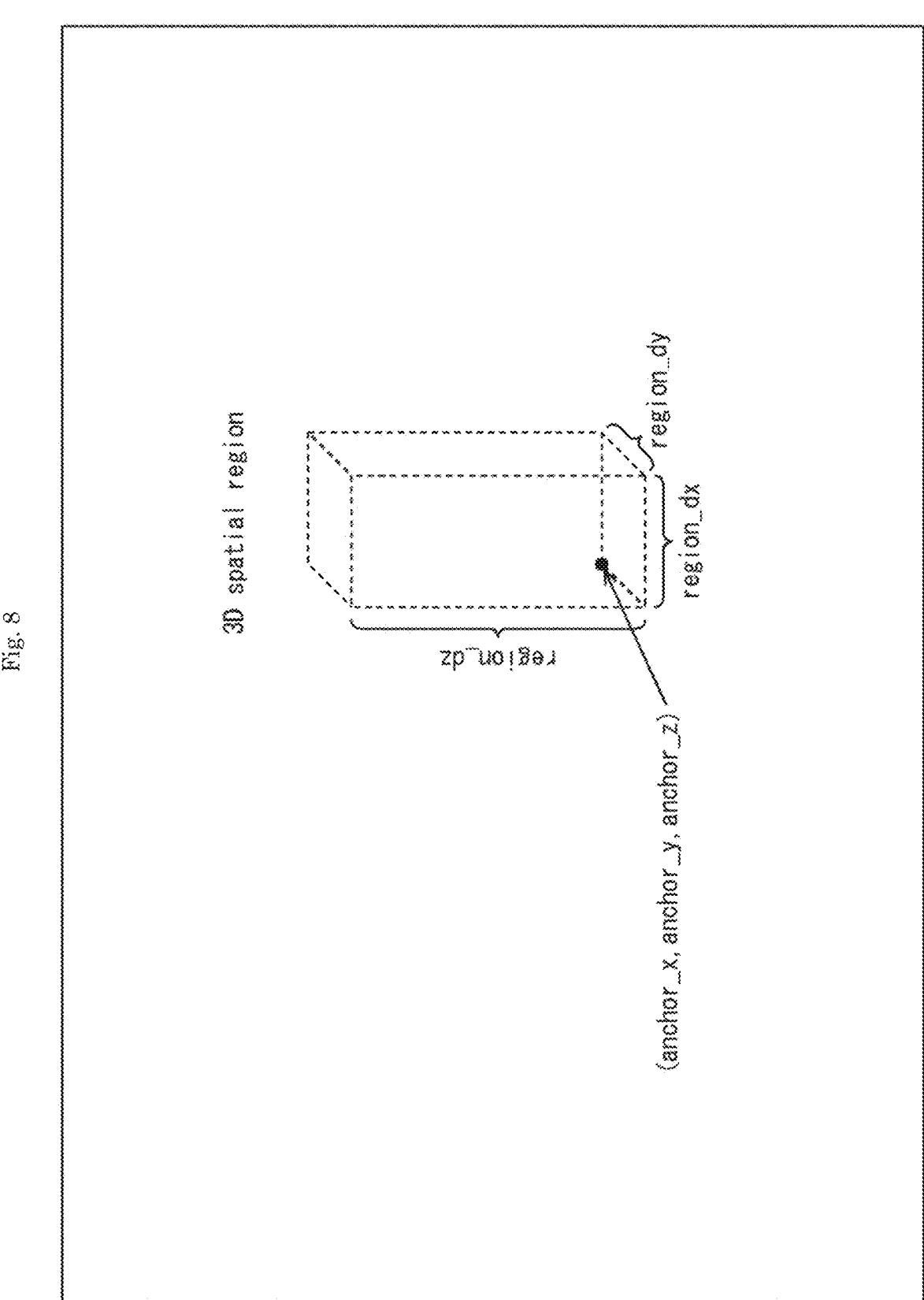
FIG. 8 is a diagram illustrating an example of GPCCSpatialRegionInfoBox.

In this G-PCC file, a three-dimensional spatial region (3D spatial region) can be defined as a partial point cloud. The 3D spatial region, as illustrated in FIG. 8, is defined by a position (three-dimensional coordinates (anchor_x, anchor_y, anchor_z) of the reference point) and a size (region_dx, region_dy, region_dz) of a reference point (anchor). Information (three-dimensional space information) relating to such a 3D spatial region is managed in a GPCC spatial region info box (GPCCSpatialRegionInfoBox) stored in a sample entry of the G-PCC tile base track.

An example of a syntax of GPCCSpatialRegionInfoBox is illustrated in FIG. 9. As illustrated in a 4th row to an 11th row from top of FIG. 9, for each 3D spatial region, information about the region is set in GPCCSpatialRegionInfo-Box. For example, as illustrated in a 5th row from the top of FIG. 9, in GPCCSpatialRegionInfoBox, a 3DSpatialRegion-Struct defining each 3D spatial region is designated. An example of a syntax of this 3DSpatialRegionStruct is illustrated in FIG. 10. As illustrated in FIG. 10, in this 3DSpatialRegionStruct, a position (anchor_x, anchor_y, anchor_z) and a size (region_dx, region_dy, region_dz) of the reference point of the 3D spatial region are set.

This 3D spatial region is composed of a single tile or a plurality of tiles. As illustrated in a 6th row to a 10th row in FIG. 9, in GPCCSpatialRegionInfoBox, a tile composing each 3D spatial region is designated using tile identification information (tile_id).

In other words, in the G-PCC file, a 3D spatial region and tiles composing the 3D spatial region are managed.

In addition, for the G-PCC tile track, tiles stored therein are managed in a GPCC tile sample entry (GPCCTileSampleEntry). An example of a syntax of GPCCTileSampleEntry is illustrated in FIG. 11. As illustrated in a 7th row to a 9th row from the top of FIG. 11, in GPCCTileSampleEntry, a tile stored in the G-PCC tile track is designated using tile identification information (tile_id).

In other words, a 3D spatial region and a track storing data thereof are associated with each other through a tile. Thus, the flow of a partial access, for example, is performed as below.

1. A decoder identifies a G-PCC tile base track and a G-PCC tile track in a G-PCC file.
2. The decoder parses a sample entry of the G-PCC tile base track and acquires tile_id of a tile composing a desired 3D spatial region from GPCCSpatialRegionIn-foBox.
3. The decoder parses sample entries of all the G-PCC tile tracks and identifies a G-PCC tile track in which a tile of a desired tile_id is stored.
4. Data of a desired tile is extracted from the identified G-PCC tile track and is decoded.

A position, a size, a shape, a direction, a number, and the like of an object expressed by a point cloud can be changed in a time direction (can be formed as being dynamically). For this reason, a 3D spatial region and tiles composing the 3D spatial region also can be changed in the time direction (can be formed as being dynamically). In addition, tiles stored in tracks can be also changed in the time direction (can be formed as being dynamically). In addition, in this specification, for example, a certain target such as information, a state, a relationship, or the like changing in a time direction will be referred to as being dynamic, and a certain target, for example, such as information, a state, a relationship, or the like not changing in a time direction will be referred to as being static.

Figure 12:
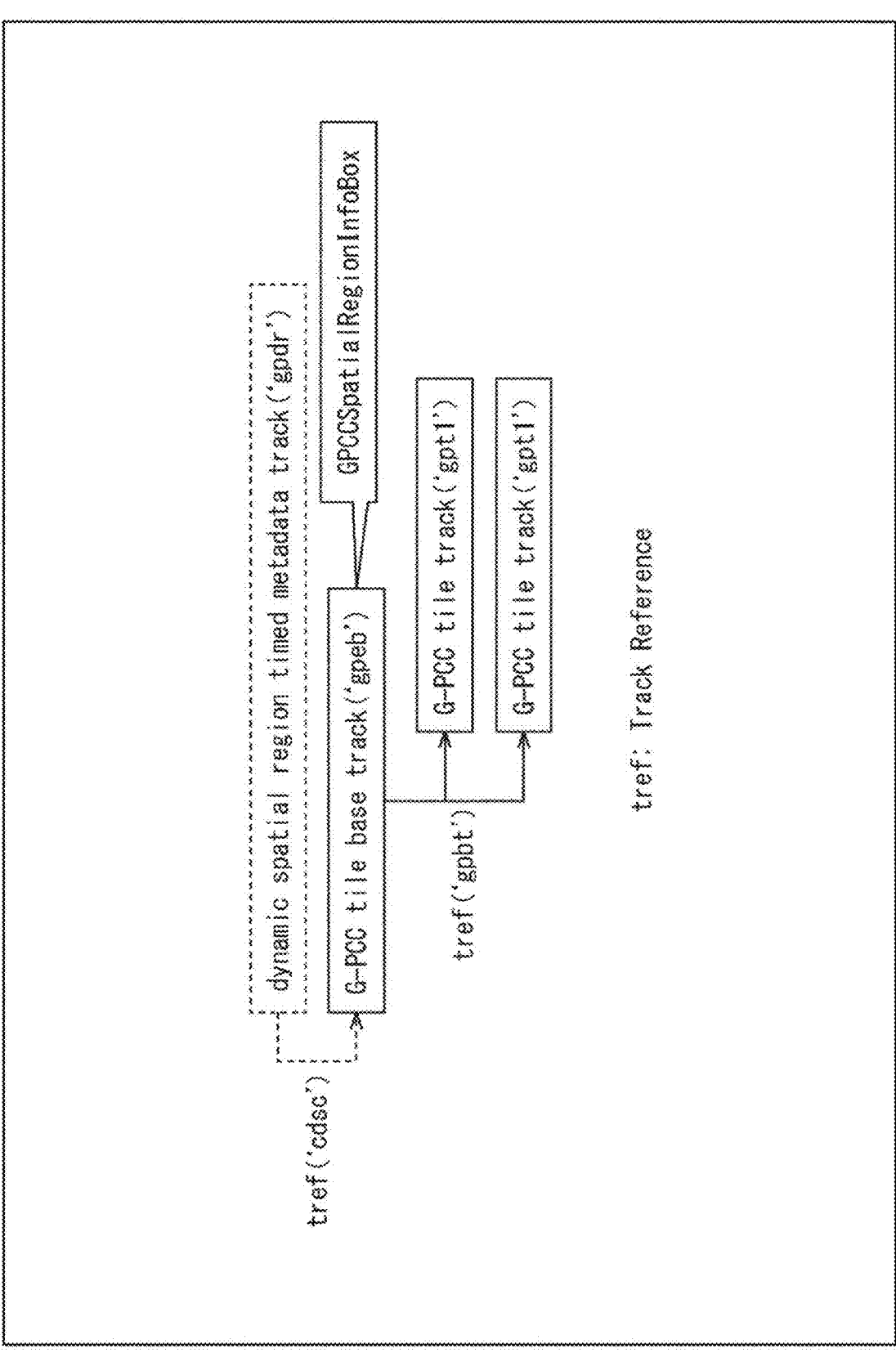
FIG. 12 is a diagram illustrating an example of 3DSpatialRegionStruct.

Static three-dimensional space information of a partial point cloud is stored in GPCCSpatialRegionInfoBox described above. Dynamic three-dimensional space information is stored in a dynamic spatial region timed metadata track associated with a G-PCC tile base track using a track reference (tref) as illustrated in FIG. 12. In addition, in a case in which a tile stored in the G-PCC tile track changes in the time direction, tile identification information (tile_id) changing in the time direction is stored in a sub sample information box.

2. Information Transmission Based on Change in Relationship with 3D Spatial Region in Time Direction

2-1. Construction of Point Cloud

However, in a case in which a 3D spatial region, tiles composing the 3D spatial region, a tile stored in each G-PCC tile track, and the like are managed as dynamic information in this way, these can be changed for each frame.

For example, a content in which an appearance of a three-dimensional spatial region, which is seen from a visual point, including an object expressed by a point cloud is provided for a user as a two-dimensional image will be considered. In this specification, a range of a three-dimensional spatial region seen from a certain visual point (seen in a case in which a certain direction is seen from a certain position) will be referred to as a visual field (or a visual field region).

For example, like so-called a 6DoF content, in a case in which a position or a direction of a visual point can be changed or a case in which a point cloud is configured as dynamic data (in other words, there is a possibility of an object changing in a time direction), there is a possibility of an object within a visual field region being transformed, being enlarged, being reduced, being moved, appearing, or disappearing. In other words, information of a 3D spatial region to be reproduced, tiles composing the 3D spatial region, tiles stored in a G-PCC tile track, and the like can be changed in the time direction. For this reason, in such a case, in a method described in NPL 3, in a G-PCC file, such information is managed as dynamic information.

In the case of the method described in NPL 3, when such information is managed as dynamic information, the information may be arbitrary changed for each frame. For this reason, such information needs to be checked for each frame. In other words, all the tracks need to be parsed for each frame.

However, also in the case of the 6Dof content or in a case in which the point cloud is dynamic, there are cases in which such a degree of freedom is unnecessary. For example, in a case in which a position and a direction of a visual point do not change, and a position of an object does not greatly change, there may be a case in which the object positioned within a visual field does not increase, decrease, or change for each frame, and a 3D spatial region to be reproduced becomes static. In addition, there may be a case in which tiles composing a 3D spatial region to be reproduced for each frame and tiles stored in a G-PCC tile track do not change.

In such a case, in the method described in NPL 3, there is concern that a load of a reproduction process may unnecessarily increase.

2-2. Transmission of First Information and Second Information

Thus, as illustrated in an uppermost part of a table illustrated in FIG. 13, first information about a change of a relationship with the 3D spatial region in a time direction and second information about a 3D spatial region generated in accordance with the first information are transmitted (Method 1).

For example, an information processing device includes a first information generating unit that generates first information about a change of a relationship of a point cloud expressing an object having a three-dimensional shape for a three-dimensional spatial region that is independently decodable, a second information generating unit that generates second information about the three-dimensional spatial region in accordance with the first information, and a file generating unit that generates a file storing a bit stream of encoded data acquired by encoding the point cloud, the first information, and the second information.

For example, an information processing method includes: generating first information about a change of a relationship of a point cloud expressing an object having a three-dimensional shape with a three-dimensional spatial region that is independently decodable; generating second information about the three-dimensional spatial region in accordance with the first information; and generating a file storing a bit stream of encoded data acquired by encoding the point cloud, the first information, and the second information.

In this way, a reproduction device can extract data of tiles composing a three-dimensional spatial region constructing a point cloud from a bit stream on the basis of the first information and the second information. In this way, reproduction can be performed without checking information of a 3D spatial region to be reproduced, tiles composing the 3D spatial region, tiles stored in a G-PCC tile track, and the like for each frame. Therefore, an increase in the load of the reproduction process can be inhibited.

For example, the information processing device further includes: an extraction unit that refers to first information about a change of a relationship of a point cloud expressing an object having a three-dimensional shape with a three-dimensional spatial region that is independently decodable, which is stored in a file in which a bit stream of encoded data acquired by encoding the point cloud and, in a case in which the relationship is static, extracts data of tiles composing a three-dimensional spatial region constructing a point cloud on the basis of the second information about the three-dimensional spatial region generated in accordance with the first information; and a decoding unit that decodes the extracted data.

For example, the information processing method further includes: referring to first information about a change of a relationship of a point cloud expressing an object having a three-dimensional shape with a three-dimensional spatial region that is independently decodable, which is stored in a file in which a bit stream of encoded data acquired by encoding the point cloud and, in a case in which the relationship is static, extracting data of tiles composing a three-dimensional spatial region constructing a point cloud on the basis of the second information about the three-dimensional spatial region generated in accordance with the first information; and decoding the extracted data.

In this way, reproduction can be performed without checking information of a 3D spatial region to be reproduced, tiles composing the 3D spatial region, tiles stored in a G-PCC tile track, and the like for each frame. Therefore, an increase in the load of the reproduction process can be inhibited.

2-3. Relationship Including Spatial Positional Relation Between 3D Spatial Regions In a case in which Method 1 is applied, as illustrated in a second section of the table illustrated in FIG. 13 from the top, the first information may be information indicating whether a relationship including a spatial positional relation between 3D spatial regions is static. In addition, the second information may be information (3DBoundingSpaceStruct) representing a presence possible range of a 3D spatial region that is generated in a case in which the first information is true (Method 1-1).

For example, a first information generating unit of the information processing device may generate information indicating whether a relationship including a positional relation in a three-dimensional space between three-dimensional spatial regions (3D spatial regions) is static as first information, and, in a case in which the first information is true, a second information generating unit of the information processing device may generate information representing a range in which the three-dimensional spatial region (3D spatial region) can be present as the second information.

In addition, the first information stored in a G-PCC file may be information indicating whether a relationship including a positional relation in a three-dimensional space (also referred to as a spatial positional relation) between three-dimensional spatial regions (3D spatial regions) is static. Furthermore, the second information stored in a G-PCC file may be static information representing a range in which the three-dimensional spatial region can be present. Then, the extraction unit of the information processing device may specify a three-dimensional spatial region (3D spatial region) constructing a point cloud on the basis of static information representing a range in which the three-dimensional spatial region (3D spatial region) can be present.

In other words, in the case of Method 1-1, a relationship with a 3D spatial region includes a spatial positional relation between 3D spatial regions. Flag information indicating whether or not the relationship is static is generated as first information and is stored in a G-PCC file. In accordance with this, it can be easily perceived whether or not a spatial positional relation between 3D spatial regions is static on the basis of the first information.

Figure 14:
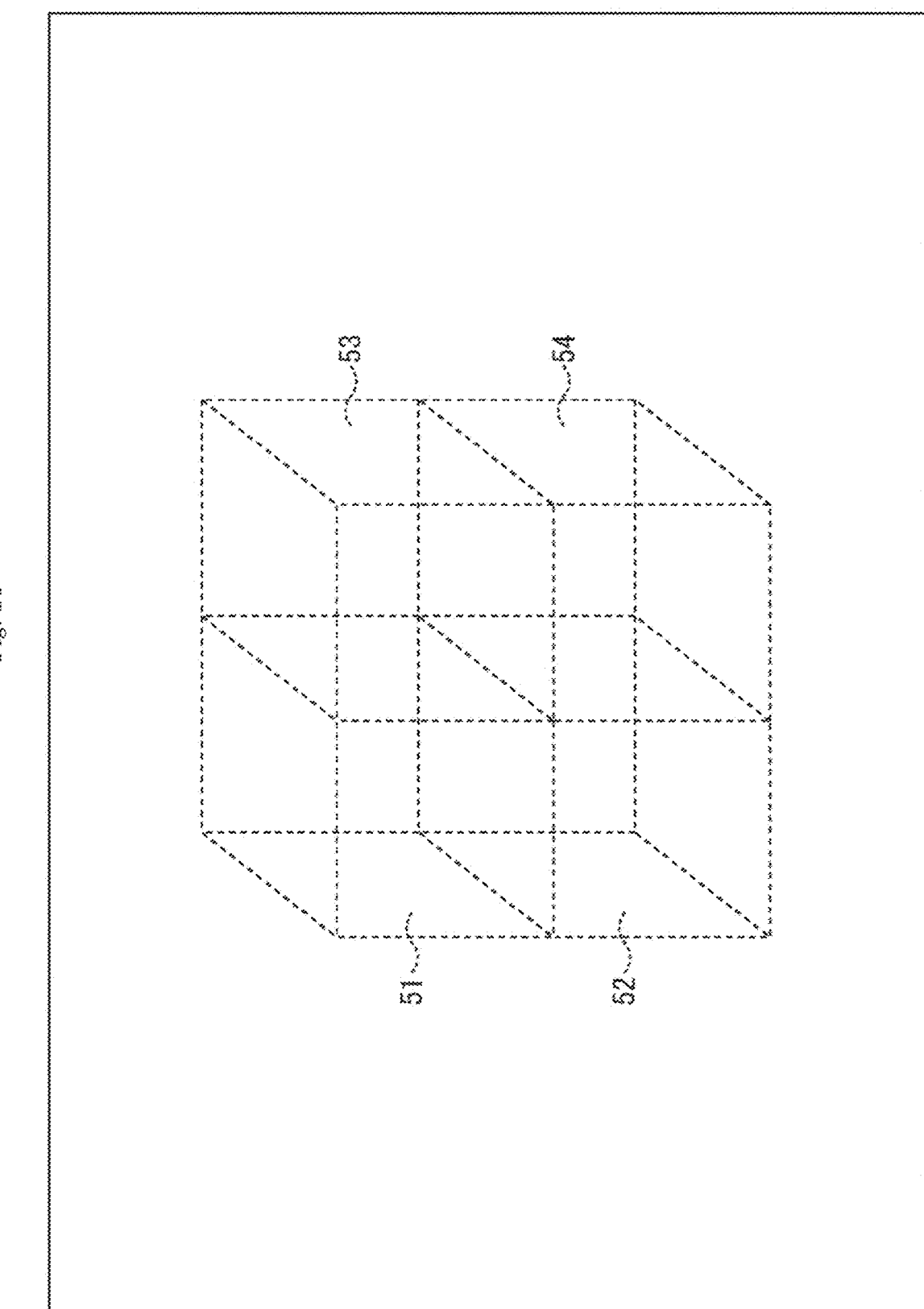
FIG. 14 is a diagram illustrating an example of a 3D bounding space.

In addition, in a case in which the first information (flag information) is true, in other words, in a case in which a relationship including a positional relation in a three-dimensional space between 3D spatial regions is static, a 3D bounding space that is a range in which each 3D spatial region can be present is set. For example, as illustrated in FIG. 14, inside a three-dimensional space, 3D bounding spaces (a 3D bounding space 51 to a 3D bounding space 54) are set to each 3D spatial region.

This 3D bounding space is a static range, and a position and a size thereof do not change in a time direction. In addition, the 3D bounding spaces are set not to overlap each other. A dynamic 3D spatial region is necessarily completely included in a 3D bounding space corresponding to the 3D spatial region regardless of the time.

Figure 15:
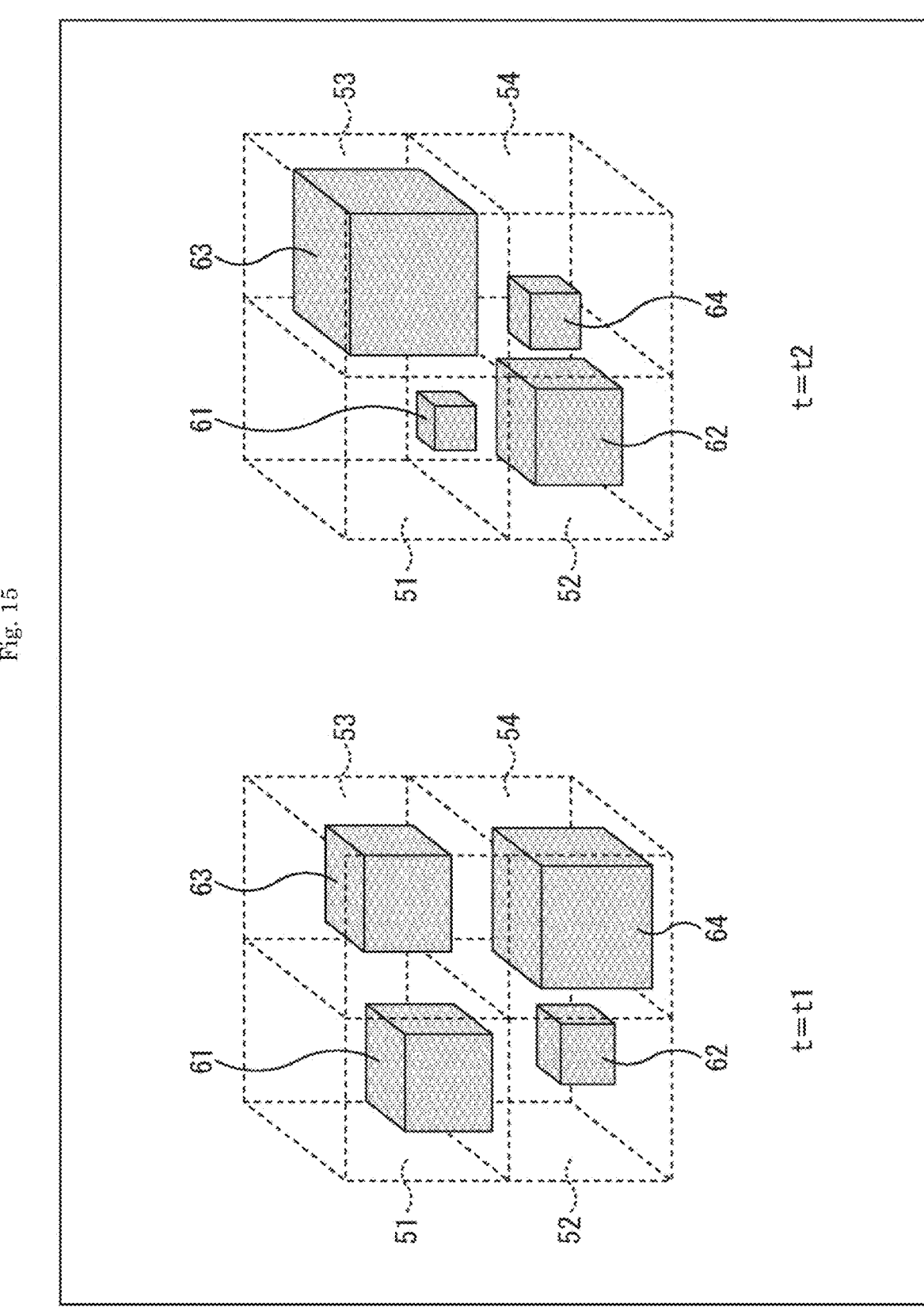
FIG. 15 is a diagram illustrating an example of a spatial positional relation of a 3D spatial region.

For example, as illustrated in FIG. 15, not only time t=t1 but also time t=t2, a 3D spatial region 61 is present (completely included) inside a 3D bounding space 51 set for the 3D spatial region 61. Similarly, a 3D spatial region 62, a 3D spatial region 63, and a 3D spatial region 64 are respectively present (completely included) inside a 3D bounding space 52, a 3D bounding space 53, and a 3D bounding space 54. In other words, a spatial positional relation between 3D spatial regions is assured by this 3D bounding space (becomes a static relation).

Then, a 3D bounding space struct (3DBoundingSpaceStruct) defining such a 3D bounding space is generated as second information and is stored in a G-PCC file. In accordance with this, a static spatial positional relation between 3D spatial regions can be easily perceived on the basis of the second information.

In other words, the reproduction device can easily perceive whether or not a relationship with 3D spatial regions including a spatial positional relation between 3D spatial regions is static and a spatial positional relation between the 3D spatial regions on the basis of the first information and the second information. Thus, the reproduction device can perform reproduction without checking information such as a 3D spatial region to be reproduced, tiles composing the 3D spatial region, tiles stored in a G-PCC tile track, and the like for each frame. Therefore, an increase in the load of the reproduction process can be inhibited.

2-4. Static_Region_Relation

In a case in which Method 1-1 is applied, as illustrated in a third section from the top of the table illustrated in FIG. 13, the first information may be information (a static_region_relation flag) indicating whether a spatial positional relation between 3D spatial regions is static (Method 1-1-1). The static_region_relation flag is information indicating whether a spatial positional relation between 3D spatial regions is static, for example, indicates that the spatial positional relation between 3D spatial regions is dynamic in a case in which the value is "0", and indicates that the spatial positional relation between 3D spatial regions is static in a case in which the value is "1". In this case, the second information (3DBoundingSpaceStruct) is generated in a case in which the value of the static_region_relation flag is "1".

In other words, by extending SampleEntry of a dynamic spatial region timed metadata track, the static_region_relation flag indicating that a spatial positional relation between 3D spatial regions is static may be stored as the first information, and 3DBoundingSpaceStruct may be stored as the second information.

For example, the first information generating unit of the information processing device may generate information (the static_region_relation flag) indicating whether a positional relation in a three-dimensional space between three-dimensional spatial regions (3D spatial regions) is static as the first information.

In addition, the first information stored in the G-PCC file may be information (the static_region_relation flag) indicating whether a positional relation in a three-dimensional space between three-dimensional spatial regions (3D spatial regions) is static.

2-4-1. Syntax Example 1

In this case, for example, the first information and the second information may be stored in a dynamic spatial region timed metadata track of the G-PCC file. An example of the syntax of the dynamic spatial region timed metadata track will be described below. Similar to the example described with reference to FIGS. 9 and 11, a 3D spatial region and a track storing data thereof are assumed to be associated with each other through a tile (through tile_id).

FIG. 16 is a diagram illustrating an example of the syntax of a dynamic GPCC3D spatial region sample entry (DynamicGPCC3DSpatialRegionSampleEntry) stored in a sample entry of a dynamic spatial region timed metadata track.

As illustrated in a 5th row from the top of the syntax illustrated in FIG. 16, a static_region_relation flag (first information) is stored in DynamicGPCC3DSpatialRegionSampleEntry. In addition, as illustrated in a 7th row and an 8th row from the top of the syntax illustrated in FIG. 16, in a case in which a value of the static_region_relation flag is "1", 3DBoundingSpaceStruct (second information) is stored in DynamicGPCC3DSpatialRegionSampleEntry.

FIG. 17 is a diagram illustrating an example of the syntax of a dynamic GPCC3D spatial region sample (DynamicGPCC3DSpatialRegionSample) stored in a dynamic spatial region timed metadata track.

As illustrated in the 3rd row to the 8th row from the top from the syntax illustrated in FIG. 17, in this DynamicGPCC3DSpatialRegionSample, in each 3D spatial region of the sample, 3DSpatialRegionStruct defining a position (anchor_x, anchor_y, anchor_z) and a size (region_dx, region_dy, region_dz) of a reference point of the 3D spatial region and a tile (tile identification information (tile_id)) composing the 3D spatial region are designated.

FIG. 18 is a diagram illustrating an example of the syntax of a 3D bounding space struct (3DBoundingSpaceStruct) stored in a dynamic spatial region timed metadata track.

As illustrated in a 4th row and a 5th row from the top of the syntax illustrated in FIG. 18, in this 3DBoundingSpaceStruct, 3DSpatialRegionStruct defining each 3D bounding space is designated. In other words, each entry of this NumRegions loop designates 3DSpatialRegionStruct of a 3D bounding space corresponding to 3DSpatialRegionStruct of an entry of the same index of a num_regions loop of GPCCSpatialRegionInfoBox of the same sample entry (SampleEntry).

Similar to the case of the 3D spatial region, this 3DSpatialRegionStruct defines a position and a size of a reference point of the 3D bounding space. In addition, as described above, the 3D bounding space is a static region, and a position and a size thereof do not change in the time direction. Thus, 3DSpatialRegionStruct defining each 3D bounding space is static information.

In addition, 3DSpatialRegionStruct and 3DSpatialRegionStruct may be associated using 3d_region_id stored in 3DSpatialRegionStruct.

In other words, in this case, as described with reference to FIG. 16, a static_region_relation flag (first information) is stored in DynamicGPCC3DSpatialRegionSampleEntry. In addition, in a case in which the value of the static_region_relation flag is "1", 3DBoundingSpaceStruct (second information) as described with reference to FIG. 18 is stored in DynamicGPCC3DSpatialRegionSampleEntry.

Thus, a reproduction device can easily perceive whether or not a spatial positional relation between 3D spatial regions is static on the basis of such information and a spatial positional relation between the 3D spatial regions. Thus, a reproduction device can perform reproduction without checking information of a 3D spatial region to be reproduced, tiles composing the 3D spatial region, tiles stored in a G-PCC tile track, and the like for each frame. Therefore, an increase in the load of the reproduction process can be inhibited.

For example, in a case in which the value of the static_region_relation flag is "1", a reproduction device can identify that a spatial positional relation between 3D spatial regions is static on the basis of the value of the flag. In addition, the reproduction device can identify the spatial positional relation on the basis of 3DBoundingSpaceStruct. Thus, for example, after a G-PCC tile track corresponding to a desired 3D spatial region is acquired in accordance with a visual field once, the reproduction device does not need to perform identification of a G-PCC tile track included in the visual field and conversion into the G-PCC tile track while the visual field is not changed.

2-4-2. Syntax Example 2

In <2-4-1. Syntax example 1>, although a 3D spatial region and a track storing data thereof have been described to be associated with each other through a tile (through tile_id), they may be associated with each other using tile track identification information (tile_track_id) for identifying a G-PCC tile track in place of this tile_id. An example of the syntax of a dynamic spatial region timed metadata track of this case will be described below.

In such a case, the syntax of DynamicGPCC3DSpatialRegionSampleEntry is the same as the example described with reference to FIG. 16. In addition, the syntax of 3DBoundingSpaceStruct is the same as the example described with reference to FIG. 18.

FIG. 19 is a diagram illustrating an example of the syntax of DynamicGPCC3DSpatialRegionSample of this case.

As illustrated in a 5th row and a 6th row from the top of the syntax illustrated in FIG. 19, in this case, as illustrated in a 7th row, tile track identification information (tile_track_id) is designated by performing a looping process using the number of G-PCC tile tracks (num_tile_tracks) corresponding to each 3D spatial region of the sample. In other words, tile track identification information (tile_track_id) of a G-PCC tile track corresponding to each 3D spatial region of the sample is designated.

By configuring as such, a reproduction device does not need to parse GPCC tile sample entries (GPCCTileSampleEntry) of all the G-PCC tile track and can identify a G-PCC tile track storing data of a tile composing a desired 3D spatial region.

2-5. Static_Mapping

In <2-4. static_region_relation>, although a case in which information (the static_region_relation flag) indicating whether a spatial positional relation between 3D spatial regions is static is applied as first information has been described, the first information is not limited to this example.

For example, in a case in which Method 1-1 is applied, as illustrated in a 4th section from the top of the table illustrated in FIG. 13, the first information may be information (the static_mapping flag) indicating whether a spatial positional relation between 3D spatial regions and a correspondence relation between a 3D spatial region and information used for acquiring a tile are static (Method 1-1-2). The static_mapping flag is information indicating whether or not a spatial positional relation between 3D spatial regions and a correspondence relation between a 3D spatial region and information used for acquiring a tile are static, and, for example, indicates that the spatial positional relation between 3D spatial regions and the correspondence relation between a 3D spatial region and the information used for acquiring a tile are dynamic in a case in which the value is "0", and indicates that the spatial positional relation between 3D spatial regions and the correspondence relation between a 3D spatial region and the information used for acquiring a tile are static in a case in which the value is "1". In this case, the second information (3DBoundingSpaceStruct) is generated in a case in which the value of the static_mapping flag is "1".

In other words, by extending SampleEntry of the dynamic spatial region timed metadata track, the static_mapping flag indicating that the spatial positional relation between 3D spatial regions and the correspondence relation between a 3D spatial region and information used for acquiring a tile are static may be stored as the first information, and 3DBoundingSpaceStruct may be stored as the second information.

For example, the first information generating unit of the information processing device may generate information (the static_mapping flag) indicating whether a positional relation in a three-dimensional space between three-dimensional spatial regions (3D spatial regions) and a correspondence relation between a three-dimensional spatial region (3D spatial region) and information used for acquiring a tile of the point cloud are static as the first information.

In addition, the first information stored in the G-PCC file may be information (the static_mapping flag) indicating whether a positional relation in a three-dimensional space between three-dimensional spatial regions (3D spatial regions) and a correspondence relation between a three-dimensional spatial region and the information used for acquiring a tile described above are static.

2-5-1. Syntax Example 1

An example of the syntax of the dynamic spatial region timed metadata track of this case will be described below. Here, similar to the example of <2-4-1. Syntax example 1>, a 3D spatial region and a track storing data thereof are assumed to be associated with each other through a tile (through tile_id).

FIG. 20 is a diagram illustrating an example of the syntax of DynamicGPCC3DSpatialRegionSampleEntry stored in a sample entry of a dynamic spatial region timed metadata track.

As illustrated in a 5th row from the top of the syntax illustrated in FIG. 20, a static_mapping flag (first information) is stored in this DynamicGPCC3DSpatialRegionSampleEntry. In addition, as illustrated in a 7th row and an 8th row from the top of the syntax illustrated in FIG. 20, in a case in which the value of the static_mapping flag is "1", 3DBoundingSpaceStruct (second information) is stored in DynamicGPCC3DSpatialRegionSampleEntry.

In this case, the syntax of DynamicGPCC3DSpatialRegionSample is the same as the example illustrated with reference to FIG. 17. In addition, the syntax of 3DBoundingSpaceStruct is the same as the example described with reference to FIG. 18.

In other words, in this case, as described with reference to FIG. 20, the static_mapping flag (first information) is stored in DynamicGPCC3DSpatialRegionSampleEntry. In addition, in a case in which the value of the static_mapping flag is "1", 3DBoundingSpaceStruct (second information) as described with reference to FIG. 18 is stored in DynamicGPCC3DSpatialRegionSampleEntry.

Thus, on the basis of such information, a reproduction device can easily perceive whether or not a spatial positional relation between 3D spatial regions and a correspondence relation between a 3D spatial region and information used for acquiring a tile are static and a spatial positional relation between the 3D spatial regions. Thus, a reproduction device can perform reproduction without checking information of a 3D spatial region to be reproduced, tiles composing the 3D spatial region, a tile stored in a G-PCC tile track, and the like for each frame. Therefore, an increase in the load of the reproduction process can be inhibited.

For example, in a case in which the value of the static_mapping flag is "1", the reproduction device can identify that a spatial positional relation between 3D spatial regions and a correspondence relation between 3D spatial region and information used for acquiring a tile are static on the basis of the value of the flag. In addition, the reproduction device can identify the spatial positional relation on the basis of 3DBoundingSpaceStruct. Thus, for example, after a G-PCC tile track corresponding to a desired 3D spatial region is acquired in accordance with a visual field once, the reproduction device does not need to perform identification of a G-PCC tile track included in the visual field and conversion into the G-PCC tile track while the visual field is not changed.

2-5-2. Syntax Example 2

In <2-5-1. Syntax example 1>, although a 3D spatial region and a track storing data thereof have been described to be associated with each other through a tile (through tile_id), they may be associated with each other using tile track identification information (tile_track_id) in place of this tile_id.

An example of the syntax of a dynamic spatial region timed metadata track of this case will be described below. In such a case, the syntax of DynamicGPCC3DSpatialRegionSampleEntry is the same as the example described with reference to FIG. 20. In addition, the syntax of DynamicGPCC3DSpatialRegionSample is the same as the example described with reference to FIG. 19. In other words, tile track identification information (tile_track_id) of a G-PCC tile track corresponding to each 3D spatial region of the sample is designated. In addition, the syntax of 3DBoundingSpaceStruct is the same as the example described with reference to FIG. 18.

By configuring as such, the reproduction device does not need to parse GPCC tile sample entries (GPCCTileSampleEntry) of all the G-PCC tile tracks and can easily identify a G-PCC tile track storing data of tiles composing a desired 3D spatial region.

2-6. DynamicGPCC3DSpatialRegionSample

In addition, as illustrated in a 5th section from the top of the table illustrated in FIG. 13, the second information may further include information (DynamicGPCC3DSpatialRegionSample) about a 3D spatial region including a static correspondence relation between a 3D spatial region and information used for acquiring tiles of a point cloud (Method 1-1-3).

In addition, in a case in which this Method 1-1-3 is applied, the first information may be information (a static_region_relation flag) indicating whether a spatial positional relation between 3D spatial regions is static or may be a spatial positional relation between 3D spatial regions and information (a static_mapping flag) indicating whether a correspondence relation between a 3D spatial region and information used for acquiring tiles is static. In addition, the information used for acquiring tiles may be tile identification information (tile_id) or may be tile track identification information (tile_track_id).

For example, the second information generating unit of the information processing device may generate information about a three-dimensional spatial region including a correspondence relation between a three-dimensional spatial region (3D spatial region) and information used for acquiring tiles of a point cloud, which is static, as the second information.

In that case, the information used for acquiring tiles may be identification information (tile_id) of the tile or may be identification information (tile_track_id) of a track (a G-PCC tile track) storing data of the tile in the G-PCC file.

In addition, the second information stored in the G-PCC file may further include information about a three-dimensional spatial region including a correspondence relation between a three-dimensional spatial region (3D spatial region) and information used for acquiring a tile, which is static. Then, the extraction unit of the information processing device may extract data of a tile composing a three-dimensional spatial region specified on the basis of static information representing a range in which the three-dimensional spatial region can be present on the basis of the information about the three-dimensional spatial region from a file.

In that case, the information used for acquiring a tile may be identification information (tile_id) of the tile or may be identification information (tile_track_id) of a track (a G-PCC tile track) storing data of the tile in the G-PCC file.

In other words, Method 1-1-3 can be applied to any one of Syntax example 1 and Syntax example 2 of Method 1-1-1 and Syntax example 1 and Syntax example 2 of Method 1-1-2.

For example, in a case in which Method 1-1-3 is applied to Syntax example 1 of Method 1-1-1, in DynamicGPCC3DSpatialRegionSample of which the syntax is illustrated in FIG. 17, when static_region_relation=1, elements other than 3DSpatialRegionStruct have the same values as those stored in GPCCSpatialRegionInfoBox of the sample entry (Sample Entry).

In addition, in a case in which Method 1-1-3 is applied to Syntax example 2 of Method 1-1-1, in DynamicGPCC3DSpatialRegionSample of which the syntax is illustrated in FIG. 19, when static_region_relation=1, elements other than 3DSpatialRegionStruct have the same values as those stored in GPCCSpatialRegionInfoBox of the sample entry (Sample Entry).

Furthermore, in a case in which Method 1-1-3 is applied to Syntax example 1 of Method 1-1-2, in DynamicGPCC3DSpatialRegionSample of which the syntax is illustrated in FIG. 17, when static_mapping=1, elements other than 3DSpatialRegionStruct have the same values as those stored in GPCCSpatialRegionInfoBox of the sample entry (Sample Entry).

In addition, in a case in which Method 1-1-3 is applied to Syntax example 2 of Method 1-1-2, in DynamicGPCC3DSpatialRegionSample of which the syntax is illustrated in FIG. 19, when static_mapping=1, elements other than 3DSpatialRegionStruct have the same values as those stored in GPCCSpatialRegionInfoBox of the sample entry (Sample Entry).

By configuring as such, a correspondence relation between a 3D spatial region stored in DynamicGPCC3DSpatialRegionSample and information (tile_id or tile_track_id) used for acquiring a tile is the same as a static correspondence relation between a 3D spatial region stored in GPCCSpatialRegionInfoBox and information (tile_id or tile_track_id) used for acquiring a tile. Thus, the reproduction device does not need to specify a G-PCC tile track storing data of a tile composing a 3D spatial region to be reproduced for each frame and can easily extract data of the tile composing the 3D spatial region and reproduce the data. Therefore, an increase in the load of the reproduction process can be inhibited.

2-7. Fixing of Reference Point Coordinates of 3DSpatialRegionStruct

Instead of setting a 3D bounding space as in Method 1-1 and transmitting 3DBoundingSpaceStruct as the second information, a position of a reference point (an anchor point) of the 3D spatial region may be fixed in the time direction (in other words, formed to be static).

In other words, in a case in which Method 1 is applied, as illustrated in a 6th section from the top of the table illustrated in FIG. 13, the first information may be information indicating whether a relationship including a spatial positional relation between 3D spatial regions is static. In addition, the second information may be information (3DSpatialRegion-Struct) representing a 3D spatial region in which a reference point position of a 3D spatial region is fixed in a case in which the first information is true (Method 1-2).

For example, the first information generating unit of the information processing device may generate information indicating whether a relationship including a positional relation in a three-dimensional space between three-dimensional spatial regions (3D spatial regions) is static as the first information, and the second information generating unit of the information processing device may generate information representing a three-dimensional spatial region of which a reference point position of the 3-dimensional spatial region is static in a case in which the first information is true as the second information.

In addition, the first information stored in a G-PCC file may be information indicating whether a relationship including a positional relation (also referred to as a spatial positional relation) in a three-dimensional space between three-dimensional spatial regions (3D spatial regions) is static. In addition, the second information stored in the G-PCC file may be information representing a three-dimensional spatial region of which a reference point position of the three-dimensional spatial region is static. The extraction unit of the information processing device may specify a three-dimensional spatial region (3D spatial region) constructing a point cloud on the basis of information representing the three-dimensional spatial region.

Figure 21:
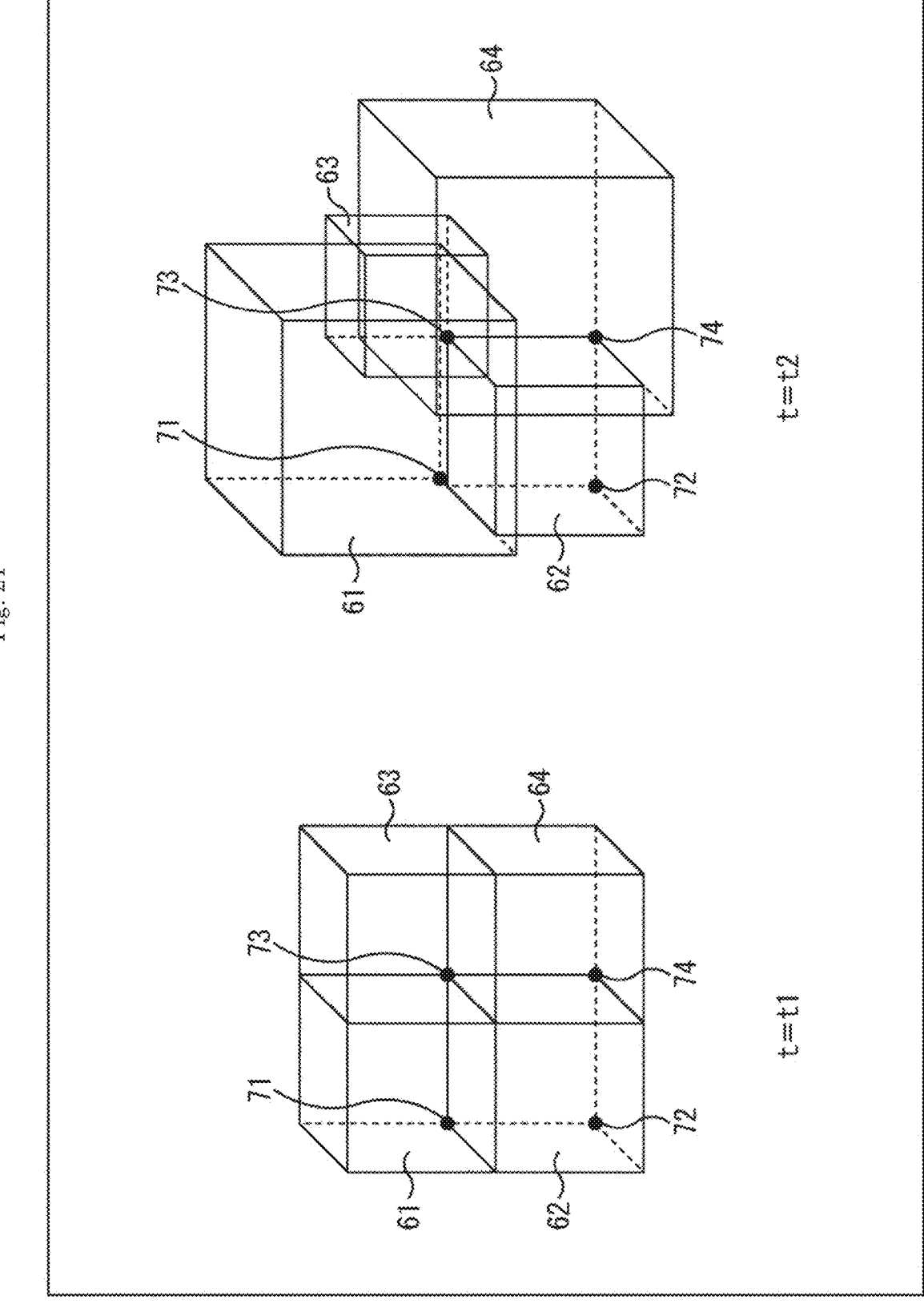
FIG. 21 is a diagram illustrating an example of a 3D spatial region.

For example, the first information may be a static_region_relation flag or may be a static_mapping flag. In 3DSpatial-RegionStruct, in a case in which the first information is true (for example, in the case of static_region_relation=1 or static_mapping=1), as illustrated in FIG. 21, restrictions of a position of a reference point of a 3D spatial region (coordinates (anchor_x, anchor_y, anchor_z) of the reference point) being fixed (static) in the time direction and only the size being able to change (dynamic) in the time direction may be added. In the case of the example illustrated in FIG. 21, sizes of a 3D spatial region 61 to a 3D spatial region 64 are dynamic (the sizes are different at a time t=t1 and a time t=t2), and positions of reference points (a reference point 71 to a reference point 74) of the 3D spatial region 61 to the 3D spatial region 64 are static (the positions are the same at the time t=t1 and the time t=t2). Then, 3DSpatialRegionStruct to which such restrictions have been added may be transmitted as the second information.

FIG. 22 is a diagram illustrating an example of the syntax of 3DSpatialRegionStruct of this case. As illustrated in FIG. 22, coordinates (anchor_x, anchor_y, anchor_z) of a reference point are included in an if statement, and in a case in which the first information is true (for example, static_region_relation=1 or static_mapping=1), and a reference point position is static, setting of the coordinates of the reference point in this sample can be omitted.

By configuring the reference point position of each 3D spatial region to be static, a spatial positional relation between 3D spatial regions is assured (a static relation is formed). In other words, a static spatial positional relation between 3D spatial regions can be easily perceived on the basis of the second information (3DSpatialRegionStruct) stored in a G-PCC file. Thus, similar to the case of Method 1-1, the reproduction device can perform reproduction without checking information of a 3D spatial region to be reproduced, tiles composing the 3D spatial region, a tile stored in a G-PCC tile track, and the like for each frame. Therefore, an increase in the load of the reproduction process can be inhibited.

2.-8. Fixing of Center Coordinates of 3DSpatialRegionStruct

A position of a center point of a 3D spatial region may be fixed (configured to be static) in the time direction in place of the reference point position of the 3D spatial region.

In other words, in a case in which Method 1 is applied, as illustrated in a 7th section from the top of the table illustrated in FIG. 13, the first information may be information indicating whether a relationship including a spatial positional relation between 3D spatial regions is static. In addition, the second information may be information (3DSpatialRegion-Struct) representing a 3D spatial region of which the center position of the 3D spatial region is fixed in a case in which the first information is true (Method 1-3).

For example, the first information generating unit of the information processing device may generate information indicating whether a relationship including a positional relation in a three-dimensional space between three-dimensional spatial regions (3D spatial regions) as the first information is static, and the second information generating unit of the information processing device may generate information representing a three-dimensional spatial region of which a center position of the 3-dimensional spatial region is static as the second information in a case in which the first information is true.

In addition, the first information stored in a G-PCC file may be information indicating whether a relationship including a positional relation in a three-dimensional space (also referred to as a spatial positional relation) between three-dimensional spatial regions (3D spatial regions) is static. Furthermore, the second information stored in the G-PCC file may be information representing a three-dimensional spatial region of which a center position of the three-dimensional spatial region is static. The extraction unit of the information processing device may specify a three-dimensional spatial region (3D spatial region) constructing a point cloud on the basis of information representing the three-dimensional spatial region.

Figure 23:
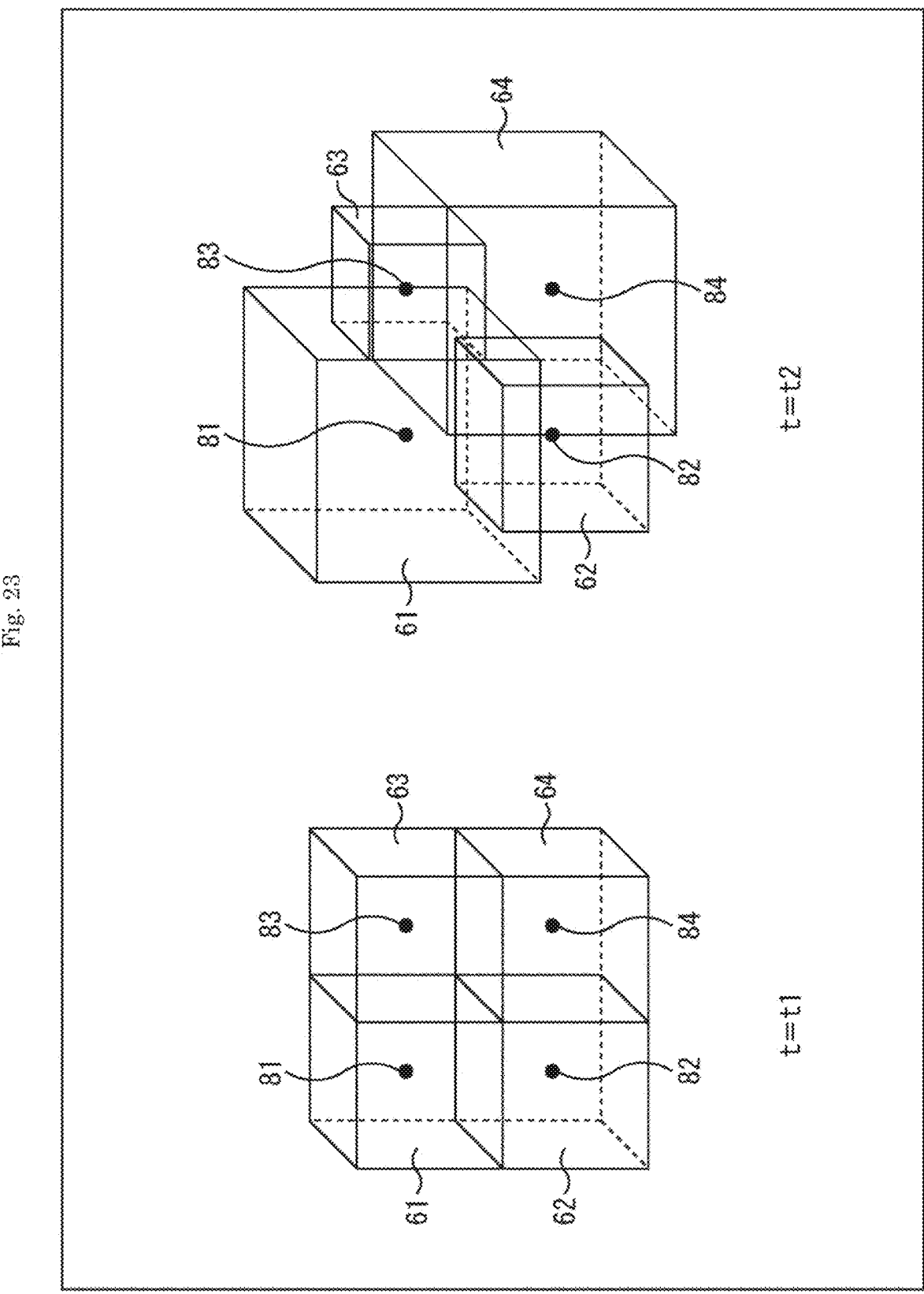
FIG. 23 is a diagram illustrating an example of a 3D spatial region.

For example, the first information may be a static_region_ relation flag or may be a static_mapping flag. In 3DSpatial-RegionStruct, in a case in which the first information is true (for example, in the case of static_region_relation=1 or static_mapping=1), as illustrated in FIG. 23, restrictions of a position of a center of a 3D spatial region (coordinates (center_x, center_y, center_z) of the center) being fixed (static) in the time direction and only the size being able to change (dynamic) in the time direction may be added. In the case of the example illustrated in FIG. 23, sizes of a 3D spatial region 61 to a 3D spatial region 64 are dynamic (the sizes are different at a time t=t1 and a time t=t2), and positions of center points (a center point 81 to a center point 84) of the 3D spatial region 61 to the 3D spatial region 64 are static (the positions are the same at the time t=t1 and the time t=t2). Then, 3DSpatialRegionStruct to which such restrictions have been added may be transmitted as the second information.

In addition, as described with reference to FIG. 12, in 3DSpatialRegionStruct, the center coordinates (center_x, center_y, center_z) of the 3D spatial region is not set. For example, such coordinates can be derived as in the following equation. In other words, in a case in which the first information is true, the coordinates of the reference point and the size of the 3D spatial region are set such that the center coordinates (center_x, center_y, center_z) of the 3D spatial region become static using the following equations.

$$center\_x = anchor\_x + region\_dx/2$$

$$center\_y = anchor\_y + region\_dy/2$$

$$center\_z = anchor\_z + region\_dz/2$$

In addition, the center coordinates (center_x, center_y, center_z) of the 3D spatial region is newly signaled to a sample entry of the dynamic spatial region timed metadata track, and, in a case in which the first information is true, only the size (region_dx, region_dy, region_dz) of the 3D spatial region may be set for each sample using 3DSpatial-RegionStruct.

By configuring the center position of each 3D spatial region to be static, a spatial positional relation between 3D spatial regions is assured (becomes a static relation). In other words, a static spatial positional relation between 3D spatial regions can be easily perceived on the basis of the second information (3DSpatialRegionStruct) stored in the G-PCC file. Thus, similar to the case of Method 1-1, the reproduction device can perform reproduction without checking information of a 3D spatial region to be reproduced, tiles composing the 3D spatial region, a tile stored in a G-PCC tile track, and the like for each frame. Therefore, an increase in the load of the reproduction process can be inhibited.

2-9. Relationship Including Correspondence Relation Between 3D Spatial Region and Information Used for Acquiring Tile In a case in which a correspondence relation between a 3D spatial region and information used for acquiring a tile is static, in a sample of dynamic spatial region timed metadata, there are fields of which values do not change. Thus, in a case in which a correspondence relation between a 3D spatial region and information used for acquiring tiles is static, designation of information used for acquiring tiles composing the 3D spatial region in DynamicGPCC3DSpatialRegionSample may be omitted.

In other words, in a case in which Method 1 is applied, as illustrated in an 8th section from the top of the table illustrated in FIG. 13, the first information may be information indicating whether a relationship including a correspondence relation between a 3D spatial region and information used for acquiring tiles is static. In addition, the second information may be dynamic information about a three-dimensional spatial region (DynamicGPCC3DSpatialRegionSample) in which a correspondence relation between a 3D spatial region and information used for acquiring tiles is omitted in a case in which the first information is true (Method 1-4).

For example, the first information generating unit of the information processing device may generate information indicating whether a relationship including a correspondence relation between a three-dimensional spatial region (3D spatial region) and information used for acquiring tiles of a point cloud is static as the first information, and the second information generating unit of the information processing device may generate information about a dynamic three-dimensional spatial region (DynamicGPCC3DSpatialRegionSample) without including the information representing the correspondence relation as the second information in a case in which the first information is true.

In that case, the information used for acquiring tiles may be identification information (tile_id) of the tile or may be identification information (tile_track_id) of a track storing data of the tile in the G-PCC file.

In addition, the first information stored in the G-PCC file may be information indicating whether a relationship including a correspondence relation between a three-dimensional spatial region (3D spatial region) and information used for acquiring tiles of a point cloud is static. In addition, the second information stored in the G-PCC file may be information about a dynamic three-dimensional spatial region (DynamicGPCC3DSpatialRegionSample) not including the information representing the correspondence relation. The extraction unit of the information processing device may specify a three-dimensional spatial region constructing a point cloud on the basis of information about the dynamic three-dimensional spatial region and information representing a static correspondence relation between the three-dimensional spatial region (3D spatial region) and the information used for acquiring tiles of the point cloud.

In that case, the information used for acquiring tiles may be identification information (tile_id) of the tile or may be identification information (tile_track_id) of a track storing data of the tile in the G-PCC file.

By configuring as such, an increase in the amount of information of dynamic spatial region timed metadata can be inhibited, and an increase in the amount of information of a G-PCC file can be inhibited. Thus, increases in the load of a process relating to transmission of a G-PCC file and the load of the band of a communication line can be inhibited. In addition, parsing of dynamic spatial region timed metadata can be performed more easily, and an increase in the load of the reproduction process can be inhibited.

2-10. Static_Tile_Mapping

In a case in which Method 1-4 is applied, as illustrated in a 9th section from the top of the table illustrated in FIG. 13, the first information may be information tiles (a static_ tile_mapping flag) indicating whether a correspondence relation between a 3D spatial region and information used for acquiring is static (Method 1-4-1). The static_tile_mapping flag is information indicating whether or not a correspondence relation between a 3D spatial region and information used for acquiring tiles is static, for example, in a case in which the value thereof is "0", it represents that the correspondence relation is dynamic, and, in a case in which the value thereof is "1", it represents that the correspondence relation is static. When the value of this static_tile_mapping flag is "1", the second information (DynamicGPCC3DSpatialRegionSample) may be regarded not to include (not to store) the information indicating the correspondence relation between a 3D spatial region and the information used for acquiring tiles.

For example, the first information generating unit of the information processing device may generate information (a static_tile_mapping flag) indicating whether a correspondence relation between a three-dimensional spatial region (3D spatial region) and information used for acquiring tiles of a point cloud is static as the first information.

In addition, the first information stored in the G-PCC file may be information (a static_tile_mapping flag) indicating whether a correspondence relation between a three-dimensional spatial region (3D spatial region) and information used for acquiring tiles of a point cloud is static.

2-10-1. Syntax Example 1

In this case, for example, the first information and the second information may be stored in a dynamic spatial region timed metadata track of a G-PCC file. An example of the syntax of the dynamic spatial region timed metadata track will be described below. Here, it is assumed that information used for acquiring tiles is tile identification information (tile_id).

FIG. 24 is a diagram illustrating an example of the syntax of DynamicGPCC3DSpatialRegionSampleEntry stored in a sample entry of the dynamic spatial region timed metadata track.

As illustrated in a 5th row from the top of the syntax illustrated in FIG. 24, a static_tile_mapping flag (the first information) is stored in this DynamicGPCC3DSpatialRegionSampleEntry.

FIG. 25 is a diagram illustrating an example of the syntax of DynamicGPCC3DSpatialRegionSample stored in a dynamic spatial region timed metadata track.

As illustrated in a 5th row to a 9th row from the top of the syntax illustrated in FIG. 25, in this DynamicGPCC3DSpatialRegionSample, in a case in which the value of the static_tile_mapping flag is "0 (false)", for each 3D spatial region included in the sample, identification information (tile_id) of a tile corresponding to the 3D spatial region (in other words, a tile composing the 3D spatial region) is designated. In other words, in this case, in DynamicGPCC3DSpatialRegionSample, a list of tile identification information (tile_id) corresponding to each 3D spatial region of the sample is included. On the other hand, in a case in which the value of the static_tile_mapping flag is "1 (true)", designation of the tile identification information (tile_id) is omitted. In other words, in a case in which the value of the static_tile_mapping flag is "1 (true)", in DynamicGPCC3DSpatialRegionSample, a list of tile identification information (tile_id) corresponding to each 3D spatial region of the sample is not included.

By configuring as such, unnecessary information can be inhibited from being stored in dynamic spatial region timed metadata. Thus, an increase in the amount of information of dynamic spatial region timed metadata can be inhibited, and an increase in the amount of information of a G-PCC file can be inhibited. Therefore, increases in the load of a process relating to transmission of a G-PCC file and the load of the band of a communication line can be inhibited. In addition, parsing of dynamic spatial region timed metadata can be performed more easily, and an increase in the load of the reproduction process can be inhibited.

2-10-2. Syntax Example 2

In <2-10-1. Syntax example 1>, although it has been described that information used for acquiring tiles is the tile identification information (tile_id), the information used for acquiring tiles may be tile track identification information (tile_track_id). By applying the tile track identification information (tile_track_id) in place of the tile identification information (tile_id), the reproduction device does not need to parse GPCC tile sample entries (GPCCTileSampleEntry) of all the G-PCC tile tracks and can easily identify G-PCC tile tracks storing data of tiles composing a desired 3D spatial region. An example of the syntax of the dynamic spatial region timed metadata track of this case will be described below.

In this case, the syntax of DynamicGPCC3DSpatialRegionSampleEntry is the same as that of the example described with reference to FIG. 24.

FIG. 26 is a diagram illustrating an example of the syntax of DynamicGPCC3DSpatialRegionSample of this case.

As illustrated in a 5th row to a 9th row from the top of the syntax illustrated in FIG. 26, in this DynamicGPCC3DSpatialRegionSample, in a case in which the value of the static_tile_mapping flag is "0 (false)", for each 3D spatial region included in the sample, identification information (tile_track_id) of a G-PCC tile track in which a tile composing the 3D spatial region is stored is designated. In other words, in this case, a list of identification information (tile_track_id) of G-PCC tile tracks corresponding to respective 3D spatial regions of the sample is included in DynamicGPCC3DSpatialRegionSample. On the other hand, in a case in which the value of the static_tile_mapping flag is "1 (true)", designation of identification information (tile_track_id) of the G-PCC tile track is omitted. In other words, in this case, in DynamicGPCC3DSpatialRegionSample, a list of identification information (tile_track_id) of G-PCC tile tracks corresponding to respective 3D spatial regions of the sample is not included.

By configuring as such, unnecessary information can be inhibited from being stored in dynamic spatial region timed metadata. Thus, an increase in the amount of information of dynamic spatial region timed metadata can be inhibited, and an increase in the amount of information of a G-PCC file can be inhibited. Therefore, increases in the load of a process relating to transmission of a G-PCC file and the load of the band of a communication line can be inhibited. In addition, parsing of dynamic spatial region timed metadata can be performed more easily, and an increase in the load of the reproduction process can be inhibited.

2-11. Static_Mapping

In <2-10. static_tile_mapping>, although a case in which information (the static_tile_mapping flag) indicating whether a correspondence relation between a three-dimensional spatial region (3D spatial region) and information used for acquiring tiles of a point cloud is static in the time direction is applied as the first information has been described, the first information is not limited to this example.

In a case in which Method 1-4 is applied, as illustrated in a 10th section from the top of the table illustrated in FIG. 13, the first information may be a spatial positional relation between 3D spatial regions and information (a static_mapping flag) indicating whether a correspondence relation between a 3D spatial region and information used for acquiring tiles is static in the time direction (Method 1-4-2). In other words, when the value of the static_mapping flag is "1", the second information (DynamicGPCC3DSpatialRegionSample) may be configured not to include (not to store) information indicating a correspondence relation between a 3D spatial region and information used for acquiring tiles.

For example, the first information generating unit of the information processing device may generate a spatial positional relation between three-dimensional spatial regions (3D spatial regions) and information (a static_mapping flag) indicating whether a correspondence relation between a three-dimensional spatial region and information used for acquiring tiles is static in the time direction as the first information.

In addition, the first information stored in the G-PCC file may be a spatial positional relation between three-dimensional spatial regions (3D spatial regions) and information (a static_mapping flag) indicating whether a correspondence relation between a three-dimensional spatial region and information used for acquiring tiles is static in the time direction.

2-11-1. Syntax Example 1

In this case, for example, the first information and the second information may be stored in a dynamic spatial region timed metadata track of the G-PCC file. An example of the syntax of the dynamic spatial region timed metadata track will be described below. Here, it is assumed that information used for acquiring tiles is tile identification information (tile_id).

FIG. 27 is a diagram illustrating an example of the syntax of DynamicGPCC3DSpatialRegionSampleEntry stored in a sample entry of a dynamic spatial region timed metadata track.

As illustrated in a 5th row from the top of the syntax illustrated in FIG. 27, a static_mapping flag (the first information) is stored in DynamicGPCC3DSpatialRegionSampleEntry.

FIG. 28 is a diagram illustrating an example of the syntax of DynamicGPCC3DSpatialRegionSample stored in a dynamic spatial region timed metadata track.

As illustrated in a 5th row to a 9th row from the top of the syntax illustrated in FIG. 28, in this DynamicGPCC3DSpatialRegionSample, in a case in which the value of the static_mapping flag is "0 (false)", for each 3D spatial region included in the sample, identification information (tile_id) of a tile corresponding to the 3D spatial region (in other words, a tile composing the 3D spatial region) is designated. In other words, in this case, in DynamicGPCC3DSpatialRegionSample, a list of tile identification information (tile_id) corresponding to each 3D spatial region of the sample is included. On the other hand, in a case in which the value of the static_mapping flag is "1 (true)", designation of the tile identification information (tile_id) is omitted. In other words, in a case in which the value of the static_mapping flag is "1 (true)", in DynamicGPCC3DSpatialRegionSample, a list of tile identification information (tile_id) corresponding to respective 3D spatial regions of the sample is not included.

By configuring as such, unnecessary information can be inhibited from being stored in dynamic spatial region timed metadata. Thus, an increase in the amount of information of dynamic spatial region timed metadata can be inhibited, and an increase in the amount of information of a G-PCC file can be inhibited. Therefore, increases in the load of a process relating to transmission of a G-PCC file and the load of the band of a communication line can be inhibited. In addition, parsing of dynamic spatial region timed metadata can be performed more easily, and an increase in the load of the reproduction process can be inhibited.

2-11-2. Syntax Example 2

In <2-11-1. Syntax example 1>, although it has been described that information used for acquiring tiles is the tile identification information (tile_id), the information used for acquiring tiles may be tile track identification information (tile_track_id). By applying the tile track identification information (tile_track_id) in place of the tile identification information (tile_id), the reproduction device does not need to parse GPCC tile sample entries (GPCCTileSampleEntry) of all the G-PCC tile tracks and can easily identify a G-PCC tile track storing data of tiles composing a desired 3D spatial region. An example of the syntax of the dynamic spatial region timed metadata track of this case will be described below.

In this case, the syntax of DynamicGPCC3DSpatialRegionSampleEntry is the same as that of the example described with reference to FIG. 27.

FIG. 29 is a diagram illustrating an example of the syntax of DynamicGPCC3DSpatialRegionSample of this case.

As illustrated in a 5th row to a 9th row from the top of the syntax illustrated in FIG. 29, in this DynamicGPCC3DSpatialRegionSample, in a case in which the value of the static_mapping flag is "0 (false)", for each 3D spatial region included in the sample, identification information (tile_track_id) of a G-PCC tile track in which a tile composing the 3D spatial region is stored is designated. In other words, in this case, a list of identification information (tile_track_id) of G-PCC tile tracks corresponding to respective 3D spatial regions of the sample is included in DynamicGPCC3DSpatialRegionSample. On the other hand, in a case in which the value of the static_mapping flag is "1 (true)", designation of identification information (tile_track_id) of the G-PCC tile track is omitted. In other words, in this case, in DynamicGPCC3DSpatialRegionSample, a list of identification information (tile_track_id) of G-PCC tile tracks corresponding to respective 3D spatial regions of the sample is not included.

By configuring as such, unnecessary information can be inhibited from being stored in dynamic spatial region timed metadata. Thus, an increase in the amount of information of dynamic spatial region timed metadata can be inhibited, and an increase in the amount of information of a G-PCC file can be inhibited. Therefore, increases in the load of a process relating to transmission of a G-PCC file and the load of the band of a communication line can be inhibited. In addition, parsing of dynamic spatial region timed metadata can be performed more easily, and an increase in the load of the reproduction process can be inhibited.

2-12. Number of Static 3D Spatial Regions

In each example described above, for example, as illustrated in a 2nd row from the top of the syntax illustrated in FIG. 29, in DynamicGPCC3DSpatialRegionSample, the number of 3D spatial regions (num_regions) is designated for each sample. In other words, DynamicGPCC3DSpatialRegionSample includes the number of dynamic 3D spatial regions. However, DynamicGPCC3DSpatialRegionSample may be configured not to include the number of dynamic 3D spatial regions.

In a case in which Method 1-4 is applied, as illustrated in an 11th section from the top of the table illustrated in FIG. 13, when the first information is true, the second information (DynamicGPCC3DSpatialRegionSample) may be configured to include the number of static 3D spatial regions in place of the number of dynamic 3D spatial regions (Method 1-4-3). Since the number of G-PCC tile tracks is static in a G-PCC file, a correspondence relation between a 3D spatial region and a G-PCC tile track is static, and thus num_regions are static as well.

For example, the second information generating unit of the information processing device may generate information about a dynamic three-dimensional spatial region further including information that represents the number of static three-dimensional spatial regions.

In addition, the second information stored in the G-PCC file may be information about a dynamic three-dimensional spatial region further including information that represents the number of static three-dimensional spatial regions. The extraction unit of the information processing device may extract data of tiles composing a three-dimensional spatial region constructing a point cloud from a file on the basis of the information about the dynamic three-dimensional spatial region and information representing a static correspondence relation between a three-dimensional spatial region and information used for acquiring tiles.

In addition, in a case in which this Method 1-4-3 is applied, the first information may be information (a static_tile_mapping flag) indicating whether a correspondence relation between a 3D spatial region and information used for acquiring tiles is static or may be a spatial positional relation between 3D spatial regions and information (a static_mapping flag) indicating whether a correspondence relation between a 3D spatial region and information used for acquiring tiles is static. Furthermore, the information used for acquiring tiles may be tile identification information (tile_id) or may be tile track identification information (tile_track_id).

2-12-1. Syntax Example 1

Here, it is assumed that the first information is information (a static_tile_mapping flag) indicating whether a correspondence relation between a 3D spatial region and information used for acquiring tiles is static, and the information used for acquiring tiles is tile identification information (tile_id).

In this case, the syntax of DynamicGPCC3DSpatialRegionSampleEntry is the same as that of the example described with reference to FIG. 24.

FIG. 30 is a diagram illustrating an example of the syntax of DynamicGPCC3DSpatialRegionSample stored in a dynamic spatial region timed metadata track.

As illustrated in a 2nd row to a 6th row from the top of the syntax illustrated in FIG. 30, in this DynamicGPCC3DSpatialRegionSample, in a case in which the value of the static_tile_mapping flag is "0 (false)", a 3D spatial region number (num_regions_dynamic) of the sample is set. In other words, in this case, DynamicGPCC3DSpatialRegionSample includes the number of dynamic 3D spatial regions. On the other hand, in a case in which the value of the static_tile_mapping flag is "1 (true)", the number of static 3D spatial regions (num_regions) is set. In other words, in this case, DynamicGPCC3DSpatialRegionSample includes the number of static 3D spatial regions.

In addition, in a case in which the value of the static_tile_mapping flag is "1", each entry of a NumRegions loop of the sample updates information of 3DSpatialRegionStruct of an entry of the same index of a num_regions loop of GPCCSpatialRegionBox of the previous sample or a sample entry. 3d_region_id stored in 3DSpatialRegionStruct may update information of the same 3DSpatialRegionStruct.

By configuring as such, in a case in which the first information is true, the number of 3D spatial regions stored in dynamic spatial region timed metadata becomes static in correspondence with a static correspondence relation between a 3D spatial region and a G-PCC tile track. Thus, the number of 3D spatial regions does not need to be checked for each sample, parsing of dynamic spatial region timed metadata can be performed more easily, and an increase in the load of the reproduction process can be inhibited.

In addition, in DynamicGPCC3DSpatialRegionSample of the example of this FIG. 30, similar to the case illustrated in FIG. 25, in a case in which the value of the static_tile_mapping flag is "1 (true)", designation of tile identification information (tile_id) is omitted. In other words, in a case in which the value of the static_tile_mapping flag is "1 (true)", in this DynamicGPCC3DSpatialRegionSample, a list of tile identification information (tile_id) corresponding to respective 3D spatial regions of the sample is not included.

Thus, unnecessary information can be inhibited from being stored in dynamic spatial region timed metadata. Thus, an increase in the amount of information of dynamic spatial region timed metadata can be inhibited, and an increase in the amount of information of a G-PCC file can be inhibited. Therefore, increases in the load of a process relating to transmission of a G-PCC file and the load of the band of a communication line can be inhibited. In addition, parsing of dynamic spatial region timed metadata can be performed more easily, and an increase in the load of the reproduction process can be inhibited.

2-12-2. Syntax Example 2

Here, it is assumed that the first information is information (a static_tile_mapping flag) indicating whether a correspondence relation between a 3D spatial region and information used for acquiring tiles is static, and the information used for acquiring tiles is tile track identification information (tile_track_id). By applying the tile track identification information (tile_track_id) in place of the tile identification information (tile_id), the reproduction device does not need to parse GPCC tile sample entries (GPCCTileSampleEntry) of all the G-PCC tile tracks and can easily identify a G-PCC tile track storing data of a tile composing a desired 3D spatial region.

In this case, the syntax of DynamicGPCC3DSpatialRegionSampleEntry is the same as that of the example described with reference to FIG. 24.

FIG. 31 is a diagram illustrating an example of the syntax of DynamicGPCC3DSpatialRegionSample stored in a dynamic spatial region timed metadata track.

In the case of the example illustrated in FIG. 31, similar to the case of the example illustrated in FIG. 30, when the value of the static_tile_mapping flag is "0 (false)", the number of 3D spatial regions (num_regions_dynamic) of the sample is set. In other words in this case, DynamicGPCC3DSpatialRegionSample includes the number of dynamic 3D spatial regions. On the other hand, in a case in which the value of the static_tile_mapping flag is "1 (true)", the number of static 3D spatial regions (num_re-gions) is set. In other words, in this case, DynamicGPCC3DSpatialRegionSample includes the number of static 3D spatial regions.

In addition, in a case in which the value of the static_tile_mapping flag is "1", each entry of a NumRegions loop of the sample updates information of 3DSpatialRegionStruct of an entry of the same index of a num_regions loop of GPCCSpatialRegionBox of the previous sample or a sample entry. 3d_region_id stored in 3DSpatialRegionStruct may update information of the same 3DSpatialRegionStruct.

By configuring as such, in a case in which the first information is true, the number of 3D spatial regions stored in dynamic spatial region timed metadata becomes static in correspondence with a static correspondence relation between a 3D spatial region and a G-PCC tile track. Thus, the number of 3D spatial regions does not need to be checked for each sample, parsing of dynamic spatial region timed metadata can be performed more easily, and an increase in the load of the reproduction process can be inhibited.

In addition, in DynamicGPCC3DSpatialRegionSample of the example of this FIG. 31, similar to the case illustrated in FIG. 26, in a case in which the value of the static_tile_map-ping flag is "1 (true)", designation of tile track identification information (tile_track_id) is omitted. In other words, in a case in which the value of the static_tile_mapping flag is "1 (true)", in this DynamicGPCC3DSpatialRegionSample, a list of tile track identification information (tile_track_id) corresponding to respective 3D spatial regions of the sample is not included.

Thus, unnecessary information can be inhibited from being stored in dynamic spatial region timed metadata. Thus, an increase in the amount of information of dynamic spatial region timed metadata can be inhibited, and an increase in the amount of information of a G-PCC file can be inhibited. Therefore, increases in the load of a process relating to transmission of a G-PCC file and the load of the band of a communication line can be inhibited. In addition, parsing of dynamic spatial region timed metadata can be performed more easily, and an increase in the load of the reproduction process can be inhibited.

2-12-3. Syntax Example 3

Here, it is assumed that the first information is a spatial positional relation between three-dimensional spatial regions (3D spatial regions) and information (a static_map-ping flag) indicating whether a correspondence relation between a three-dimensional spatial region and information used for acquiring tiles is static in the time direction, and the information used for acquiring tiles is tile track identification information (tile_id).

In this case, the syntax of DynamicGPCC3DSpatialRegionSampleEntry is the same as that of the example described with reference to FIG. 27.

FIG. 32 is a diagram illustrating an example of the syntax of DynamicGPCC3DSpatialRegionSample stored in a dynamic spatial region timed metadata track.

As illustrated in a 2nd row to a 6th row from the top of the syntax illustrated in FIG. 32, in this DynamicGPCC3DSpatialRegionSample, in a case in which the value of the static_mapping flag is "0 (false)", the number of 3D spatial regions (num_regions_dynamic) of the sample is set. In other words, in this case, DynamicGPCC3DSpatialRegionSample includes the number of dynamic 3D spatial regions. On the other hand, in a case in which the value of the static_mapping flag is "1 (true)", the number of static 3D spatial regions (num_re-gions) is set. In other words, in this case, DynamicGPCC3DSpatialRegionSample includes the number of static 3D spatial regions.

In addition, in a case in which the value of the static_mapping flag is "1", each entry of a NumRegions loop of the sample updates information of 3DSpatialRegionStruct of an entry of the same index of a num_regions loop of GPCCSpa-tialRegionBox of the previous sample or a sample entry. 3d_region_id stored in 3DSpatialRegionStruct may update information of the same 3DSpatialRegionStruct.

By configuring as such, in a case in which the first information is true, the number of 3D spatial regions stored in dynamic spatial region timed metadata becomes static in correspondence with a static correspondence relation between a 3D spatial region and a G-PCC tile track. Thus, the number of 3D spatial regions does not need to be checked for each sample, parsing of dynamic spatial region timed metadata can be performed more easily, and an increase in the load of the reproduction process can be inhibited.

In addition, in DynamicGPCC3DSpatialRegionSample of the example of this FIG. 32, similar to the case illustrated in FIG. 25, in a case in which the value of the static_mapping flag is "1 (true)", designation of tile identification informa-tion (tile_id) is omitted. In other words, in a case in which the value of the static_mapping flag is "1 (true)", in this DynamicGPCC3DSpatialRegionSample, a list of tile iden-tification information (tile_id) corresponding to respective 3D spatial regions of the sample is not included.

Thus, unnecessary information can be inhibited from being stored in dynamic spatial region timed metadata. Thus, an increase in the amount of information of dynamic spatial region timed metadata can be inhibited, and an increase in the amount of information of a G-PCC file can be inhibited. Therefore, increases in the load of a process relating to transmission of a G-PCC file and the load of the band of a communication line can be inhibited. In addition, parsing of dynamic spatial region timed metadata can be performed more easily, and an increase in the load of the reproduction process can be inhibited.

2-12-4. Syntax Example 4

Here, it is assumed that the first information is a spatial positional relation between three-dimensional spatial regions (3D spatial regions) and information (a static_map-ping flag) indicating whether a correspondence relation between a three-dimensional spatial region and information used for acquiring tiles is static in the time direction, and the information used for acquiring tiles is tile track identification information (tile_track_id). By applying the tile track iden-tification information (tile_track_id) in place of the tile identification information (tile_id), the reproduction device does not need to parse GPCC tile sample entries (GPCC-TileSampleEntry) of all the G-PCC tile tracks and can easily identify a G-PCC tile track storing data of a tile composing a desired 3D spatial region.

In this case, the syntax of DynamicGPCC3DSpatialRegionSampleEntry is the same as that of the example described with reference to FIG. 27.

FIG. 33 is a diagram illustrating an example of the syntax of DynamicGPCC3DSpatialRegionSample stored in a dynamic spatial region timed metadata track.

In the case of the example illustrated in FIG. 33, similar to the case of the example illustrated in FIG. 32, when the value of the static_mapping flag is "0 (false)", the number of 3D spatial regions (num_regions_dynamic) of the sample is set. In other words in this case, DynamicGPCC3DSpatialRegionSample includes the number of dynamic 3D spatial regions. On the other hand, in a case in which the value of the static_mapping flag is "1 (true)", the number of static 3D spatial regions (num_regions) is set. In other words, in this case, DynamicGPCC3DSpatialRegionSample includes the number of static 3D spatial regions.

In addition, in a case in which the value of the static_mapping flag is "1", each entry of a NumRegions loop of the sample updates information of 3DSpatialRegionStruct of an entry of the same index of a num_regions loop of GPCCSpatialRegionBox of the previous sample or a sample entry. 3d_region_id stored in 3DSpatialRegionStruct may update information of the same 3DSpatialRegionStruct.

By configuring as such, in a case in which the first information is true, the number of 3D spatial regions stored in dynamic spatial region timed metadata becomes static in correspondence with a static correspondence relation between a 3D spatial region and a G-PCC tile track. Thus, the number of 3D spatial regions does not need to be checked for each sample, parsing of dynamic spatial region timed metadata can be performed more easily, and an increase in the load of the reproduction process can be inhibited.

In addition, in DynamicGPCC3DSpatialRegionSample of the example of this FIG. 33, similar to the case illustrated in FIG. 29, in a case in which the value of the static_mapping flag is "1 (true)", designation of tile track identification information (tile_track_id) is omitted. In other words, in a case in which the value of the static_mapping flag is "1 (true)", in this DynamicGPCC3DSpatialRegionSample, a list of tile track identification information (tile_track_id) corresponding to respective 3D spatial regions of the sample is not included.

Thus, unnecessary information can be inhibited from being stored in dynamic spatial region timed metadata. Thus, an increase in the amount of information of dynamic spatial region timed metadata can be inhibited, and an increase in the amount of information of a G-PCC file can be inhibited. Therefore, increases in the load of a process relating to transmission of a G-PCC file and the load of the band of a communication line can be inhibited. In addition, parsing of dynamic spatial region timed metadata can be performed more easily, and an increase in the load of the reproduction process can be inhibited.

2-13. Combination

In a case in which Method 1 is applied, as illustrated in a 12th section from the top of the table illustrated in FIG. 13, any one of Methods 1-1 to 1-3 described above and Method 1-4 may be combined and applied (Method 1-5).

2-13-1. Combination Example 1

For example, Syntax example 2 of Method 1-1-1 and Syntax example 2 of Method 1-4-3 described above may be combined.

FIG. 34 is a diagram illustrating an example of the syntax of DynamicGPCC3DSpatialRegionSampleEntry stored in a sample entry of a dynamic spatial region timed metadata track.

As illustrated in a 5th row and a 6th row from the top of the syntax illustrated in FIG. 34, in this DynamicGPCC3DSpatialRegionSampleEntry, a static_region_relation flag and a static_tile_mapping flag are stored as first information. In addition, as illustrated in an 8th row and a 9th row from the top of the syntax illustrated in FIG. 34, in DynamicGPCC3DSpatialRegionSampleEntry, in a case in which the value of the static_region_relation flag is "1", 3DBoundingSpaceStruct (second information) is stored.

In addition, in this case, the syntax of DynamicGPCC3DSpatialRegionSample is the same as that of the example described with reference to FIG. 31. Furthermore, the syntax of 3DBoundingSpaceStruct is the same as that of the example described with reference to FIG. 18.

In other words, in DynamicGPCC3DSpatialRegionSampleEntry, the static_region_relation flag and the static_tile_mapping flag (the first information) are stored. In addition, in a case in which the value of the static_region_relation flag is "1", in DynamicGPCC3DSpatialRegionSampleEntry, 3DBoundingSpaceStruct (the second information) described with reference to FIG. 18 is stored.

Thus, the reproduction device can easily perceive whether or not a spatial positional relation between 3D spatial regions is static and the spatial positional relation between the 3D spatial regions on the basis of such information. Thus, the reproduction device can perform reproduction without checking information such as a 3D spatial region to be reproduced, tiles composing the 3D spatial region, tiles stored in G-PCC tile tracks, and the like for each frame.

In addition, as illustrated in FIG. 31, in DynamicGPCC3DSpatialRegionSample that is the second information, in a case in which the value of the static_tile_mapping flag is "1 (true)", a list of tile track identification information (tile_track_id) corresponding to respective 3D spatial regions of the sample is not included.

By configuring as such, unnecessary information can be inhibited from being stored in dynamic spatial region timed metadata. Thus, an increase in the amount of information of dynamic spatial region timed metadata can be inhibited, and an increase in the amount of information of a G-PCC file can be inhibited. Therefore, increases in the load of a process relating to transmission of a G-PCC file and the load of the band of a communication line can be inhibited. In addition, parsing of dynamic spatial region timed metadata can be performed more easily.

In addition, by applying the tile track identification information (tile_track_id) in place of the tile identification information (tile_id), the reproduction device does not need to parse GPCC tile sample entries (GPCCTileSampleEntry) of all the G-PCC tile tracks and can easily identify G-PCC tile tracks storing data of tiles composing a desired 3D spatial region.

As above, also in this case, an increase in the load of the reproduction process can be inhibited.

2-13-2. Combination Example 2

For example, Syntax example 2 of Method 1-1-2 and Syntax example 4 of Method 1-4-3 described above may be combined.

In this case, DynamicGPCC3DSpatialRegionSampleEntry is the same as that of the example described with reference to FIG. 20. In addition, the syntax of DynamicGPCC3DSpatialRegionSample is the same as that of the example described with reference to FIG. 33. Furthermore, the syntax of 3DBoundingSpaceStruct is the same as that of the example described with reference to FIG. 18.

In other words, in this case, a static_mapping flag (first information) is stored in DynamicGPCC3DSpatialRegionSampleEntry. In addition, in a case in which the value of the static_mapping flag is "1", 3DBoundingSpaceStruct (second information) as described with reference to FIG. 18 is stored in DynamicGPCC3DSpatialRegionSampleEntry.

Thus, the reproduction device can easily perceive whether or not a spatial positional relation between 3D spatial regions is static and the spatial positional relation between the 3D spatial regions on the basis of such information. Thus, the reproduction device can perform reproduction without checking information such as a 3D spatial region to be reproduced, tiles composing the 3D spatial region, tiles stored in G-PCC tile tracks, and the like for each frame.

In addition, as illustrated in FIG. 33, in DynamicGPCC3DSpatialRegionSample that is the second information, in a case in which the value of the static_mapping flag is "1 (true)", a list of tile track identification information (tile_track_id) corresponding to respective 3D spatial regions of the sample is not included.

By configuring as such, unnecessary information can be inhibited from being stored in dynamic spatial region timed metadata. Thus, an increase in the amount of information of dynamic spatial region timed metadata can be inhibited, and an increase in the amount of information of a G-PCC file can be inhibited. Therefore, increases in the load of a process relating to transmission of a G-PCC file and the load of the band of a communication line can be inhibited. In addition, parsing of dynamic spatial region timed metadata can be performed more easily.

In addition, by applying the tile track identification information (tile_track_id) in place of the tile identification information (tile_id), the reproduction device does not need to parse GPCC tile sample entries (GPCCTileSampleEntry) of all the G-PCC tile tracks and can easily identify G-PCC tile tracks storing data of tiles composing a desired 3D spatial region.

As above, also in this case, an increase in the load of the reproduction process can be inhibited.

3. Information Transmission Using MPD

In addition, the present technology, for example, can be also applied to MPEG-DASH (Moving Picture Experts Group phase—Dynamic Adaptive Streaming over HTTP). For example, as illustrated in a 13th section from the top of the table illustrated in FIG. 13, the first information described above may be transmitted with being stored in an MPD (Media Presentation Description) that is a control file storing control information about distribution of a bit stream in MPEG-DASH (Method 2).

For example, the file generating unit of the information processing device may generate a control file controlling reproduction of a file and store the first information in the control file.

In addition, the extraction unit of the information processing device may refer to the first information stored in the control file controlling reproduction of a file and, in a case in which a relationship of a point cloud with a three-dimensional spatial region that is independently decodable is static, extract data of a tile from the file on the basis of the second information stored in the file.

For example, in the MPD, a descriptor storing first information may be defined (for example, a dynamic spatial region descriptor) and stored in an adaptation set (Adaptation Set) corresponding to dynamic spatial region timed metadata. In addition, a spatialRegion element of a GPCCSpatialRegions descriptor may be stored in this descriptor as an initial value of the dynamic spatial region.

In addition, for example, similar to the example illustrated in FIG. 35, by extending the GPCCSpatialRegions descriptor, a spatial positional relation of a 3D spatial region and a @staticMapping element indicating whether a correspondence relation between the 3D spatial region and the Adaptation set is static may be added. In other words, the @staticMapping element represents a value of the static_mapping flag (the first information) described above. As illustrated in FIG. 35, in a case in which the value of this @staticMapping element is "0", a spatial positional relation between respective 3D spatial regions is dynamic, and a correspondence relation between the 3D spatial region and the Adaptation set is dynamic. In addition, in a case in which the value of the @staticMapping element is "1", a spatial positional relation between respective 3D spatial regions is static, and a correspondence relation between the 3D spatial region and the Adaptation set is static.

In addition, in place of the @staticMapping element, a @staticRegionRelation element indicating whether a spatial positional relation of the 3D spatial region is static and a @staticTileMapping element indicating whether a correspondence relation between a 3D spatial region and an Adaptation set referring to a G-PCC tile track is static may be provided. In other words, the @staticRegionRelation element represents the value of the static_region_relation flag (the first information) described above, and the @staticTileMapping element represents the static_tile_mapping flag (the first information) described above.

In this case, the reproduction device acquires data of tiles composing a three-dimensional spatial region constructing a point cloud on the basis of the first information and the second information in the MPD. Thus, the reproduction device does not need to check a correspondence relation between a 3D spatial region and a track and the like for each sample and can inhibit an increase in the load of the reproduction process.

4. Information Transmission Using Matroska Media Container

Figure 36:
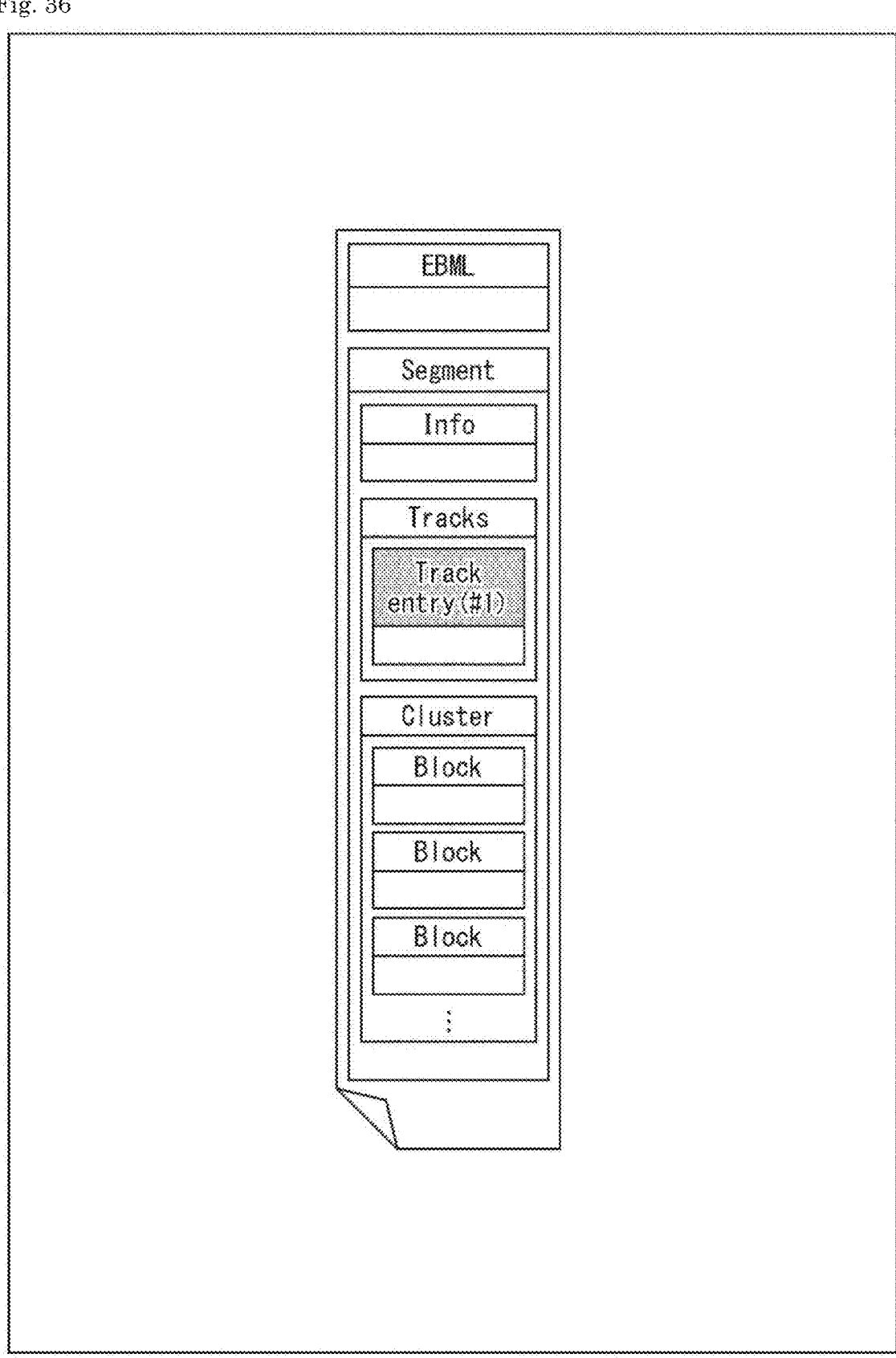
FIG. 36 is a diagram illustrating an example of a configuration of a Matroska media container.

In the description presented above, although an example in which ISOBMFF is applied as a file format has been described, a file storing a G-PCC bit stream is arbitrary and may have a format other than the ISOBMFF. For example, as illustrated in a lowermost section of the table illustrated in FIG. 13, a G-PCC bit stream may be configured to be stored in a Matroska media container (Method 3). A main configuration example of the Matroska media container is illustrated in FIG. 36.

In this case, for example, the first information and the second information may be stored as newly-defined elements under a Track Entry element. In addition, the first information and the second information are stored in timed metadata, the timed metadata may be configured to be stored in a Track entry other than the Track entry in which the G-PCC bit stream is stored.

5. First Embodiment

5-1. File Generating Device

Figure 37:
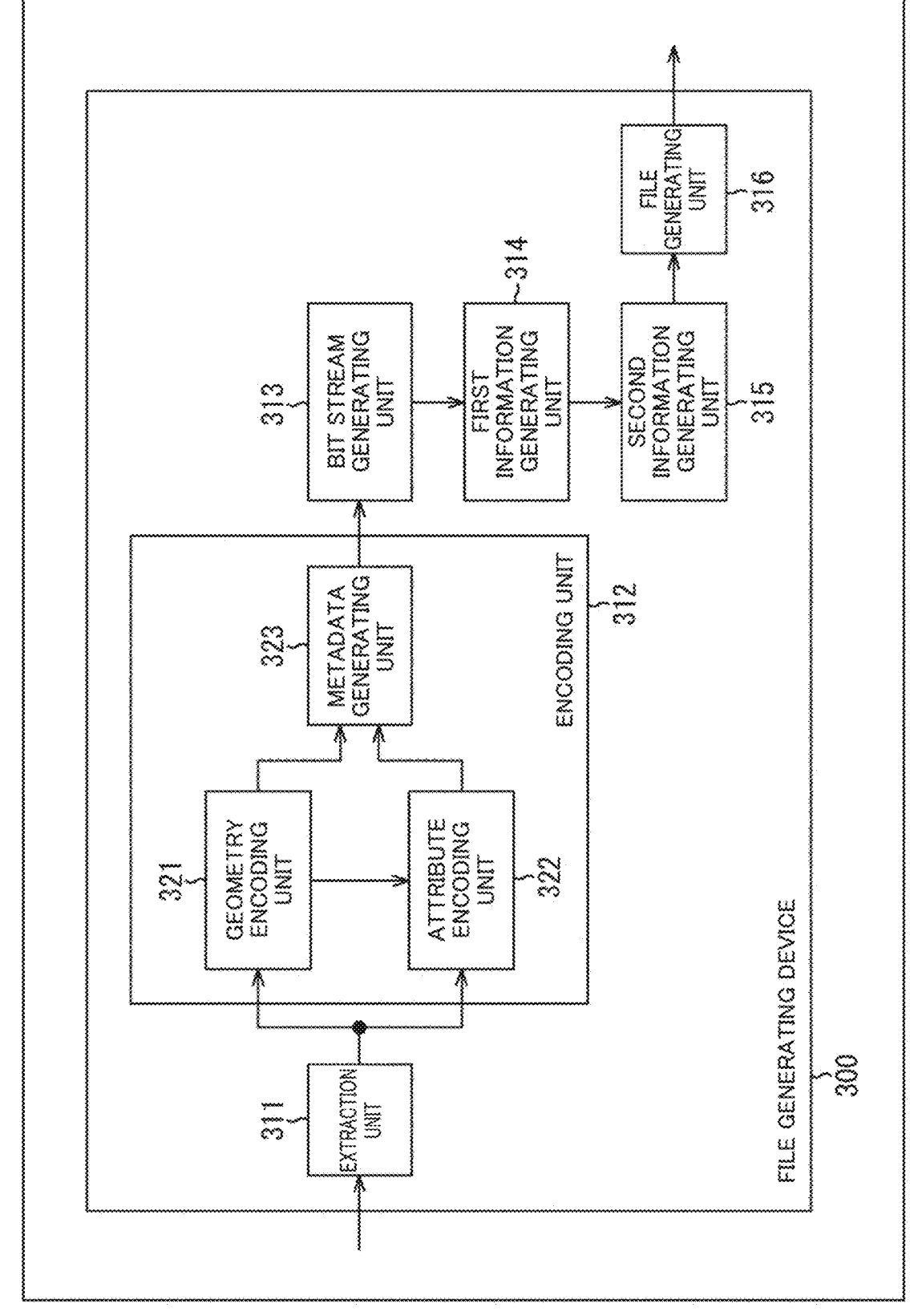
FIG. 37 is a block diagram illustrating a main configuration example of a file generating device.

The present technology described above can be applied to an arbitrary device. FIG. 37 is a block diagram illustrating an example of the configuration of a file generating device that is one type of information processing device to which the present technology is applied. The file generating device 300 illustrated in FIG. 37 is a device that encodes point cloud data by applying a G-PCC and stores a G-PCC bit stream generated in accordance with the encoding in an ISOBMFF (a G-PCC file).

The file generating device 300 stores the G-PCC bit stream in the G-PCC file such that a partial access can be made by applying the present technology described above. In other words, the file generating device 300 stores first information about a change in a relationship of a point cloud expressing an object having a three-dimensional shape for a three-dimensional spatial region that is independently decodable and second information about a three-dimensional spatial region in accordance with the first information in the G-PCC file.

FIG. 37 shows principal components such as processing units and data flows, and FIG. 37 does not show all components. In other words, in the file generating device 300, a processing unit not illustrated in FIG. 37 as a block may be present, and a process and a flow of data not illustrated in FIG. 37 using arrows and the like may be present.

As illustrated in FIG. 37, the file generating device 300 includes an extraction unit 311, an encoding unit 312, a bit stream generating unit 313, a first information generating unit 314, a second information generating unit 315, and a file generating unit 316. In addition, the encoding unit 312 includes a geometry encoding unit 321, an attribute encoding unit 322, and a metadata generating unit 323.

The extraction unit 311 extracts geometry data and attribute data from data of a point cloud input to the file generating device 300. The extraction unit 311 supplies the extracted geometry data to the geometry encoding unit 321 of the encoding unit 312. In addition, the extraction unit 311 supplies the extracted attribute data to the attribute encoding unit 322 of the encoding unit 312.

The encoding unit 312 encodes data of a point cloud. The geometry encoding unit 321 encodes geometry data supplied from the extraction unit 311 and generates a geometry bit stream. The geometry encoding unit 321 supplies the generated geometry bit stream to the metadata generating unit 323. In addition, the geometry encoding unit 321 also supplies the generated geometry bit stream to the attribute encoding unit 322.

The attribute encoding unit 322 encodes attribute data supplied from the extraction unit 311 and generates an attribute bit stream. The attribute encoding unit 322 supplies the generated attribute bit stream to the metadata generating unit 323.

The metadata generating unit 323 generates metadata by referring to the geometry bit stream and the attribute bit stream that has been supplied. The metadata generating unit 323 supplies the generated metadata to the bit stream generating unit 313 together with the geometry bit stream and the attribute bit stream.

The bit stream generating unit 313 multiplexes the geometry bit stream, the attribute bit stream, and the metadata that have been supplied, thereby generating a G-PCC bit stream. The bit stream generating unit 313 supplies the generated G-PCC bit stream to the first information generating unit 314.

In <2. Information transmission based on change in relationship with 3D spatial region in time direction>, the first information generating unit 314 generates first information about a change in the relationship of a point cloud expressing an object having a three-dimensional shape for a three-dimensional spatial region that is independently decodable on the basis of a supplied G-PCC bit stream by applying the present technology described above. At that time, the first information generating unit 314 can apply the arbitrary method described above in <2. Information transmission based on change in relationship with 3D spatial region in time direction>. The first information generating unit 314 supplies the generated first information to the second information generating unit 315 together with the G-PCC bit stream.

In <2. Information transmission based on change in relationship with 3D spatial region in time direction>, the second information generating unit 315 generates second information about a three-dimensional spatial region on the basis of a G-PCC bit stream and first information that have been supplied by applying the present technology described above. At that time, the second information generating unit 315 can apply the arbitrary method described above in <2. Information transmission based on change in relationship with 3D spatial region in time direction>. The second information generating unit 315 supplies the generated second information to the file generating unit 316 together with the G-PCC bit stream and the first information.

In <2. Information transmission based on change in relationship with 3D spatial region in time direction>, the file generating unit 316 generates a G-PCC file storing the G-PCC bit stream, the first information, and the second information that have been supplied by applying the present technology described above. At that time, the file generating unit 316 can apply the arbitrary method described above in <2. Information transmission based on change in relationship with 3D spatial region in time direction>. The file generating unit 316 outputs the G-PCC file generated as above to the outside of the file generating device 300.

By configuring as such, the file generating device 300 can inhibit an increase in the load of the reproduction process as described above in <2. Information transmission based on change in relationship with 3D spatial region in time direction>.

5-2. Flow of File Generating Process

Figure 38:
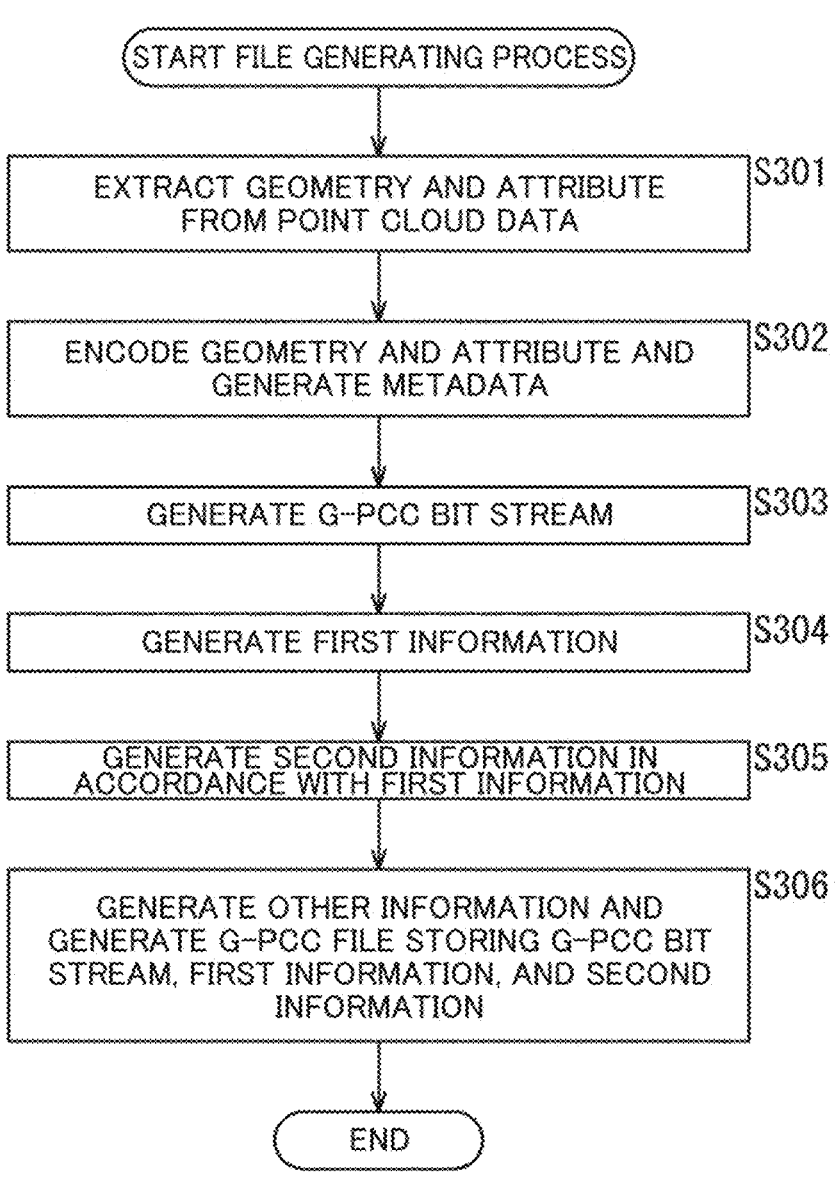
FIG. 38 is a flowchart illustrating an example of a flow of a file generating process.

An example of the flow of a file generating process performed by this file generating device 300 will be described with reference to a flowchart illustrated in FIG. 38.

When the file generating process starts, the extraction unit 311 of the file generating device 300 extracts a geometry and an attribute from a point cloud in Step S301.

In Step S302, the encoding unit 312 encodes a geometry and an attribute extracted in Step S301 and generates a geometry bit stream and an attribute bit stream. In addition, the encoding unit 312 generates metadata thereof.

In Step S303, the bit stream generating unit 313 multiplexes the geometry bit stream, the attribute bit stream, and the metadata generated in Step S302 and generates a G-PCC bit stream.

In Step S304, in <2. Information transmission based on change in relationship with 3D spatial region in time direction>, by applying the present technology described above, the first information generating unit 314 generates first information about a change in the relationship of a point cloud expressing an object having a three-dimensional shape for a three-dimensional spatial region that is independently decodable on the basis of the G-PCC bit stream generated in Step S303. At that time, in <2. Information transmission based on change in relationship with 3D spatial region in time direction>, the first information generating unit 314 can apply the arbitrary method described above.

In Step S305, in <2. Information transmission based on change in relationship with 3D spatial region in time direction>, by applying the present technology described above, the second information generating unit 315 generates second information about a three-dimensional spatial region in accordance with the first information generated in Step S304. At that time, in <2. Information transmission based on change in relationship with 3D spatial region in time direction>, the second information generating unit 315 can apply the arbitrary method described above.

In Step S306, the file generating unit 316 generates the other information and, in <2. Information transmission based on change in relationship with 3D spatial region in time direction> and, by applying the present technology described above, generates a G-PCC file storing the G-PCC bit stream, the first information, and the second information.

When the process of Step S306 ends, the file generating process ends.

As above, in the file generating process, the file generating device 300, by applying the present technology described above in <2. Information transmission based on change in relationship with 3D spatial region in time direction>, generates first information and second information and stores them in the G-PCC file. By configuring as such, as described above in <2. Information transmission based on change in relationship with 3D spatial region in time direction>, the file generating device 300 can inhibit an increase in the load of the reproduction process.

6. Second Embodiment

6-1. Reproduction Device

Figure 39:
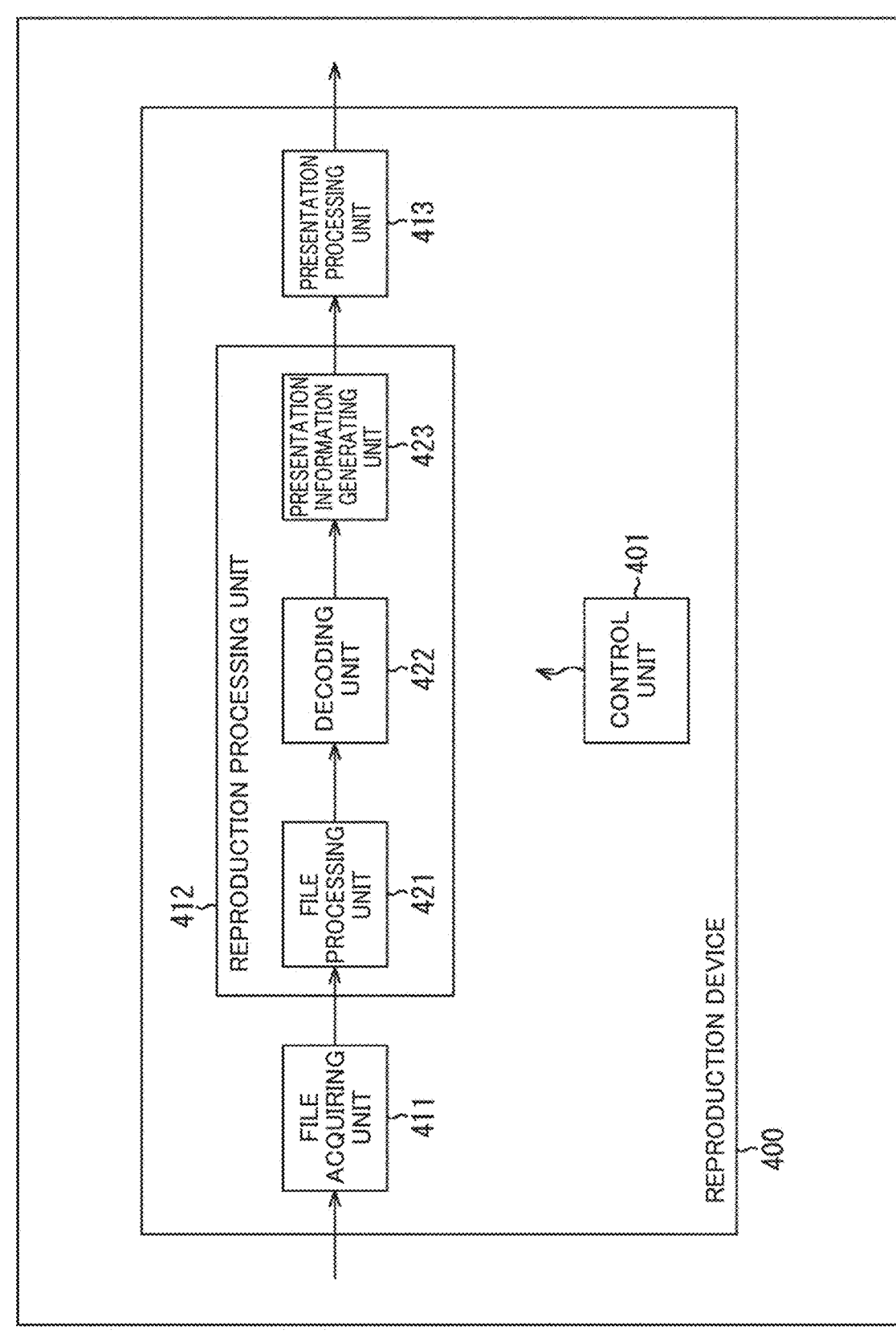
FIG. 39 is a block diagram showing a main configuration example of a decoding device.

FIG. 39 is a block diagram illustrating an example of the configuration of a reproduction device that is one type of information processing device to which the present technology is applied. The reproduction device 400 illustrated in FIG. 39 is a device that decodes a G-PCC file, constructs a point cloud, and generates presentation information through rendering. At that time, by applying the present technology described above, the reproduction device 400 can extract data of a tile composing a desired 3D spatial region of a point cloud from the G-PCC file and reproduce the extraction information through decoding. In other words, the reproduction device 400 can decode and reproduce only a part of the point cloud.

FIG. 39 shows principal components such as processing units and data flows, and FIG. 39 does not show all components. That is, processing units that are not illustrated in FIG. 39 as blocks and processing and data flows that are not illustrated in FIG. 39 as arrows and the like may be present in the reproduction device 400.

As illustrated in FIG. 39, the reproduction device 400 includes a control unit 401, a file acquiring unit 411, a reproduction processing unit 412, and a presentation processing unit 413. The reproduction processing unit 412 includes a file processing unit 421, a decoding unit 422, and a presentation information generating unit 423.

The control unit 401 controls each processing unit disposed inside the reproduction device 400. The file acquiring unit 411 acquires a G-PCC file storing a point cloud to be reproduced and supplies the acquired G-PCC file to the reproduction processing unit 412 (the file processing unit 421 thereof). The reproduction processing unit 412 performs a process relating to reproduction of a point cloud stored in the supplied G-PCC file.

The file processing unit 421 of the reproduction processing unit 412 acquires a G-PCC file supplied from the file acquiring unit 411 and extracts a bit stream from the G-PCC file. At that time, in <2. Information transmission based on change in relationship with 3D spatial region in time direction>, the file processing unit 421 extracts data (a bit stream) of a tile composing a desired 3D spatial region from the G-PCC file by applying the present technology described above. The file processing unit 421 supplies the extracted bit stream to the decoding unit 422. The decoding unit 422 decodes the supplied bit stream, thereby generating data of a geometry and an attribute. The decoding unit 422 supplies the generated data of the geometry and the attribute to the presentation information generating unit 423. The presentation information generating unit 423 constructs a point cloud using the supplied data of the geometry and the attribute and generates presentation information that is information used for presenting (for example, displaying) the point cloud. For example, the presentation information generating unit 423 performs rendering using the point cloud and generates a display image acquired by seeing the point cloud from a predetermined visual point as presentation information. The presentation information generating unit 423 supplies the presentation information generated in this way to the presentation processing unit 413.

The presentation processing unit 413 performs a process of presenting the supplied presentation information. For example, the presentation processing unit 413 supplies the presentation information to a display device or the like disposed outside of the reproduction device 400 and causes the display device or the like to present the presentation information.

6-2. Reproduction Processing Unit

Figure 40:
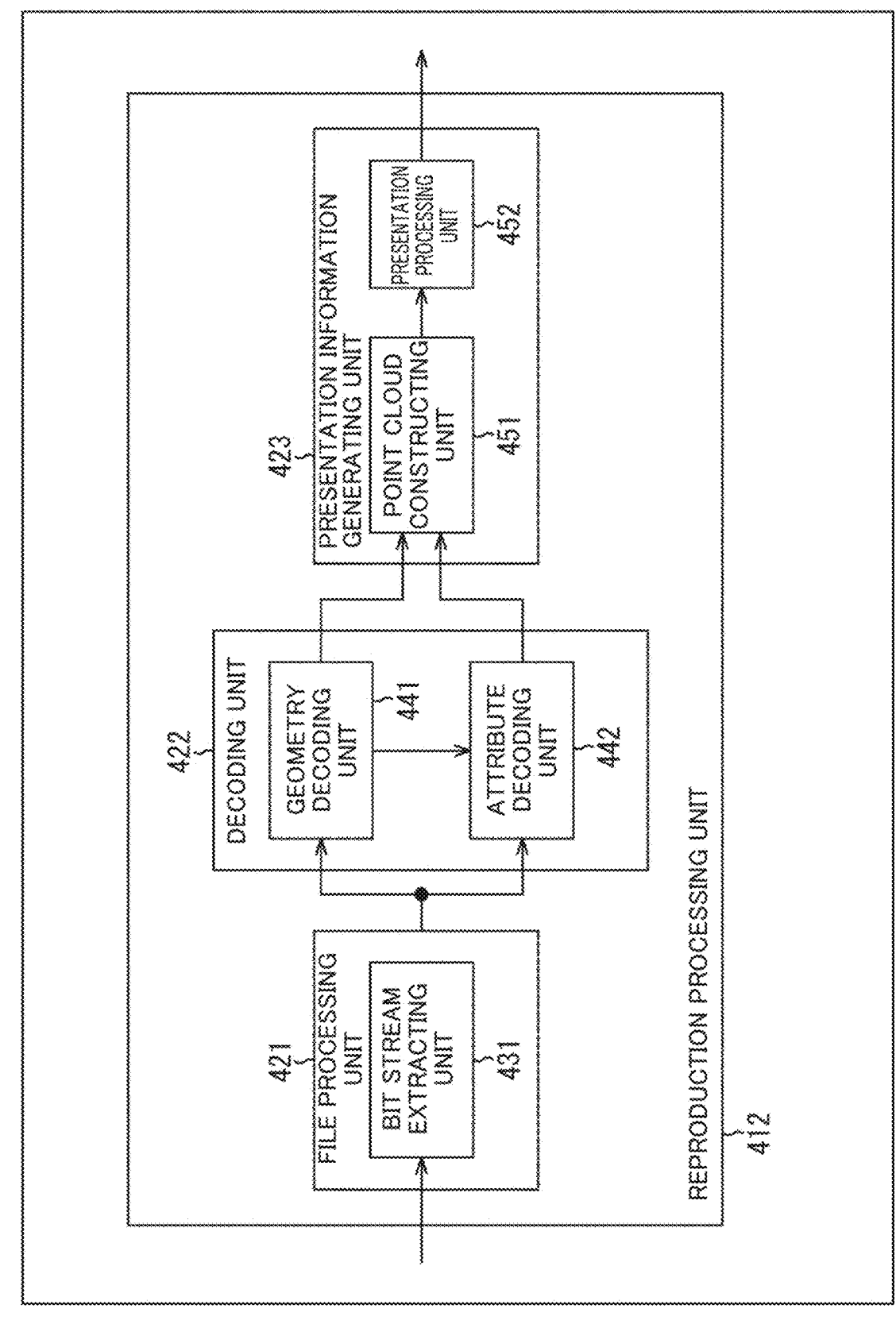
FIG. 40 is a block diagram illustrating a main configuration example of a reproduction processing unit.

FIG. 40 is a block diagram illustrating a main configuration example of the reproduction processing unit 412. As illustrated in FIG. 40, the file processing unit 421 includes a bit stream extracting unit 431. The decoding unit 422 includes a geometry decoding unit 441 and an attribute decoding unit 442. The presentation information generating unit 423 includes a point cloud constructing unit 451 and a presentation processing unit 452.

In <2. Information transmission based on change in relationship with 3D spatial region in time direction>, by applying the present technology described above, the bit stream extracting unit 431 extracts a bit stream from the supplied G-PCC file. For example, the bit stream extracting unit 431 refers to first information included in the supplied G-PCC file, in a case in which a relationship of the point cloud for a three-dimensional spatial region (3D spatial region) that is independently decodable is static, and extracts data (a bit stream) of a tile composing a three-dimensional spatial region constructing the point cloud on the basis of second information about the three-dimensional spatial region generated in accordance with the first information. At that time, the bit stream extracting unit 431 can apply the arbitrary method described above in <2. Information transmission based on change in relationship with 3D spatial region in time direction>.

The bit stream extracting unit 431 supplies the extracted geometry bit stream to the geometry decoding unit 441. In addition, the bit stream extracting unit 431 supplies the extracted attribute bit stream to the attribute decoding unit 442.

The geometry decoding unit 441 decodes the supplied geometry bit stream, thereby generating data of the geometry. The geometry decoding unit 441 supplies the generated data of the geometry to the point cloud constructing unit 451. The attribute decoding unit 442 decodes the supplied attribute bit stream, thereby generating data of the attribute. The attribute decoding unit 442 supplies the generated data of the attribute to the point cloud constructing unit 451.

The point cloud constructing unit 451 constructs a point cloud using the supplied data of the geometry and the attribute. In other words, the point cloud constructing unit 451 can construct a desired tile of the point cloud. The point cloud constructing unit 451 supplies data of the constructed point cloud to the presentation processing unit 452.

The presentation processing unit 452 generates presentation information using the supplied data of the point cloud. The presentation processing unit 452 supplies the generated presentation information to the presentation processing unit 413.

By configuring as such, the reproduction device 400 can inhibit an increase in the load of the reproduction process in <2. Information transmission based on change in relationship with 3D spatial region in time direction> as described above.

6-3. Flow of Reproduction Process

Figure 41:
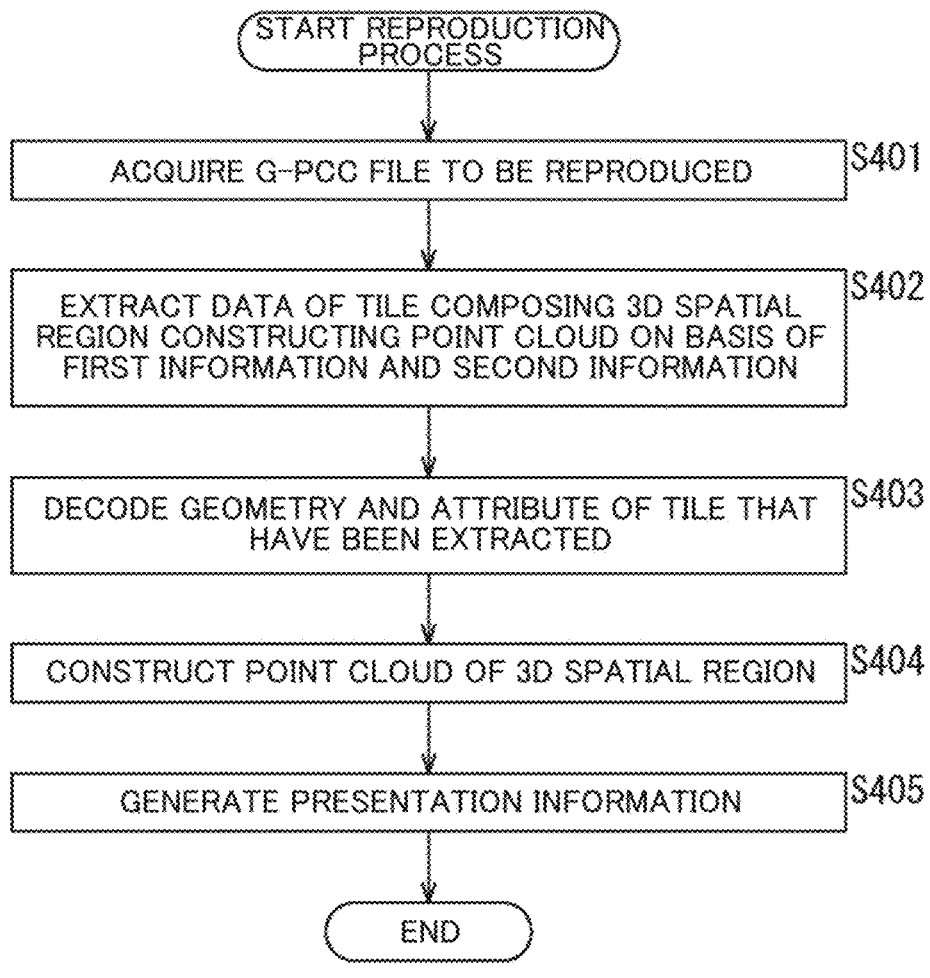
FIG. 41 is a flowchart illustrating an example of a flow of a reproduction process.

An example of a reproduction process performed by this reproduction device 400 will be describe with reference to a flowchart illustrated in FIG. 41.

When the reproduction process starts, the file acquiring unit 411 of the reproduction device 400 acquires a G-PCC file to be reproduced in Step S401.

In Step S402, in <2. Information transmission based on change in relationship with 3D spatial region in time direction>, by applying the present technology described above, the bit stream extracting unit 431 extracts a bit stream from the G-PCC file acquired in Step S401. For example, the bit stream extracting unit 431 refers to first information included in the supplied G-PCC file, in a case in which a relationship of the point cloud for a three-dimensional spatial region (3D spatial region) that is independently decodable is static, and extracts data (a bit stream) of a tile composing a three-dimensional spatial region constructing the point cloud on the basis of second information about the three-dimensional spatial region generated in accordance with the first information. At that time, the bit stream extracting unit 431 can apply the arbitrary method described above in <2. Information transmission based on change in relationship with 3D spatial region in time direction>.

In Step S403, the geometry decoding unit 441 of the decoding unit 422 decodes the geometry bit stream extracted in Step S402, thereby generating data of a geometry. In addition, the attribute decoding unit 442 decodes the attribute bit stream extracted in Step S402, thereby generating data of an attribute.

In Step S404, the point cloud constructing unit 451 constructs a point cloud using the data of the geometry and the attribute generated in Step S403. In other words, the point cloud constructing unit 451 can construct a desired tile (a part of the point cloud).

In Step S405, the presentation processing unit 452 performs rendering and the like using the point cloud constructed in Step S404, thereby generating presentation information. The presentation processing unit 413 supplies the presentation information to the outside of the reproduction device 400 and causes the presentation information to be presented.

When the process of Step S405 ends, the reproduction process ends.

As above, by applying the present technology described in <2. Information transmission based on change in relationship with 3D spatial region in time direction> in the reproduction process, the reproduction device 400 extracts data (a bit stream) of a tile composing a three-dimensional spatial region constructing a point cloud from the G-PCC file on the basis of the first information and the second information. By configuring as such, as described above in <2. Information transmission based on change in relationship with 3D spatial region in time direction>, the reproduction device 400 can inhibit an increase in the load of the reproduction process.

7. Supplement

<Computer>
The above-described series of processing can be executed by hardware or software. In the case where the series of processes are executed by software, a program that configures the software is installed on a computer. Here, the computer includes, for example, a computer built in dedicated hardware and a general-purpose personal computer on which various programs are installed to be able to execute various functions.

Figure 42:
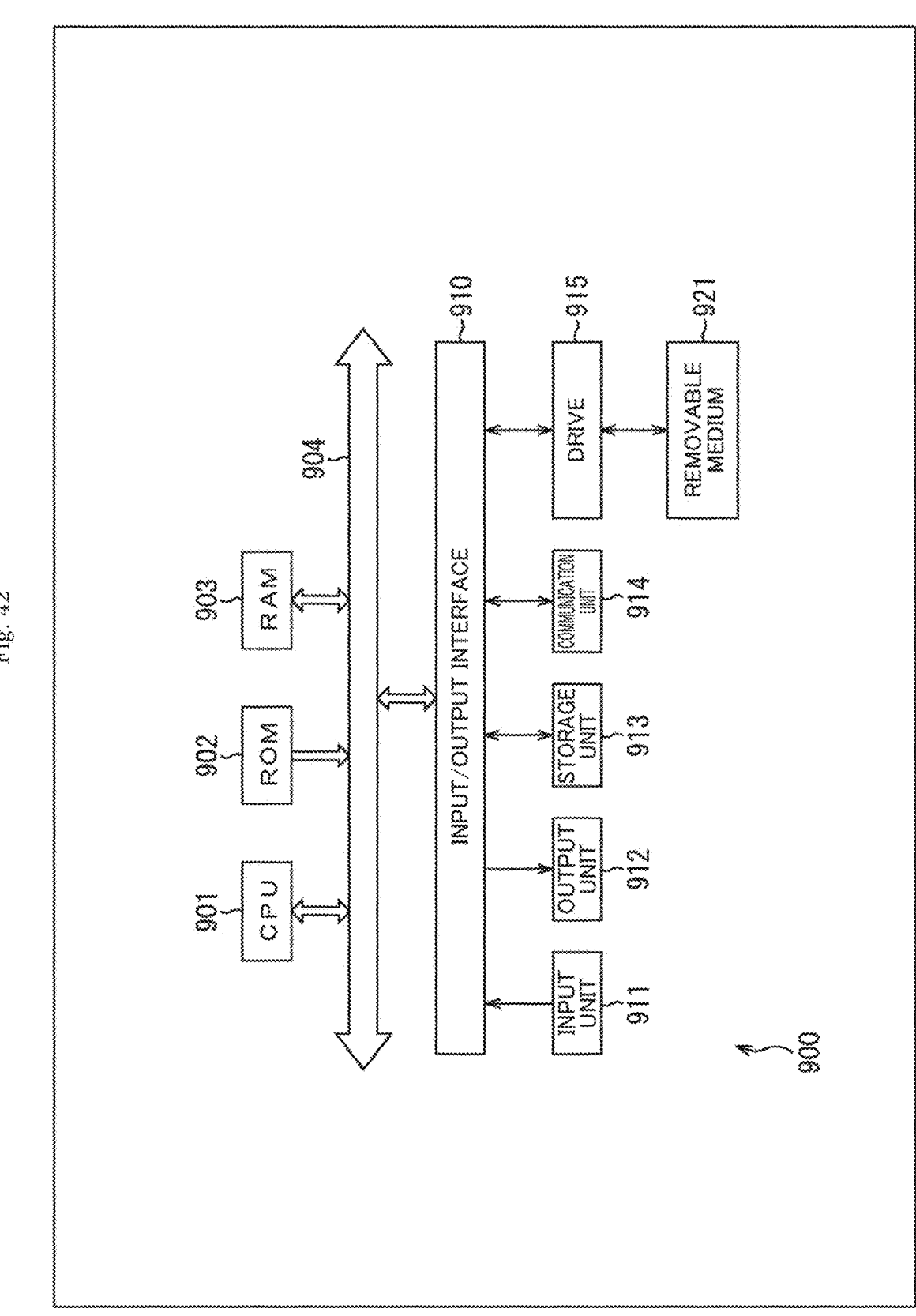
FIG. 42 is a block diagram showing a main configuration example of a computer.

FIG. 42 is a block diagram showing an example of a hardware configuration of a computer that executes the above-described series of processing according to a program.

In a computer 900 illustrated in FIG. 42, a central processing unit (CPU) 901, a read only memory (ROM) 902, and a random access memory (RAM) 903 are connected to each other via a bus 904.

An input/output interface 910 is also connected to the bus 904. An input unit 911, an output unit 912, a storage unit 913, a communication unit 914, and a drive 915 are connected to the input/output interface 910.

The input unit 911 is, for example, a keyboard, a mouse, a microphone, a touch panel, or an input terminal. The output unit 912 is, for example, a display, a speaker, or an output terminal. The storage unit 913 includes, for example, a hard disk, a RAM disk, or a non-volatile memory. The communication unit 914 includes, for example, a network interface. The drive 915 drives a removable medium 921 such as a magnetic disk, an optical disc, a magneto-optical disk, or a semiconductor memory.

In the computer having the above configuration, the CPU 901 performs the aforementioned series of processes by loading a program stored in the storage unit 913 to the RAM 903 via the input/output interface 910 and the bus 904 and executing the program, for example. The RAM 903 also appropriately stores data and the like necessary for the CPU 901 to execute various kinds of processing.

The program executed by the computer can be recorded in, for example, the removable medium 921 as a package medium or the like and provided in such a form. In such a case, the program can be installed in the storage unit 913 via the input/output interface 910 by inserting the removable medium 921 into the drive 915.

This program can also be provided via wired or wireless transfer medium such as a local area network, the Internet, and digital satellite broadcasting. In such a case, the program can be received by the communication unit 914 and installed in the storage unit 913.

In addition, this program may be installed in advance in the ROM 902 or the storage unit 913.

<Applicable Target of Present Technology>

In the description presented above, although a case in which the present technology is applied mainly to a method in which a G-PCC bit stream is stored in an ISOBMFF has been described, an applicable target of the present technology is arbitrary and is not limited to the examples described above. In other words, the format of a file storing a G-PCC bit stream is arbitrary and is not limited to the ISOBMFF and the Matroska media container described above. In addition, an encoding/decoding system of 3D data (a point cloud) is arbitrary and is not limited to the G-PCC. Furthermore, the format of 3D data is arbitrary and may be a format other than the point cloud. In other words, some or all of specifications such as files, an encoding/decoding system, 3D data and generation/construction methods thereof, and the like may be different from those of the example described above as long as they are not contradictory to the features of the present technology described above. In addition, some of the processes and the specifications described above may be omitted.

Furthermore, the present technology can be applied to an arbitrary configuration. For example, the present technology can be applied to various electronic devices.

For example, the present technology can be implemented as a configuration of a part of a device such as a processor (for example, a video processor) of a system large scale integration (LSI), a module (for example, a video module) using a plurality of processors or the like, a unit (for example, a video unit) using a plurality of modules or the like, or a set (for example, a video set) with other functions added to the unit.

Also, the present technology can also be applied to a network system configured of a plurality of devices, for example. The present technology may be performed by cloud computing in which it is assigned to and processed together by a plurality of devices via a network, for example. For example, the present technology may be performed in a cloud service that provides services regarding images (moving images) to arbitrary terminals such as a computer, an audio visual (AV) device, a mobile information processing terminal, an Internet-of-Things (IoT) device, and the like.

In the present specification, a system means a set of a plurality of constituent elements (devices, modules (parts), or the like) and all the constituent elements may be or may not be in the same casing. Accordingly, a plurality of devices accommodated in separate casings and connected via a network and a single device accommodating a plurality of modules in a single casing are all a system.

<Fields and Applications to which Present Technology is Applicable>

A system, device, a processing unit, and the like to which the present technology is applied can be used in any field such as traffic, medical treatment, security, agriculture, livestock industries, a mining industry, beauty, factories, home appliance, weather, and natural surveillance, for example. Any purpose can be set.

For example, the present technology can be applied to systems and devices for providing ornamental content and the like. In addition, for example, the present technology can be applied to systems and devices available for traffic, such as traffic condition monitoring and autonomous driving control. Further, for example, the present technology can be applied to systems and devices available for security. In addition, for example, the present technology can be applied to systems and devices available for automatic control of machines and the like. Further, for example, the present technology can be applied to systems and devices available for agriculture and livestock industry. In addition, the present technology can also be applied, for example, to systems and devices for monitoring natural conditions such as volcanoes, forests, and oceans and wildlife. Further, for example, the present technology can be applied to systems and devices available for sports.

<Others>

Note that the "flag" in the present specification is information for identifying a plurality of states and includes not only information used to identify two states, namely true (1) or false (0), but also information with which three or more states can be identified. Therefore, values that the "flag" can take may be, for example, two values of 1 and 0 or three or more values. In other words, the number of bits constituting the "flag" may be an arbitrary number and may be 1 bit or a plurality of bits. Also, since not only the form in which the identification information is included in a bit stream but also the form in which difference information of identification information with respect to certain reference information is included in a bit stream can be assumed as the identification information (including the flag), the "flag" and the "identification information" in the present specification include not only the information itself but also the difference information with respect to the reference information.

Also, various kinds of information (such as metadata) related to encoded data (bit stream) may be transmitted or recorded in any form as long as it is associated with the encoded data. Here, the term "associated" means that when one data is processed, the other may be used (may be linked), for example. In other words, mutually associated items of data may be integrated as one item of data or may be individual items of data. For example, information associated with encoded data (image) may be transmitted through a transmission path that is different from that for the encoded data (image). Also, the information associated with the encoded data (image) may be recorded in a recording medium that is different from that for the encoded data (image) (or a different recording area in the same recording medium), for example. Meanwhile, this "association" may be for part of data, not the entire data. For example, an image and information corresponding to the image may be associated with a plurality of frames, one frame, or any unit such as a part in the frame.

Meanwhile, in the present specification, terms such as "synthesize", "multiplex", "add", "integrate", "include", "store", "put in", "enclose", and "insert" may mean, for example, combining a plurality of objects into one, such as combining encoded data and metadata into one piece of data, and means one method of "associating" described above.

Embodiments of the present technology are not limited to the above-described embodiments and can be changed variously within the scope of the present technology without departing from the gist of the present technology.

For example, a configuration described as one device (or processing unit) may be split into and configured as a plurality of devices (or processing units). Conversely, configurations described above as a plurality of devices (or processing units) may be integrated and configured as one device (or processing unit). Also, it is a matter of course that configurations other than the aforementioned configurations may be added to the configuration of each device (or each processing unit). Moreover, some of configurations of a certain device (or processing unit) may be included in a configuration of another device (or another processing unit) as long as configurations and operations of the entire system are substantially the same.

Also, the aforementioned program may be executed by an arbitrary device, for example. In that case, it is only necessary for the device to have necessary functions (such as functional blocks) such that the device can obtain necessary information.

Further, for example, each step of one flowchart may be executed by one device, or may be shared and executed by a plurality of devices. Further, when a plurality of processing are included in one step, one device may execute the plurality of processing, or the plurality of devices may share and execute the plurality of processing. In other words, it is also possible to execute the plurality of processing included in one step as processing of a plurality of steps. On the other hand, it is also possible to execute processing described as a plurality of steps collectively as one step.

Further, for example, in a program that is executed by a computer, processing of steps describing the program may be executed in time series in an order described in the present specification, or may be executed in parallel or individually at a required timing such as when call is made. That is, the processing of the respective steps may be executed in an order different from the above-described order as long as there is no contradiction. Further, the processing of the steps describing this program may be executed in parallel with processing of another program, or may be executed in combination with the processing of the other program.

Further, for example, a plurality of technologies regarding the present technology can be independently implemented as a single body as long as there is no contradiction. Of course, it is also possible to perform any plurality of the present technologies in combination. For example, it is also possible to implement some or all of the present technologies described in any of the embodiments in combination with some or all of the present technologies described in other embodiments. Further, it is also possible to implement some or all of any of the above-described present technologies in combination with other technologies not described above.

The present technology can also be configured as follows.

(1) An information processing device including: a first information generating unit configured to generate first information about a change in a relationship of a point cloud expressing an object having a three-dimensional shape for three-dimensional spatial regions that are independently decodable; a second information generating unit configured to generate second information about the three-dimensional spatial regions in accordance with the first information; and a file generating unit configured to generate a file storing a bit stream of encoded data acquired by encoding the point cloud, the first information, and the second information.

(2) The information processing device described in (1), wherein the first information generating unit generates information indicating whether the relationship including a positional relation in a three-dimensional space between the three-dimensional spatial regions is static as the first information, and the second information generating unit, in a case in which the first information is true, generates information representing a range in which the three-dimensional spatial regions are able to be present as the second information.

(3) The information processing device described in (2), wherein the first information generating unit generates information indicating whether the positional relation is static as the first information.

(4) The information processing device described in (2), wherein the first information generating unit generates the positional relation and information indicating whether a correspondence relation between the three-dimensional spatial regions and information used for acquiring tiles of the point cloud is static as the first information.

(5) The information processing device described in (2), wherein the second information generating unit generates information about the three-dimensional spatial regions including a correspondence relation between the three-dimensional spatial regions and information used for acquiring tiles of the point cloud, which is static, as second information.

(6) The information processing device described in (5), wherein the information used for acquiring the tiles is identification information of the tiles.

(7) The information processing device described in (5), wherein the information used for acquiring the tiles is identification information of tracks of the file in which data of the tiles is stored.

(8) The information processing device described in (1), wherein the first information generating unit generates information indicating whether the relationship including a positional relation in a three-dimensional space between the three-dimensional spatial regions is static as the first information, and the second information generating unit, in a case in which the first information is true, generates information representing the three-dimensional spatial regions of which reference point positions of the three-dimensional spatial regions are static as the second information.

(9) The information processing device described in (1), wherein the first information generating unit generates information indicating whether the relationship including a positional relation in a three-dimensional space between the three-dimensional spatial regions is static as the first information, and the second information generating unit, in a case in which the first information is true, generates information representing the three-dimensional spatial region of which a center position of the three-dimensional spatial region is static as the second information.

(10) The information processing device described in (1), wherein the first information generating unit generates information indicating whether the relationship including a correspondence relation between the three-dimensional spatial regions and information used for acquiring tiles of the point cloud is static as the first information, and the second information generating unit, in a case in which the first information is true, does not include the information representing the correspondence relation as the second information and generates dynamic information about the three-dimensional spatial regions.

(11) The information processing device described in (10), wherein the first information generating unit generates information indicating whether the correspondence relation is static as the first information.

(12) The information processing device described in (10), wherein the first information generating unit generates positional relations in a three-dimensional space between the three-dimensional spatial regions and information indicating whether the correspondence relation is static as the first information.

(13) The information processing device described in (10), wherein the second information generating unit generates dynamic information about the three-dimensional spatial regions further including information representing the number of the three-dimensional spatial regions that are static.

(14) The information processing device described in (10), wherein the information used for acquiring the tiles is identification information of the tiles.

(15) The information processing device described in (10), wherein the information used for acquiring the tiles is identification information of tracks of the file in which data of the tiles is stored.

(16) The information processing device described in (1), wherein the file generating unit generates a control file for controlling reproduction of the file and stores the first information in the control file.

(17) An information processing method including: generating first information about a change in a relationship of a point cloud expressing an object having a three-dimensional shape for three-dimensional spatial regions that are independently decodable; generating second information about the three-dimensional spatial regions in accordance with the first information; and generating a file storing a bit stream of encoded data acquired by encoding the point cloud, the first information, and the second information.

(21) An information processing device including: an extraction unit configured to refer to first information about a change in a relationship of a point cloud for three-dimensional spatial regions that are independently decodable, which is stored in a file in which a bit stream of encoded data acquired by encoding the point cloud expressing an object having a three-dimensional shape is stored, and, in a case in which the relationship is static, extract data of tiles composing the three-dimensional spatial regions constructing the point cloud on the basis of second information about the three-dimensional spatial regions generated in accordance with the first information; and a decoding unit configured to decode the extracted data.

(22) The information processing device described in (21), wherein the first information is information indicating whether the relationship including a positional relation in a three-dimensional space between the three-dimensional spatial regions is static, the second information is static information representing a range in which the three-dimensional spatial regions are able to be present, and the extraction unit specifies the three-dimensional spatial regions constructing the point cloud on the basis of the information, which is static, representing the range in which the three-dimensional spatial regions are able to be present.

(23) The information processing device described in (22), wherein the first information is information indicating whether the positional relations are static.

(24) The information processing device described in (22), wherein the first information is the positional relations and information indicating whether the correspondence relation between the three-dimensional spatial regions and the information used for acquiring the tiles is static.

(25) The information processing device described in (22), wherein the second information further includes information about the three-dimensional spatial regions including a correspondence relation between the three-dimensional spatial regions and information used for acquiring the tiles, which is static, and the extraction unit extracts the data of the tiles composing the three-dimensional spatial regions specified on the basis of the static information representing the range in which the three-dimensional spatial regions are able to be present on the basis of the information about the three-dimensional spatial regions from the file.

(26) The information processing device described in (25), wherein the information used for acquiring the tiles is identification information of the tiles.

(27) The information processing device described in (25), wherein the information used for acquiring the tiles is identification information of tracks storing the data of the tiles in the file.

(28) The information processing device described in (21), wherein the first information is information indicating whether the relationship including a positional relation in a three-dimensional space between the three-dimensional spatial regions is static, the second information is information representing the three-dimensional spatial regions of which reference point positions of the three-dimensional spatial regions are static, and the extraction unit specifies the three-dimensional spatial regions constructing the point cloud on the basis of information representing the three-dimensional spatial regions.

(29) The information processing device described in (21), wherein the first information is information indicating whether the relationship including a positional relation in a three-dimensional space between the three-dimensional spatial regions is static, the second information is information representing the three-dimensional spatial regions of which center positions of the three-dimensional spatial regions are static, and the extraction unit specifies the three-dimensional spatial regions constructing the point cloud on the basis of the information representing the three-dimensional spatial regions.

(30) The information processing device described in (21), wherein the first information is information indicating whether the relationship including a correspondence relation between the three-dimensional spatial region and the information used for acquiring the tiles is static, the second information is the information about the three-dimensional spatial regions, which are dynamic, not including the information representing the correspondence relation, and the extraction unit extracts the data of the tiles from the file on the basis of the information about the three-dimensional spatial regions that are dynamic and the information representing the correspondence relation that is static.

(31) The information processing device described in (30), wherein the first information is information indicating whether the correspondence relation is static.

(32) The information processing device described in (30), wherein the first information is the positional relation in a three-dimensional space between the three-dimensional spatial regions and information indicating whether the correspondence relation is static.

(33) The information processing device described in (30), wherein the second information is information about the three-dimensional spatial regions, which are dynamic, further including information representing the number of the three-dimensional spatial regions which are static, and the extraction unit extracts the data of the tiles from the file on the basis of the information about the three-dimensional spatial regions that are dynamic and the information representing the correspondence relation that is static.

(34) The information processing device described in (30), wherein the information used for acquiring the tiles is identification information of the tiles.

(35) The information processing device described in (30), wherein the information used for acquiring the tiles is identification information of tracks storing the data of the tiles in the file.

(36) The information processing device described in (21), wherein the extraction unit refers to first information stored in a control file for controlling reproduction of the file and, in a case in which the relationship is static, extracts data of the tiles from the file on the basis of the second information stored in the file.

(37) An information processing method including: referring to first information about a change in a relationship of a point cloud for three-dimensional spatial regions that are independently decodable, which is stored in a file in which a bit stream of encoded data acquired by encoding the point cloud expressing an object having a three-dimensional shape is stored, and, in a case in which the relationship is static, extracting data of tiles composing the three-dimensional spatial regions constructing the point cloud on the basis of second information about the three-dimensional spatial regions generated in accordance with the first information; and decoding the extracted data.

REFERENCE SIGNS LIST

300 File generating device
311 Extraction unit
312 Encoding unit
313 Bit stream generating unit
314 First information generating unit
315 Second information generating unit
316 File generating unit
321 Geometry encoding unit
322 Attribute encoding unit
323 Metadata generating unit
400 Reproduction device
401 Control unit
411 File acquiring unit
412 Reproduction processing unit
413 Presentation processing unit
421 File processing unit
422 Decoding unit
423 Presentation information generating unit
431 Bit stream extracting unit
441 Geometry decoding unit
442 Attribute decoding unit
451 Point cloud constructing unit
452 Presentation processing unit

The invention claimed is:

1. An information processing device comprising:
circuitry configured to:
refer to first information about a change in a relationship of a point cloud for three-dimensional spatial regions that are independently decodable, which is stored in a file in which a bit stream of encoded data acquired by encoding the point cloud expressing an object having a three-dimensional shape is stored, and
in a case in which the first information indicates that the relationship of the point cloud is static:
generate second information about the three-dimensional spatial regions, and extract data of tiles composing the three-dimensional spatial regions constructing the point cloud based on the second information about the three-dimensional spatial regions; and
a decoder configured to decode the extracted data,
wherein the first information is information indicating whether or not a correspondence relation between each of the three-dimensional spatial regions and information used for acquiring a respective one of the tiles is static,
wherein, based on at least some of the three-dimensional spatial regions being dynamic, the second information includes information representing a number of the three-dimensional spatial regions which are static and does not include information representing the correspondence relation for the three-dimensional spatial regions which are static, and
wherein the circuitry extracts the data of the tiles from the file based on information about the three-dimensional spatial regions that are dynamic and the second information.

2. The information processing device according to claim 1,
wherein the relationship further includes a positional relation in a three-dimensional space between the three-dimensional spatial regions,
wherein the second information is static information representing a range in which the three-dimensional spatial regions are able to be present,
wherein the extraction circuitry specifies the three-dimensional spatial regions constructing the point cloud based on the information, which is static, representing the range in which the three-dimensional spatial regions are able to be present.

3. The information processing device according to claim 2,
wherein the second information about the three-dimensional spatial regions further includes a correspondence relation between the three-dimensional spatial regions and the information used for acquiring the tiles, which is static, and
wherein the circuitry extracts the data of the tiles composing the three-dimensional spatial regions specified based on the static information representing the range in which the three-dimensional spatial regions are able to be present based on the second information about the three-dimensional spatial regions from the file.

4. The information processing device according to claim 1, wherein the information used for acquiring the tiles is-comprises identification information of the tiles.

5. The information processing device according to claim 1, wherein the information used for acquiring the tiles comprises is-identification information of tracks storing the data of the tiles in the file.

6. An information processing method performed by an information processing device, the information processing method comprising:
referring to first information about a change in a relationship of a point cloud for three-dimensional spatial regions that are independently decodable, which is stored in a file in which a bit stream of encoded data acquired by encoding the point cloud expressing an object having a three-dimensional shape is stored, and, in a case in which the relationship of the point cloud, is static, extracting data of tiles composing the three-dimensional spatial regions constructing the point cloud based on second information about the three-dimensional spatial regions generated in accordance with the first information; and decoding the extracted data, wherein the first information is information indicating whether or not a correspondence relation between each of the three-dimensional spatial regions and information used for acquiring a respective one of the tiles is static, wherein, based on at least some of the three-dimensional spatial regions being dynamic, the second information includes information representing a number of the three-dimensional spatial regions which are static and does not include information representing the correspondence relation for the three-dimensional spatial regions which are static, and wherein the method further comprises extracting the data of the tiles from the file based on information about the three-dimensional spatial regions that are dynamic and the second information.

* * * * *